United States Patent [19]
Kumar

[11] Patent Number: 6,122,274
[45] Date of Patent: Sep. 19, 2000

[54] ATM SWITCHING SYSTEM WITH DECENTRALIZED PIPELINE CONTROL AND PLURAL MEMORY MODULES FOR VERY HIGH CAPACITY DATA SWITCHING

[75] Inventor: Sanjeev Kumar, P.O. Box 450862, Garland, Tex. 75045-0862

[73] Assignee: Sanjeev Kumar, Richardson, Tex.

[21] Appl. No.: 08/971,243

[22] Filed: Nov. 16, 1997

[51] Int. Cl.$^7$ .................................................. H04L 12/56
[52] U.S. Cl. .......................................... 370/388; 370/395
[58] Field of Search ..................................... 370/389, 392, 370/395, 397, 398, 399, 372, 360, 363, 387, 388, 396

[56] References Cited

U.S. PATENT DOCUMENTS

| | | | |
|---|---|---|---|
| 5,410,540 | 4/1995 | Aiki et al. | 370/390 |
| 5,583,858 | 12/1996 | Hanaoka | 370/392 |
| 5,649,217 | 7/1997 | Yamanaka et al. | 395/872 |
| 5,651,129 | 7/1997 | Yokote et al. | 395/431 |
| 5,724,353 | 3/1998 | Sugawara | 370/395 |

*Primary Examiner*—Chau Nguyen
*Assistant Examiner*—Soon-Dong Hyun

[57] ABSTRACT

A data packet switch, in general, and an Asynchronous Transfer Mode switch, in particular employing a plurality of physically separate memory modules operates like a single shared memory switch by allowing sharing of all of the memory modules among all of the inputs and outputs of the switch. The disclosed switching apparatus consists of multiple independent stages where different stages of the switch operate without a common centralized controller. The disclosed switch removes performance bottleneck commonly caused by use of a centralized controller in the switching system. Incoming data packets are assigned routing parameters by a parameter assignment circuit based on packets' output destination and current state of the switching system. The routing parameters are then attached as an additional tag to input packets for their propagation through various stages of the switching apparatus. Packets with the attached routing parameters pass through different stages of the switching apparatus and the corresponding switching functions are locally performed by each stage based only on the information available locally. Memory modules along with their controllers use information available locally to perform memory operations and related memory management to realize overall switching function. The switching apparatus and the method facilitates sharing of physically separate memory modules without using a centralized memory controller. The switching apparatus and the method provide higher scalability, simplified circuit design, pipeline processing of data packets and the ability to realize various memory sharing schemes for a plurality memory modules in the switch.

14 Claims, 56 Drawing Sheets

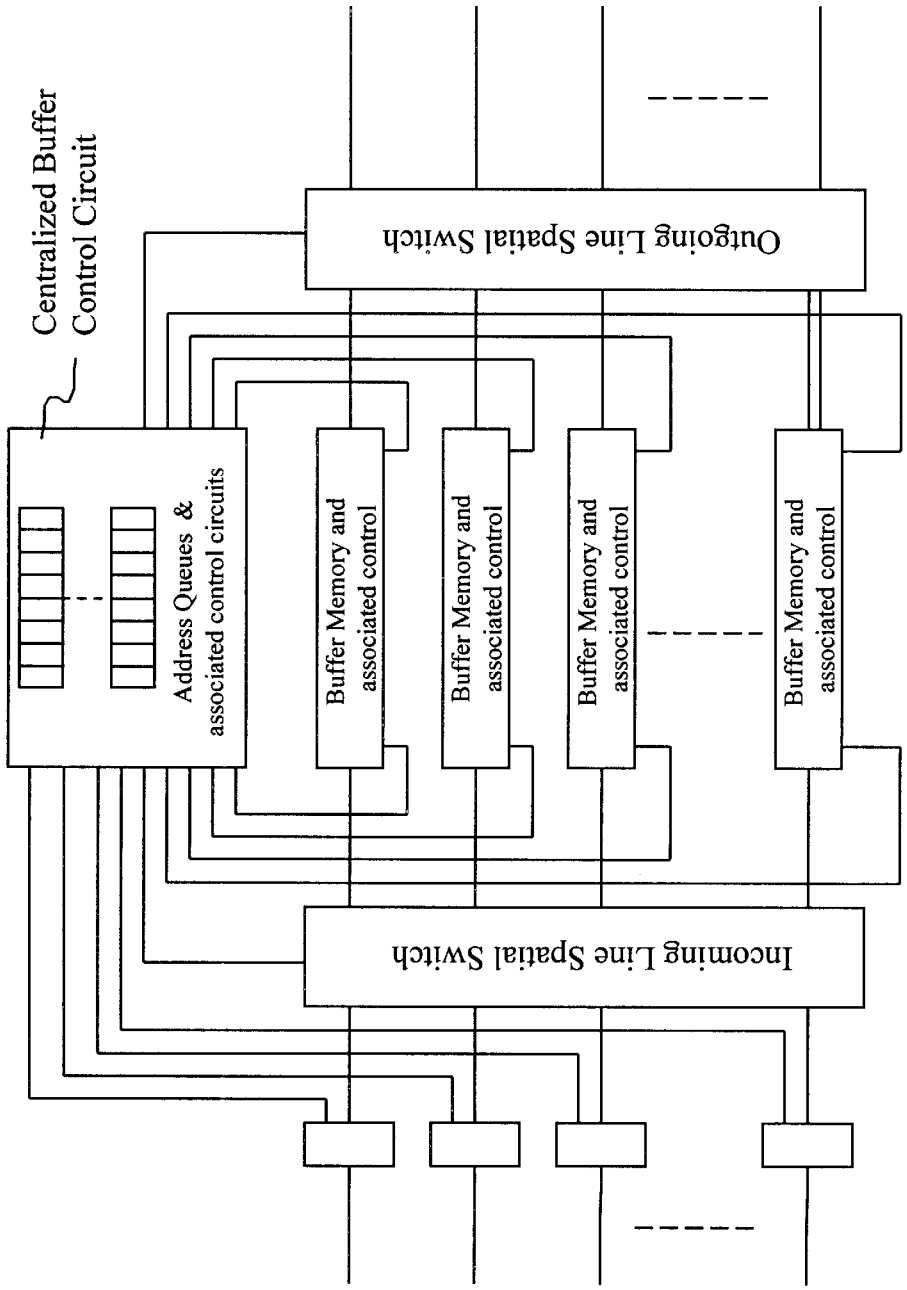
Fig. 1: Prior Art

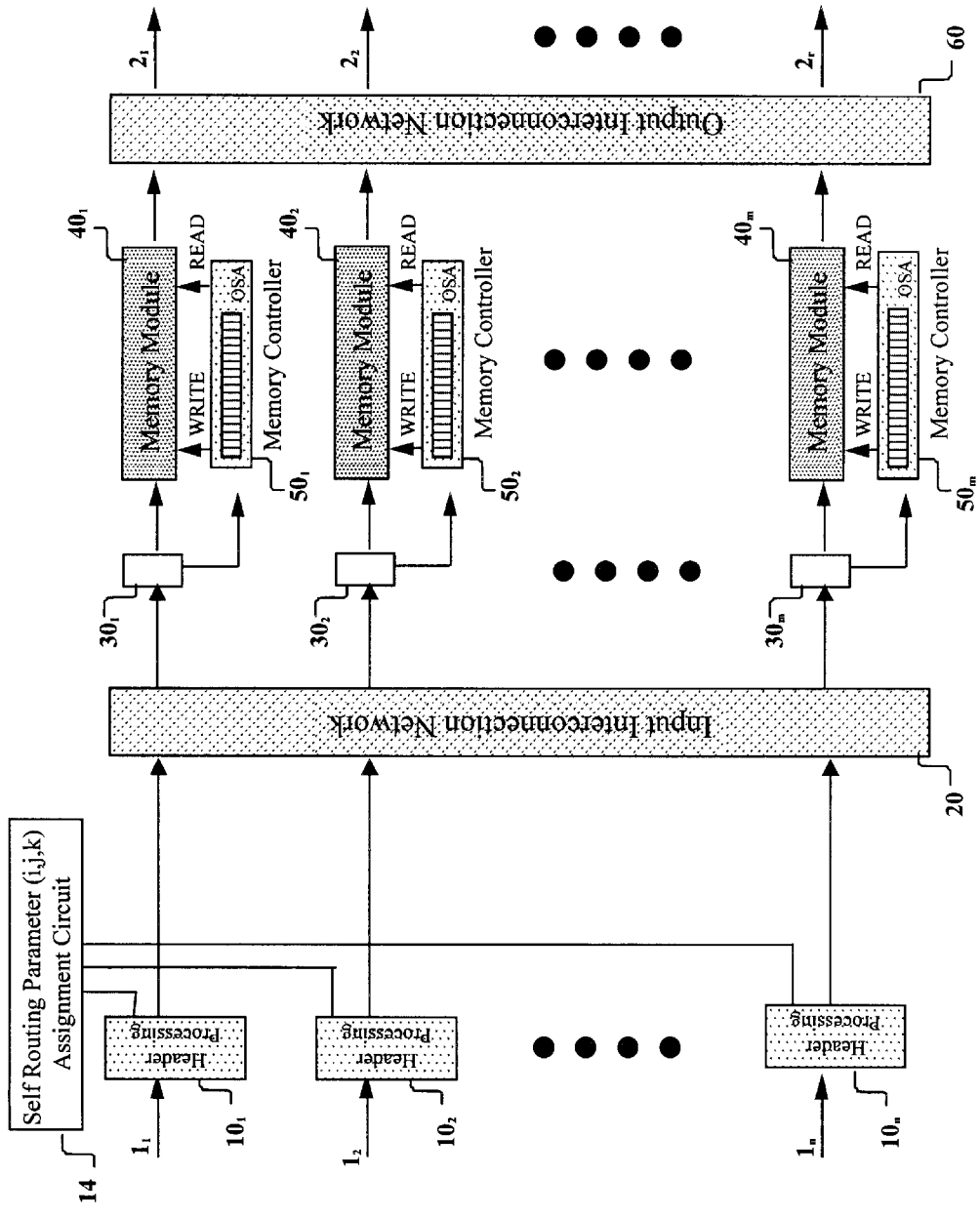
Fig. 2: The New ATM Switch with Decentralized Pipeline Control

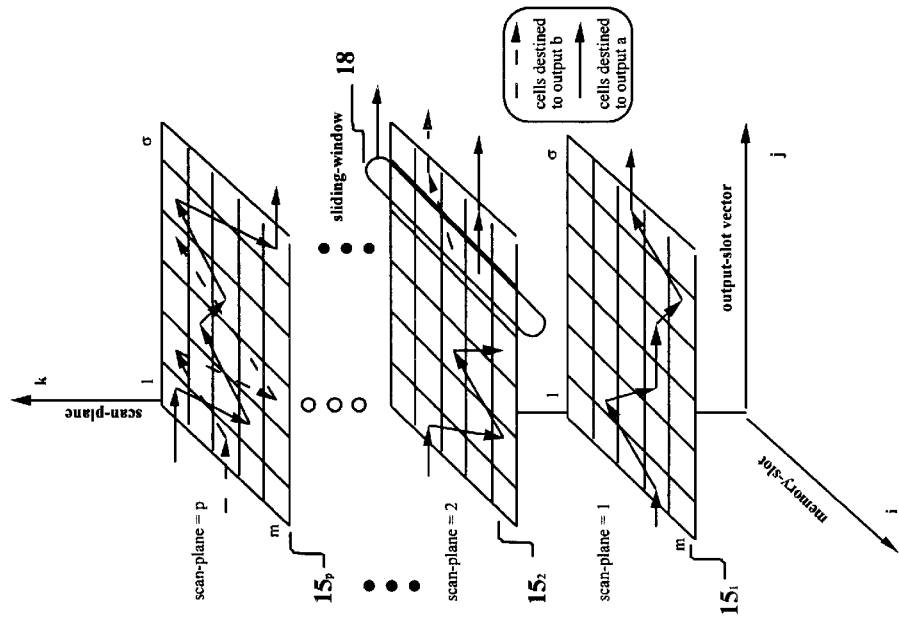
Fig 3: 3-Dimentional Buffer Space

Fig. 4: Traversal of Sliding-Window in global buffer space
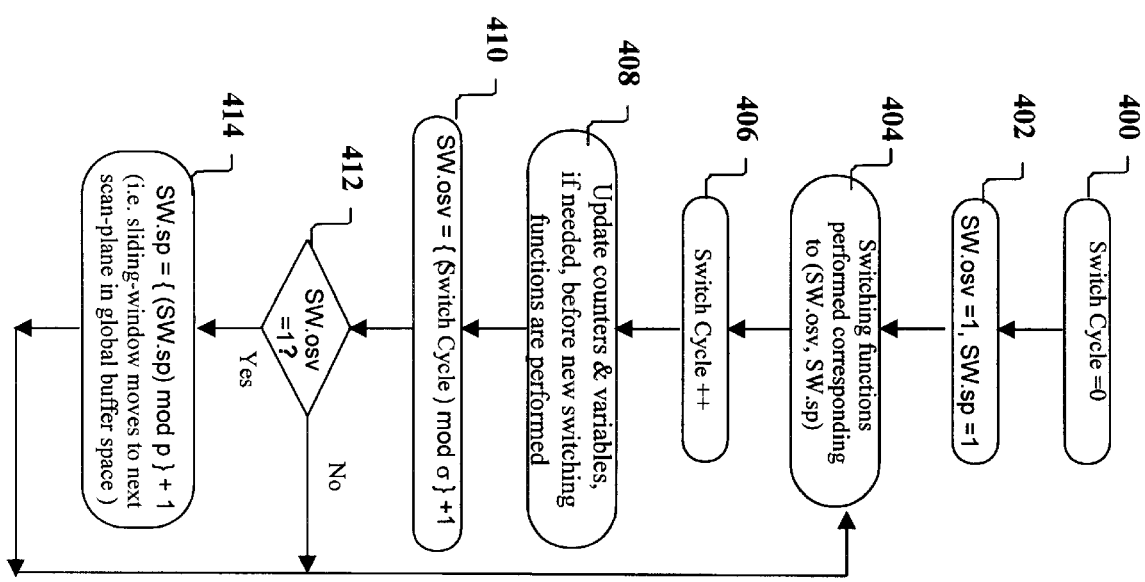

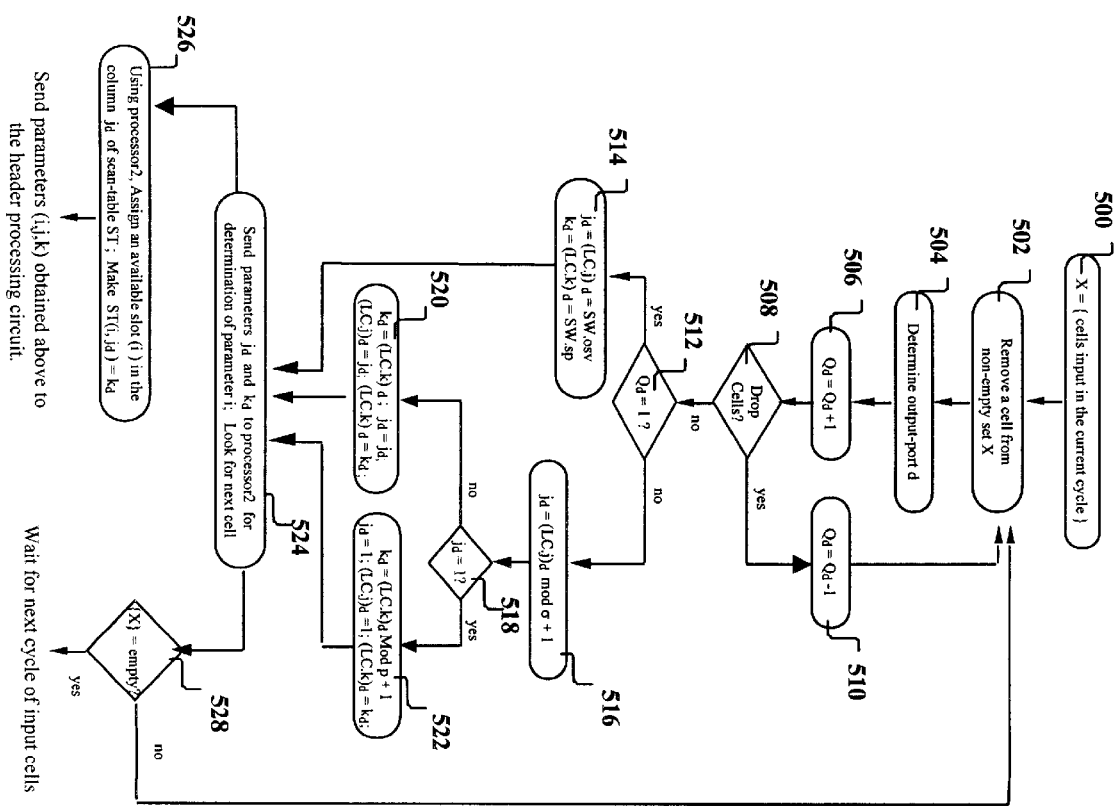
Fig 5: Assignment of Self-Routing Parameters (i,j,k)

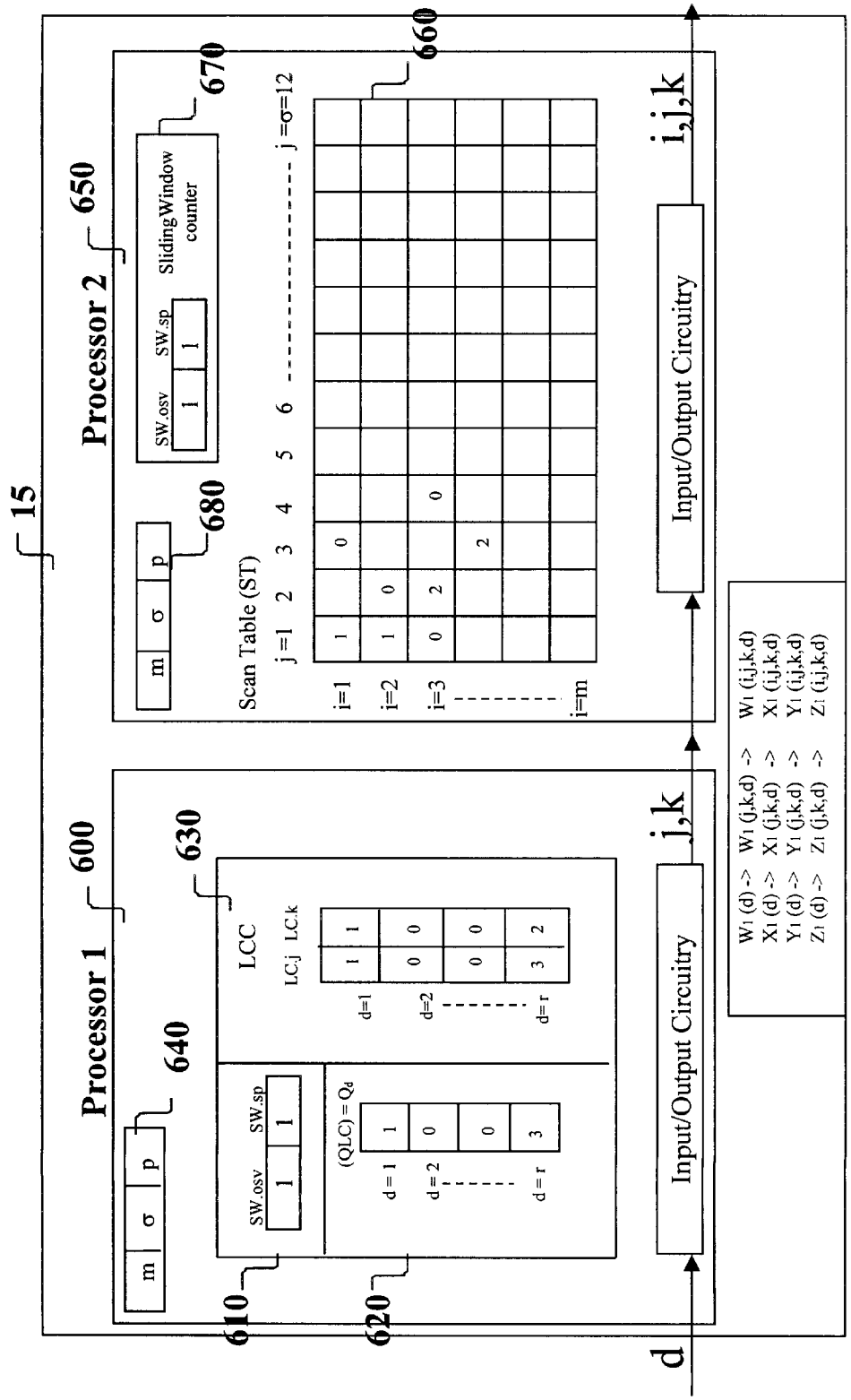
Fig.6: Self-Routing Parameter Assignment Circuit
Assignment of (i,j,k) based on the destination 'd' of incoming cells

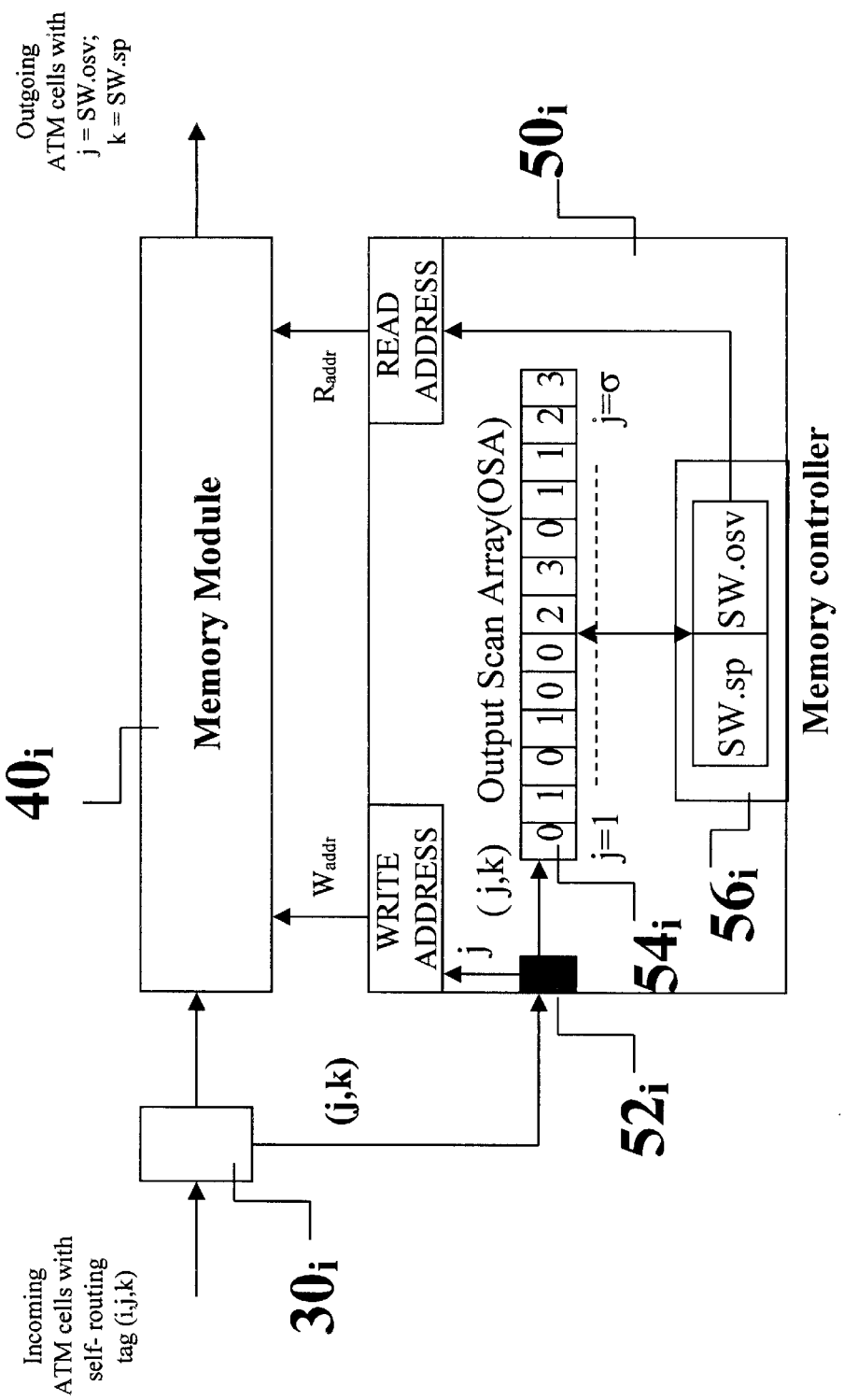
Fig.7: Architecture of the Sliding-Window Memory Controller

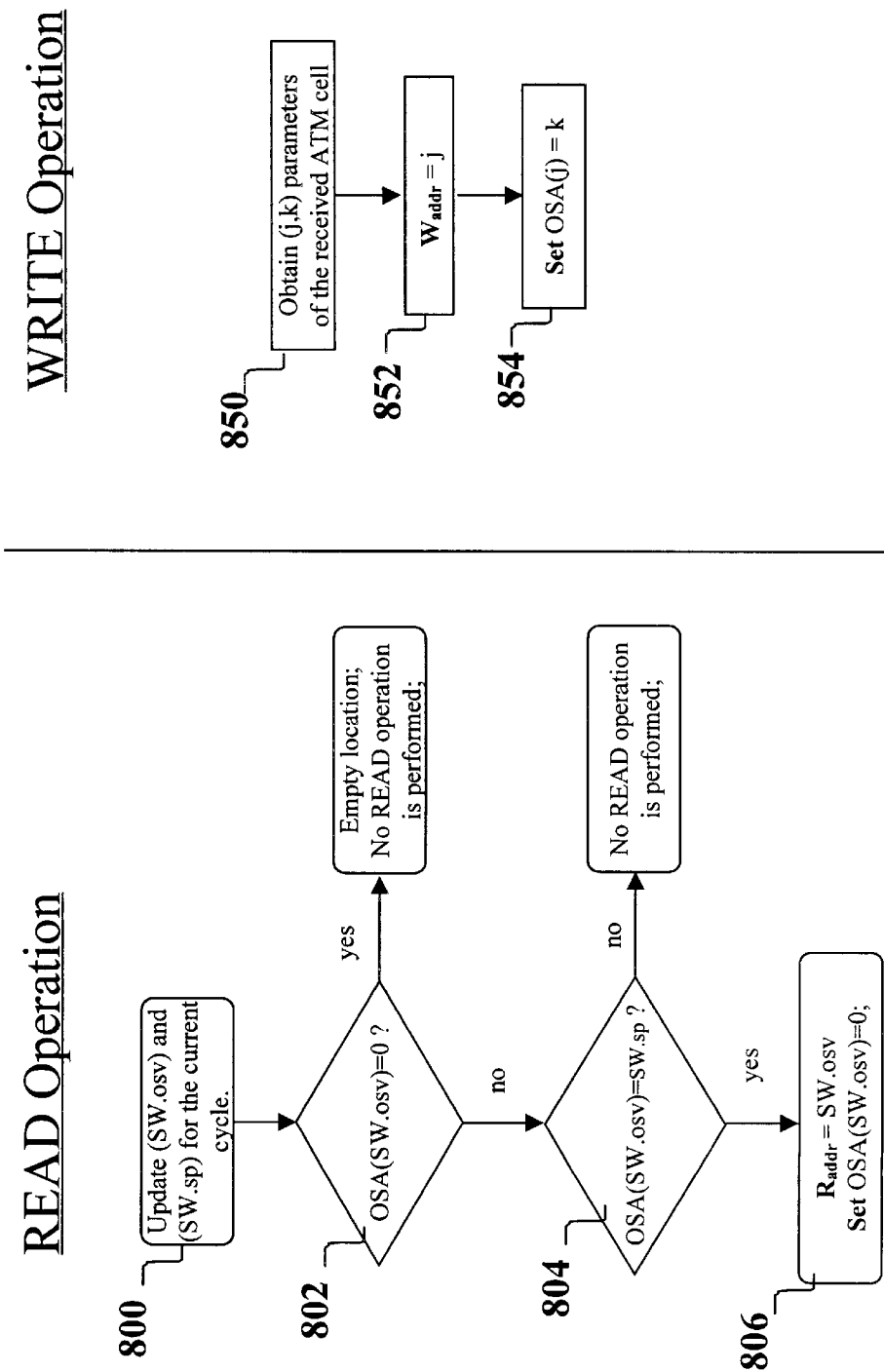
Fig. 8: WRITE and READ operations performed by the memory controller

Fig. 9 : Pipeline Operation of the Switch

| | t=1 | t=2 | t=3 | t=4 | t=5 | t=6 | t=7 | | | | | | t |
|---|---|---|---|---|---|---|---|---|---|---|---|---|---|
| Stage 1 (i,j,k = ?) | X | X | X | X | X | X | X | X | X | X | X | X | |
| Stage 2 Input Interconnection network | | X | X | X | X | X | X | X | X | X | X | | |
| Stage 3 WRITE ATM-cells to memory modules | | | X | X | X | X | X | X | X | X | | | |
| Stage 4 READ ATM-cells from memory modules | | | | X | X | X | X | X | X | | | X | |
| Stage 5 Output Interconnection network | | | | | X | X | X | X | X | X | X | X | X |

Switch Cycle = T

Pipeline Cycle = t

Fig. 10: Operation of an example 4x4 ATM Switch

| INPUT PORTS ---> | W | X | Y | Z |
|---|---|---|---|---|
| A: INPUT CYCLE 1 ---> | 1 | 4 | 4 | 4 |
| B: INPUT CYCLE 2 ---> | 3 | 2 | 4 | 3 |
| C: INPUT CYCLE 3 ---> | 3 | 2 | 4 | 3 |
| D: INPUT CYCLE 4 ---> | 4 | 4 | 4 | 4 |
| E: INPUT CYCLE 5 ---> | 1 | 4 | 4 | 2 |
| F: INPUT CYCLE 6 ---> | 3 | 3 | 2 | 1 |
| G: INPUT CYCLE 7 ---> | 4 | 4 | 4 | 4 |
| H: INPUT CYCLE 8 ---> | 4 | 4 | 4 | 4 |

Number of input lines = n = 4;

Number of output lines = r = 4;

Input lines are shown as {W,X,Y,Z};

Output line destinations : {1,2,3,4};

Incoming cells are denoted by their output line destination 'd';

Number of ATM cell location in a memory module = σ = 12 ATM cells

Maximum length of a queue for an output port = p.σ = 24 ATM cells

Number of Scan planes employed in the switching system = (p.σ/p) = p = 2

Minimum number of memory modules employed in the system = m = 6

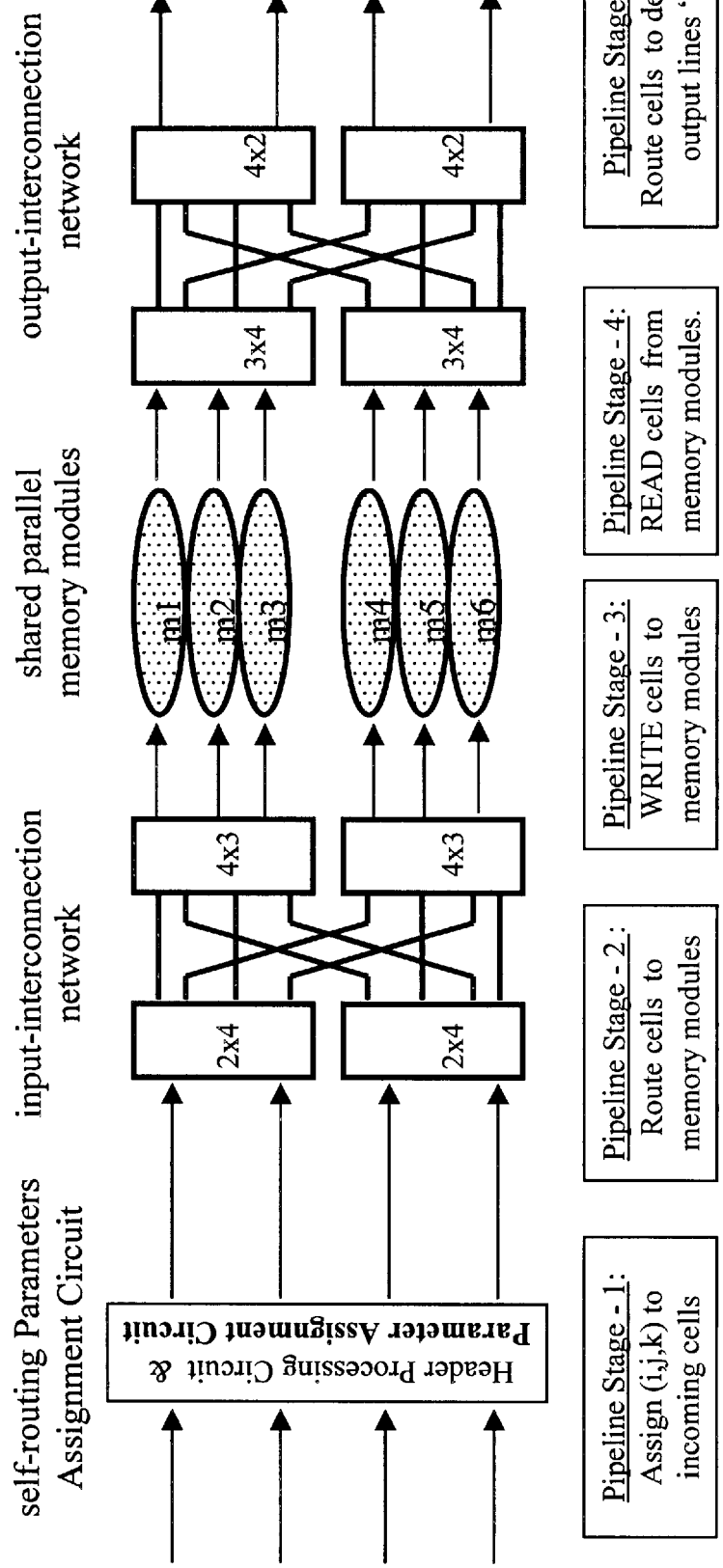
Fig. 11: An example of a 4x4 ATM switch according to the disclosed invention

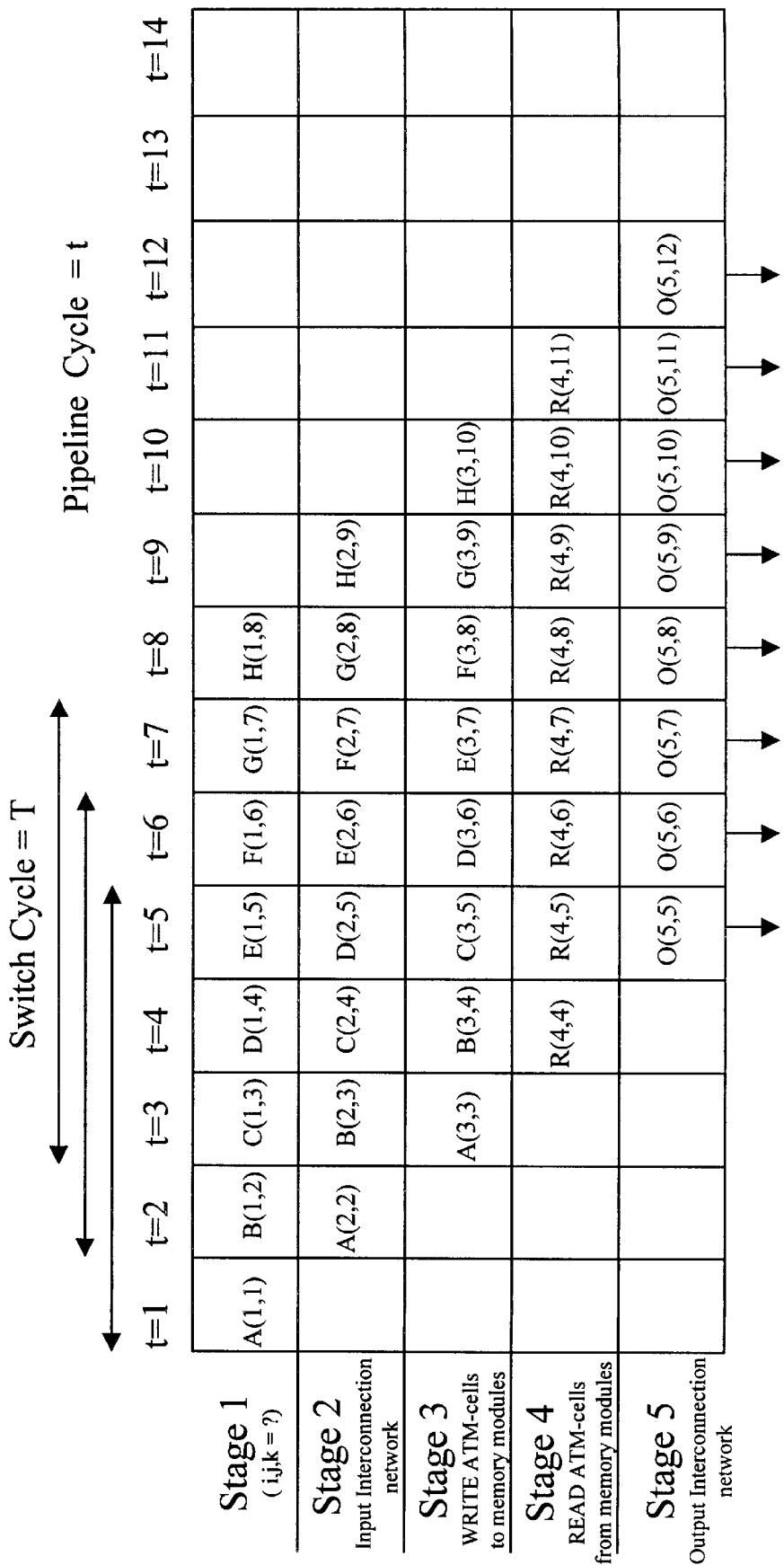

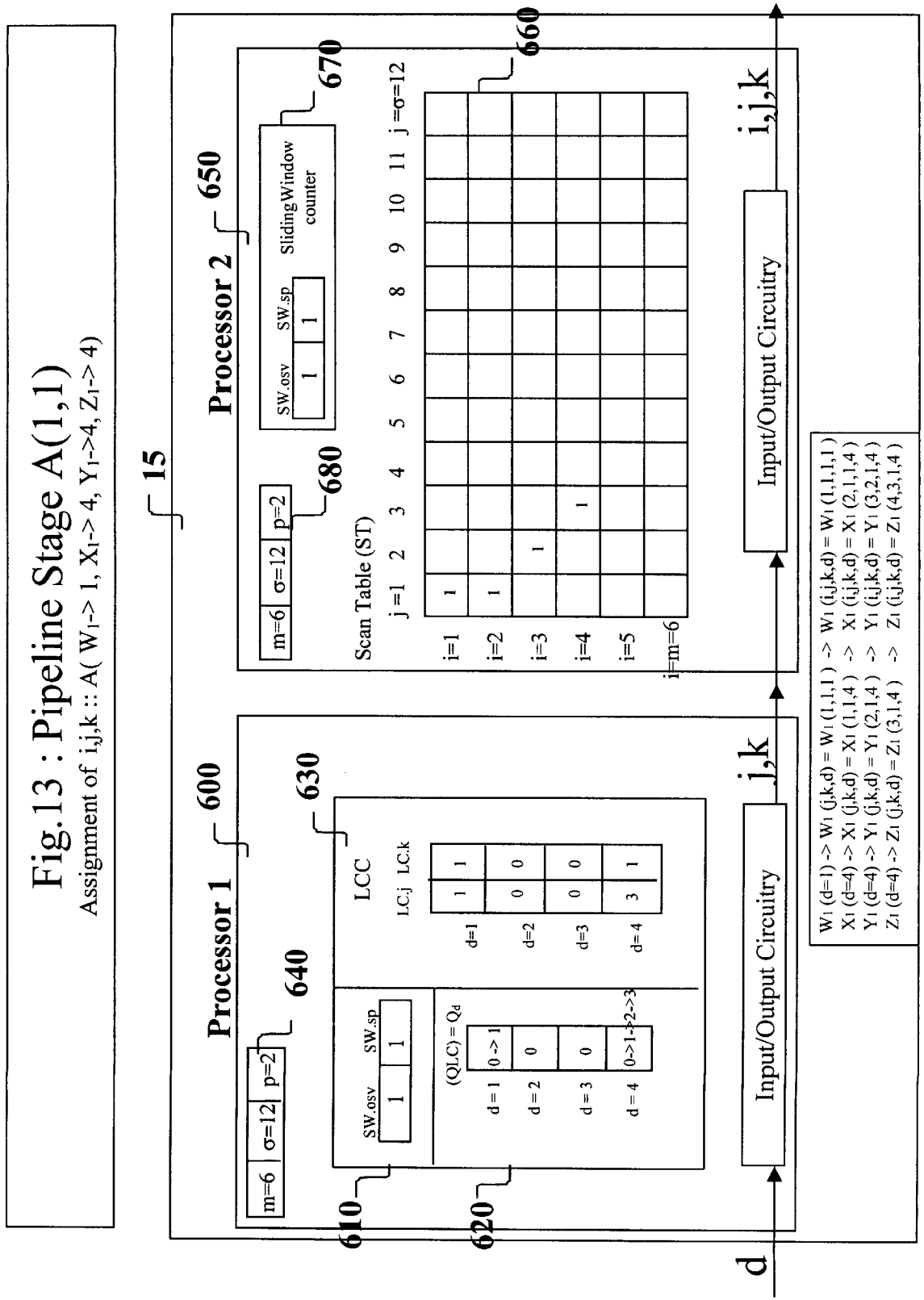

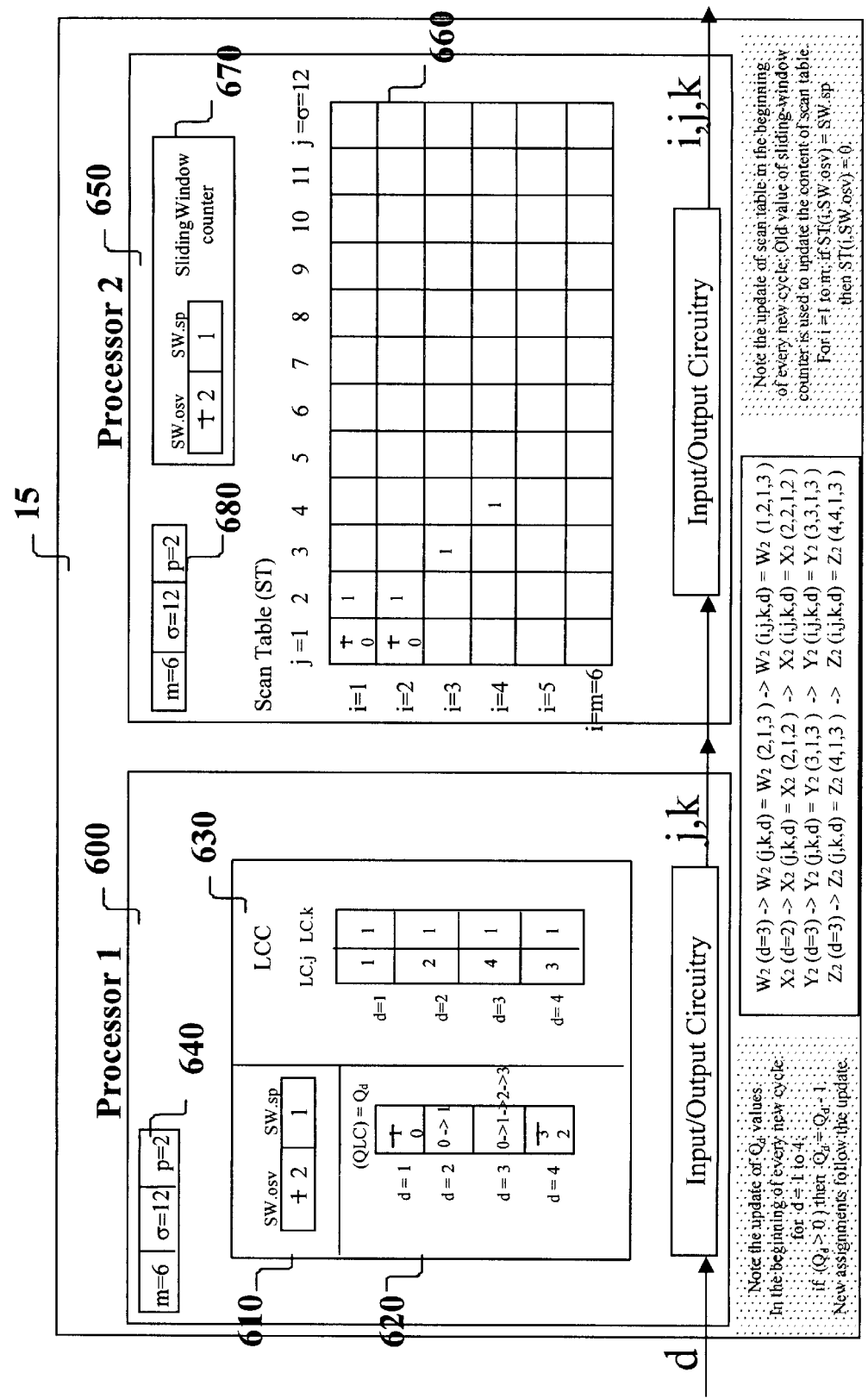

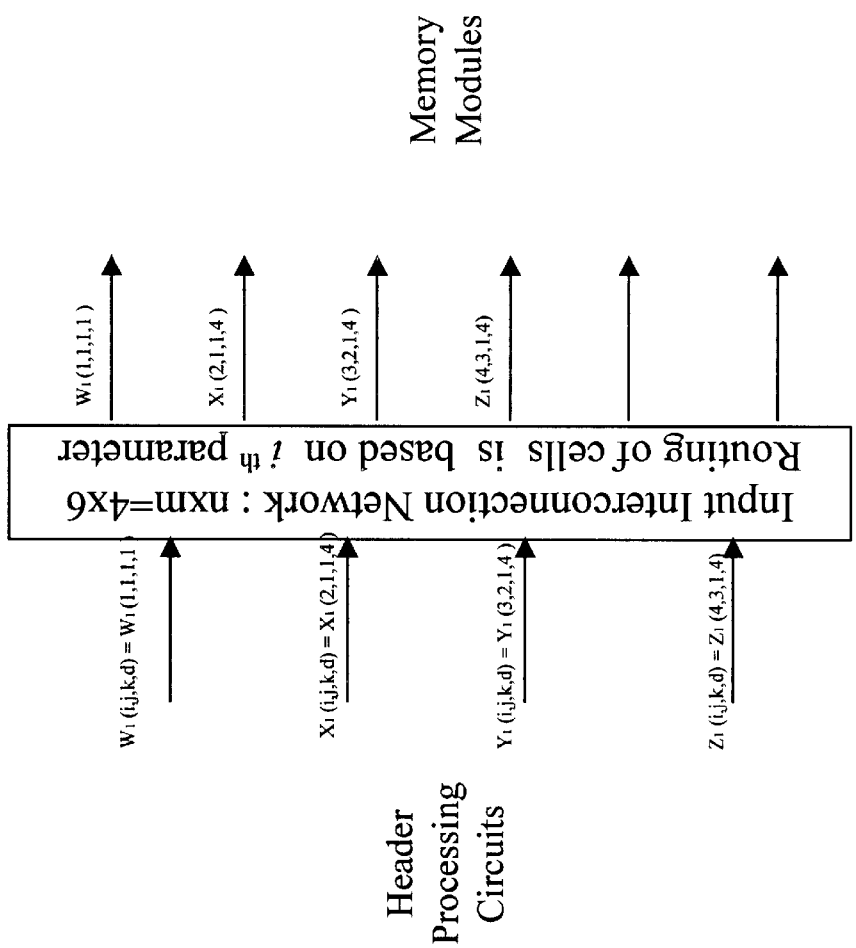
Fig. 14-2: Pipeline stage A(2,2)
Input Interconnection Network: Route cells to assigned memory modules

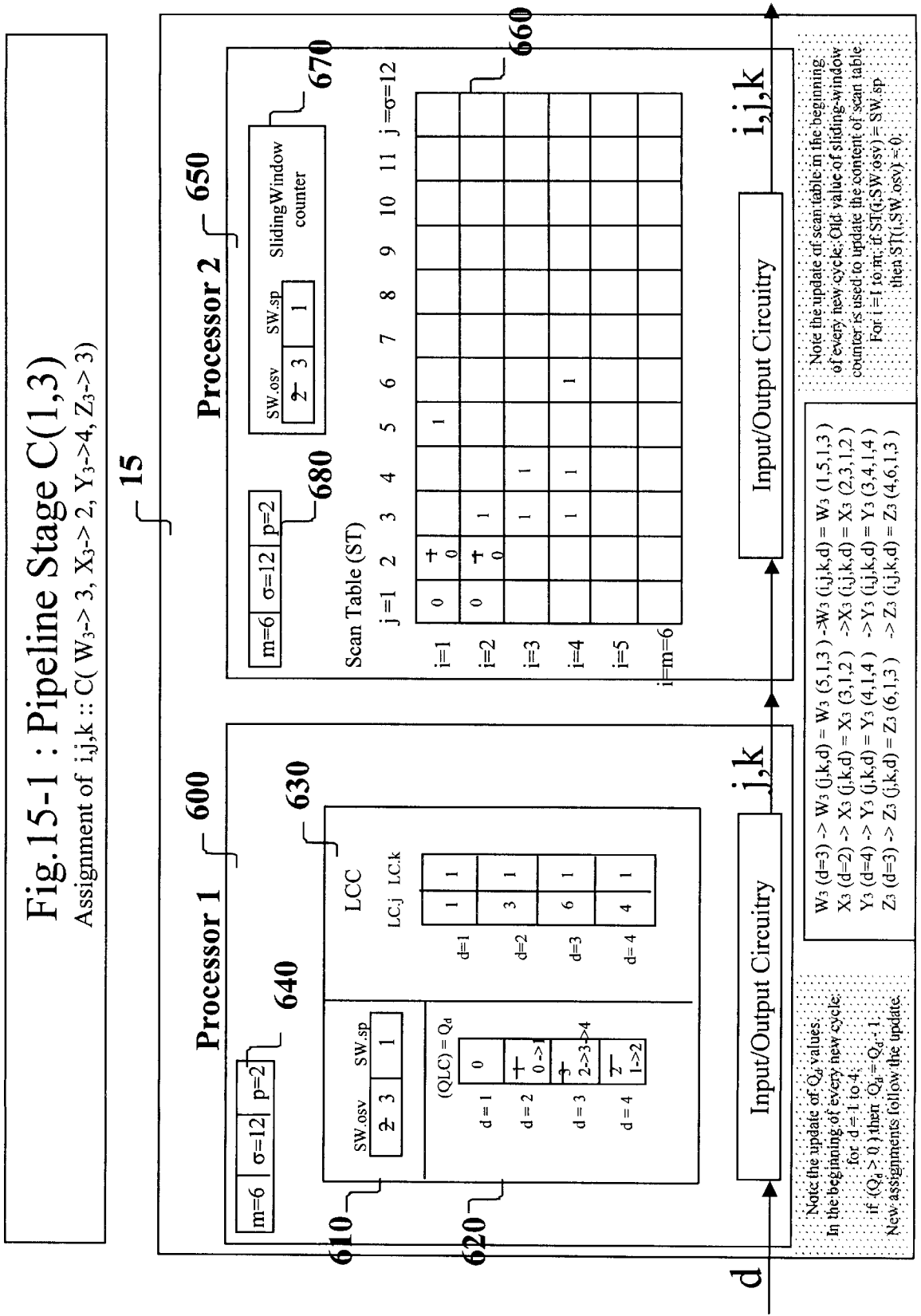

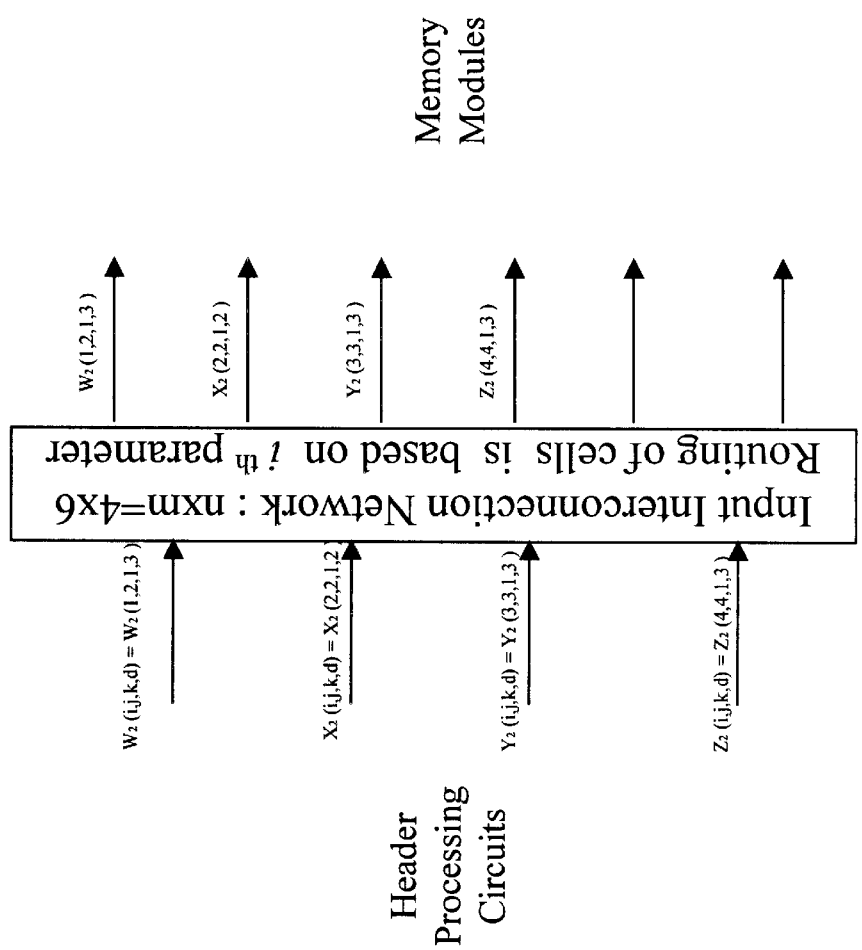
Fig. 15-2: Pipeline stage B(2,3)
Input Interconnection Network: Route cells to assigned memory modules

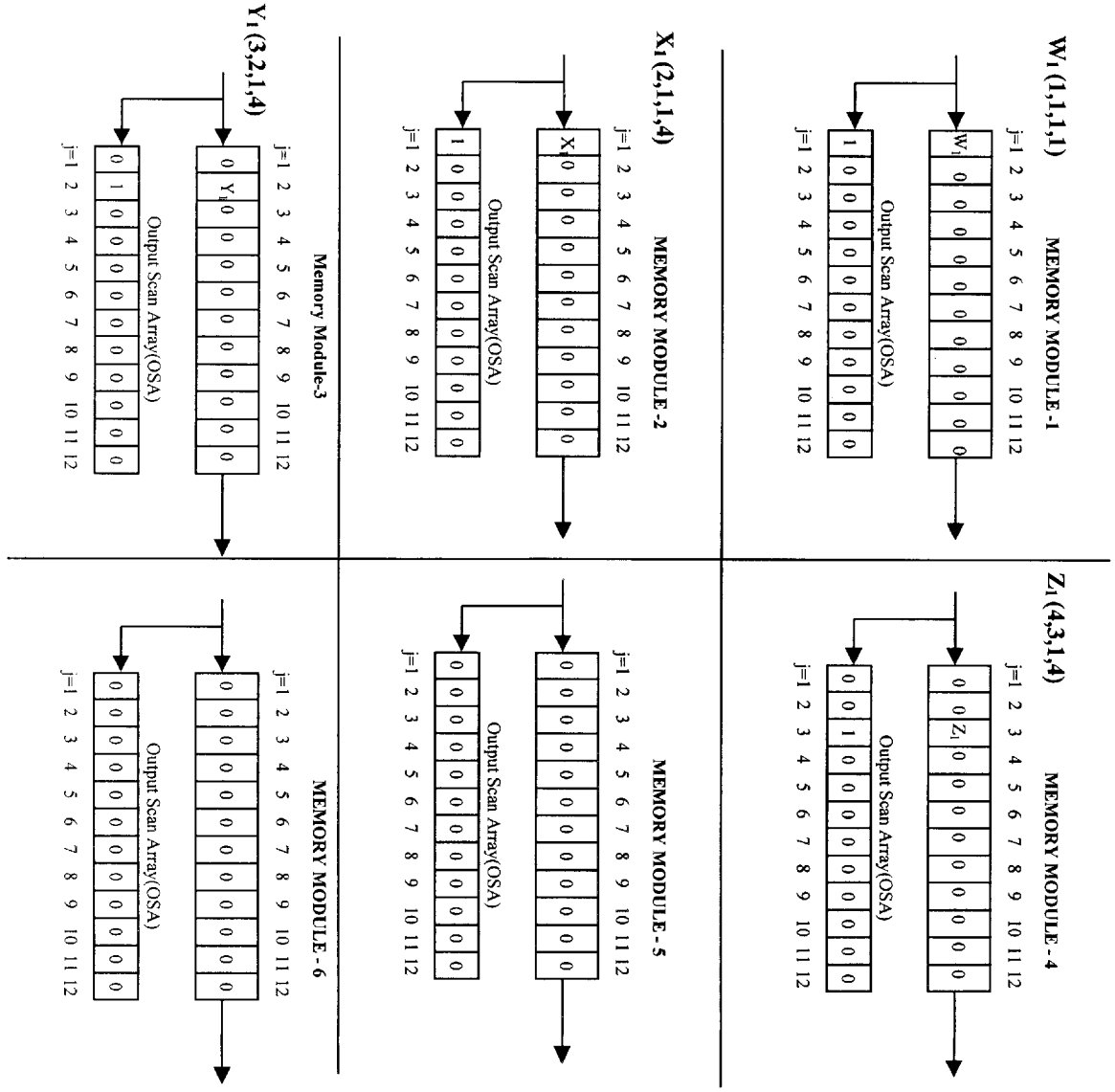

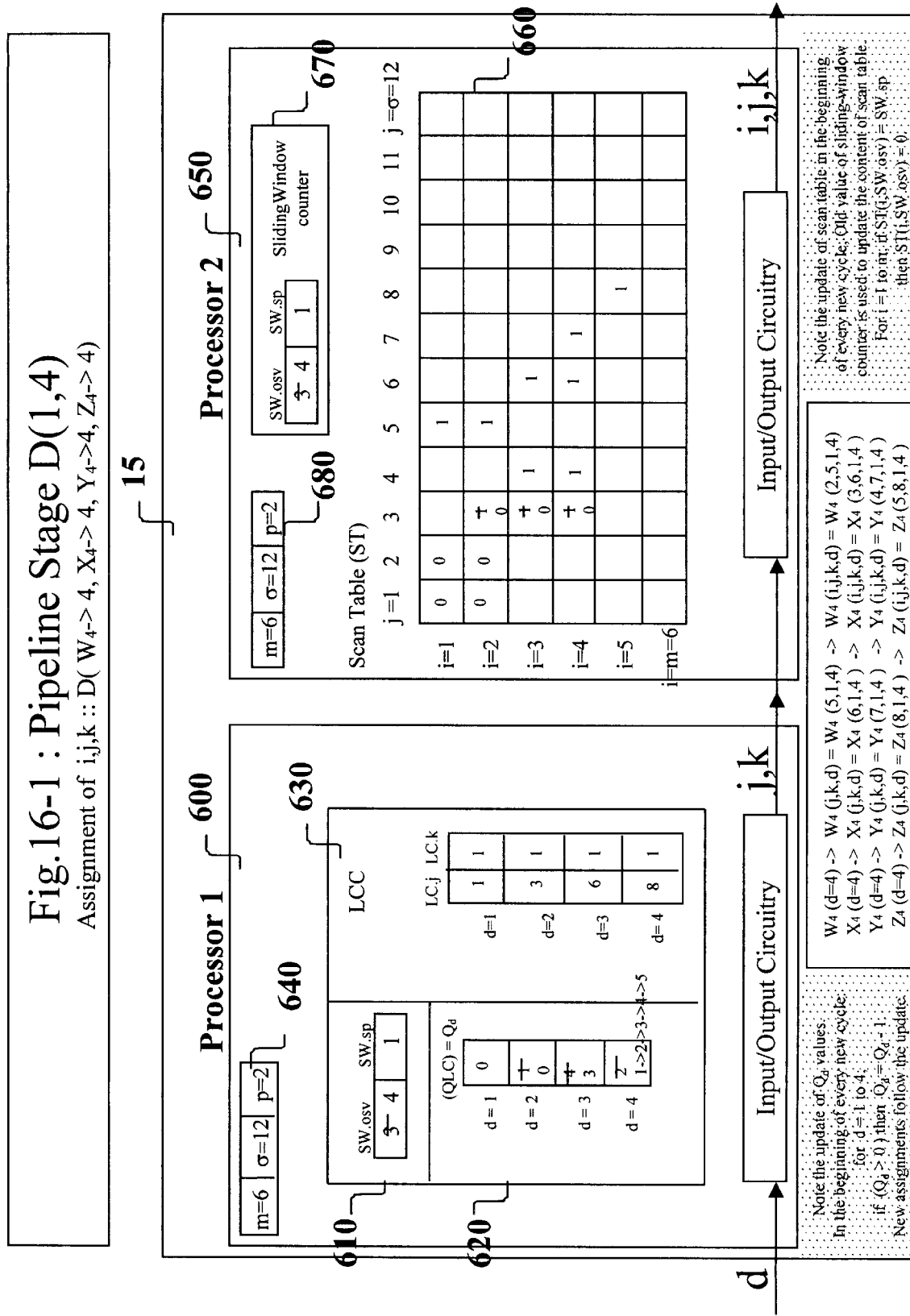

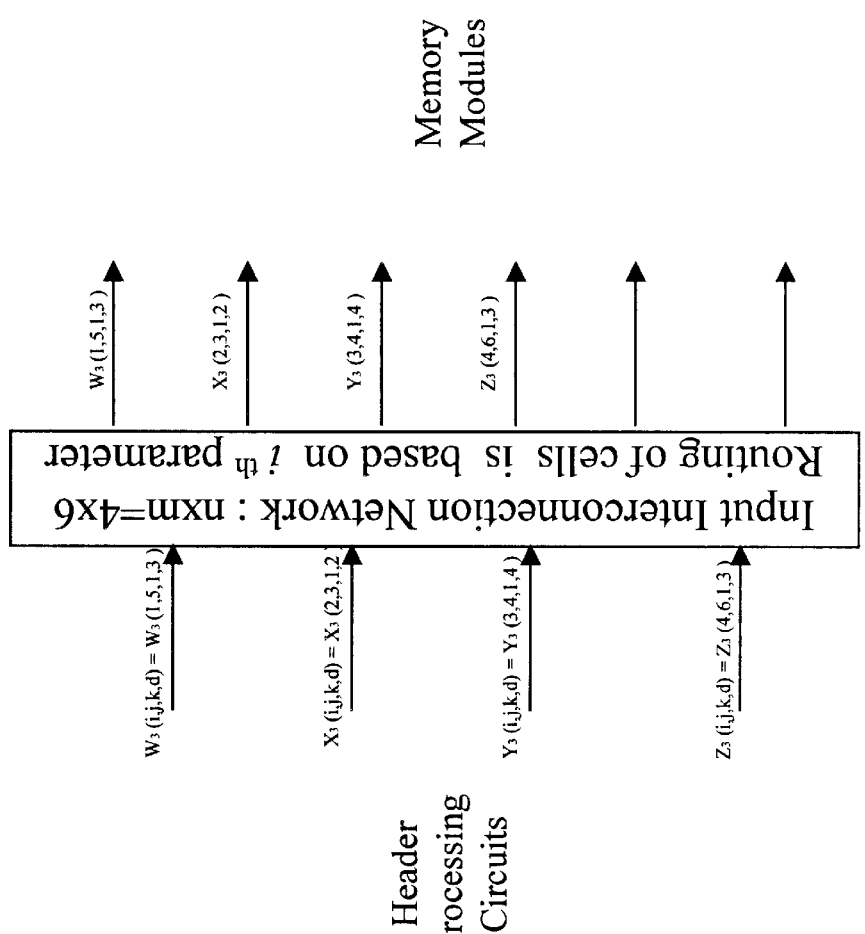
Fig. 16-2: Pipeline stage C(2,4)
Input Interconnection Network: Route cells to assigned memory modules

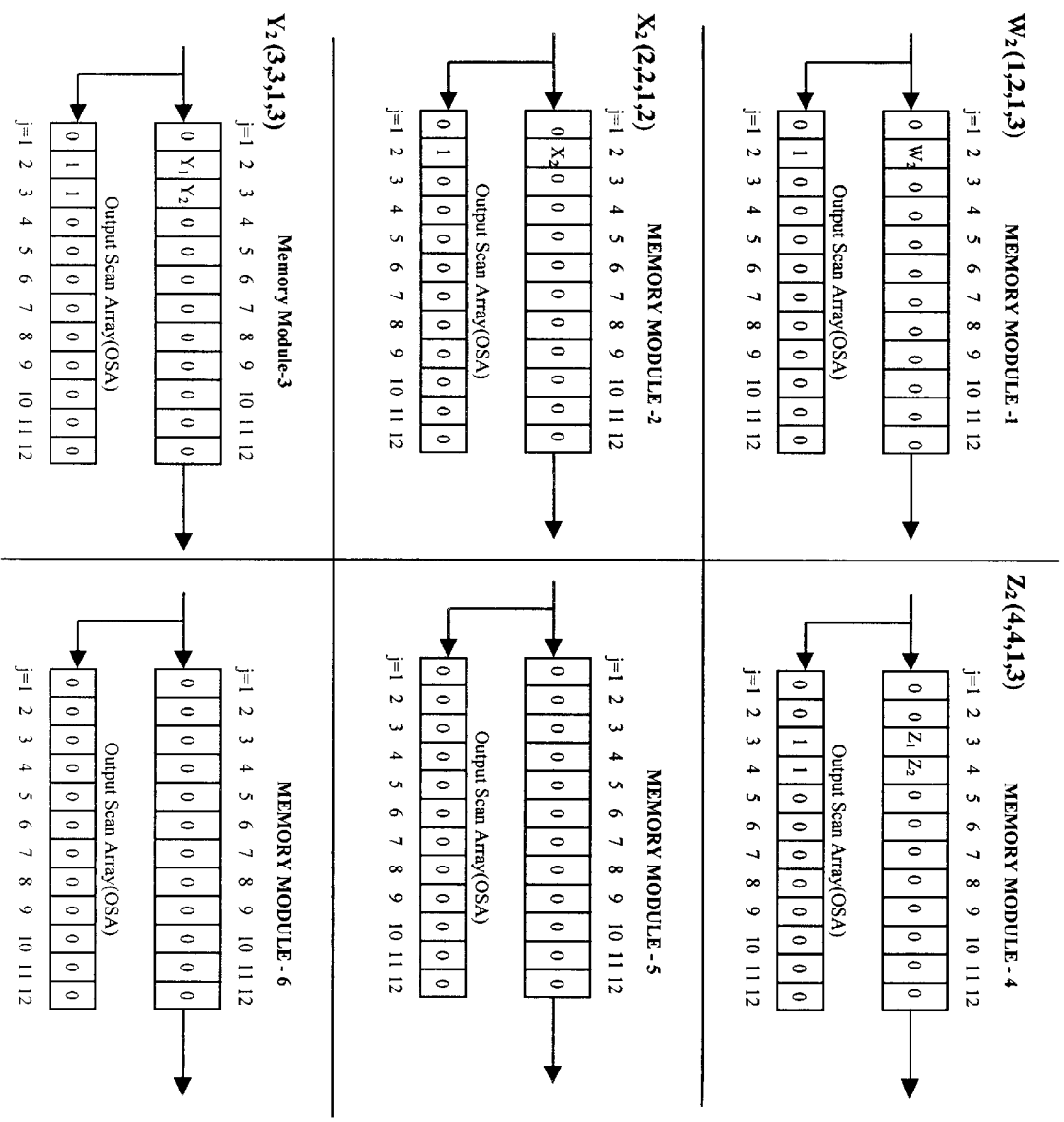

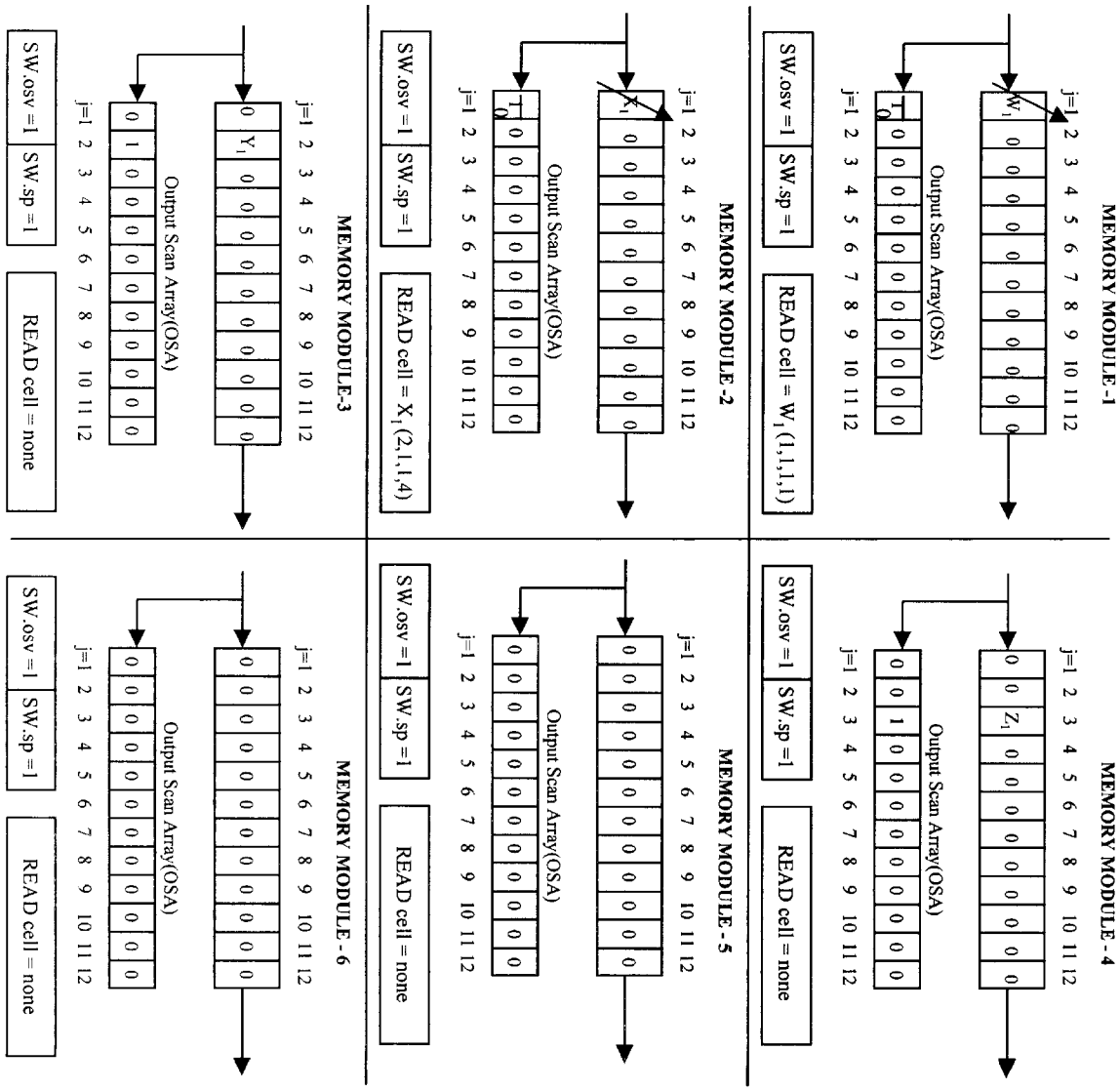
Fig. 16-4: Pipeline Stage R(4,4) :READ
READ ATM cells from memory location (SW.osv) if OSA(SW.osv)=SW.sp;
Set OSA(SW.osv)=0 for Read cells.

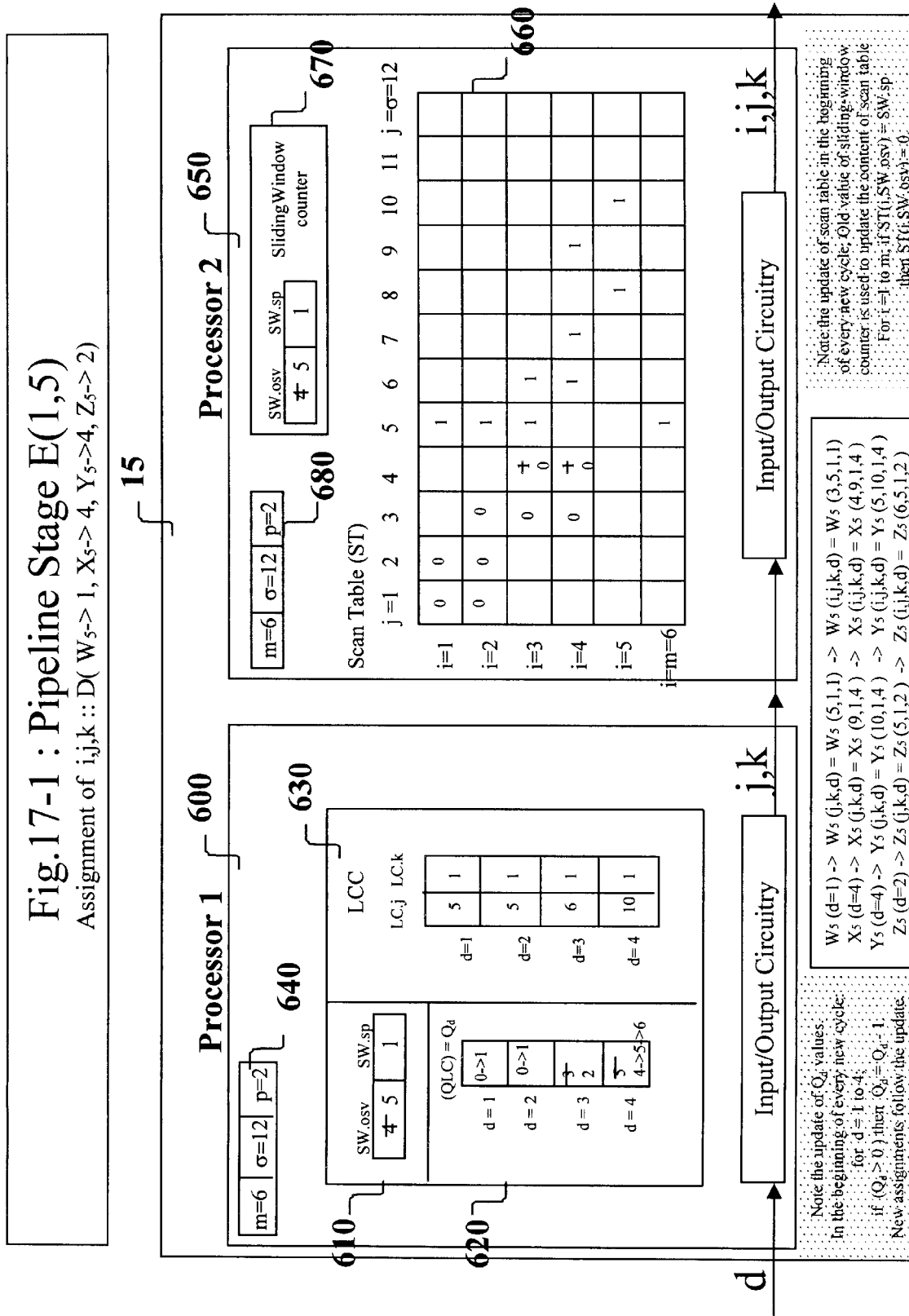

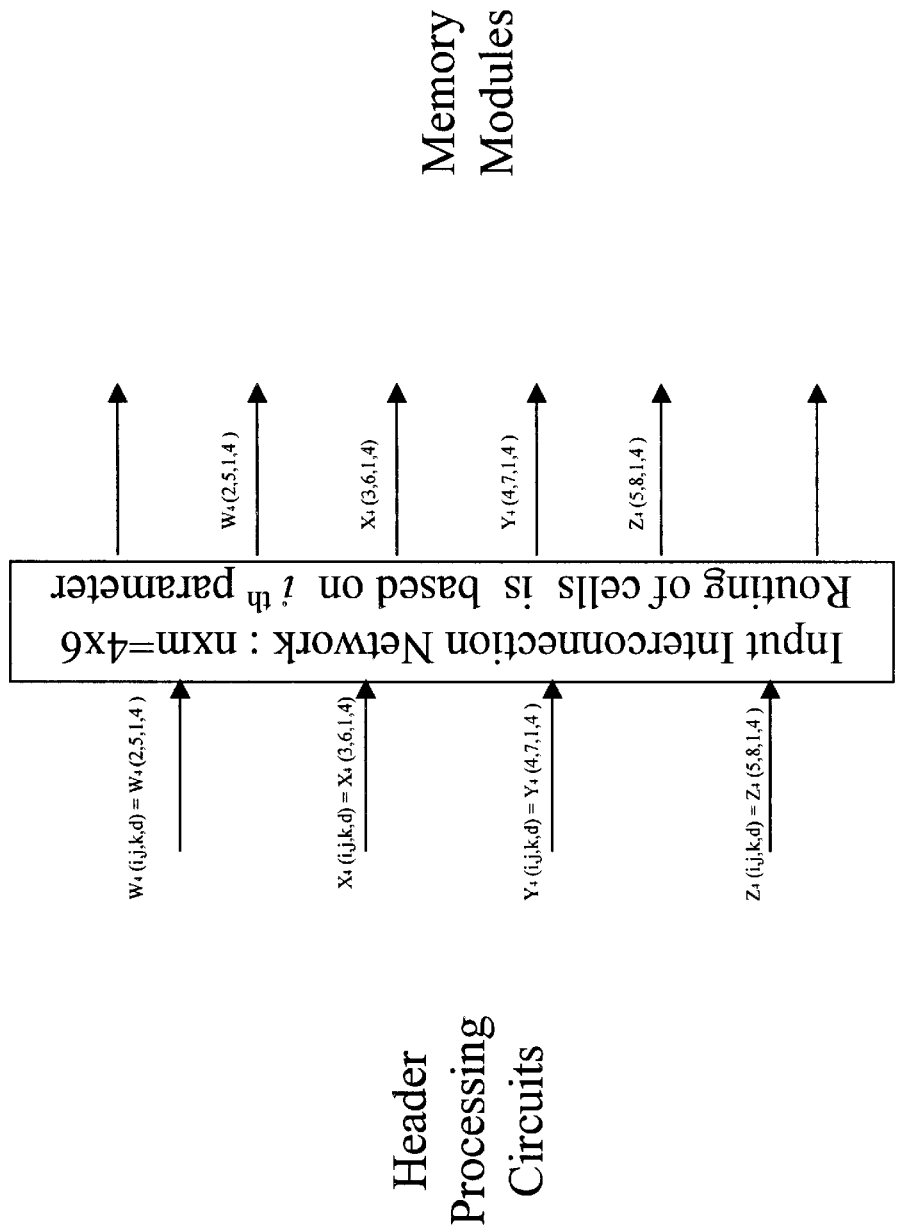

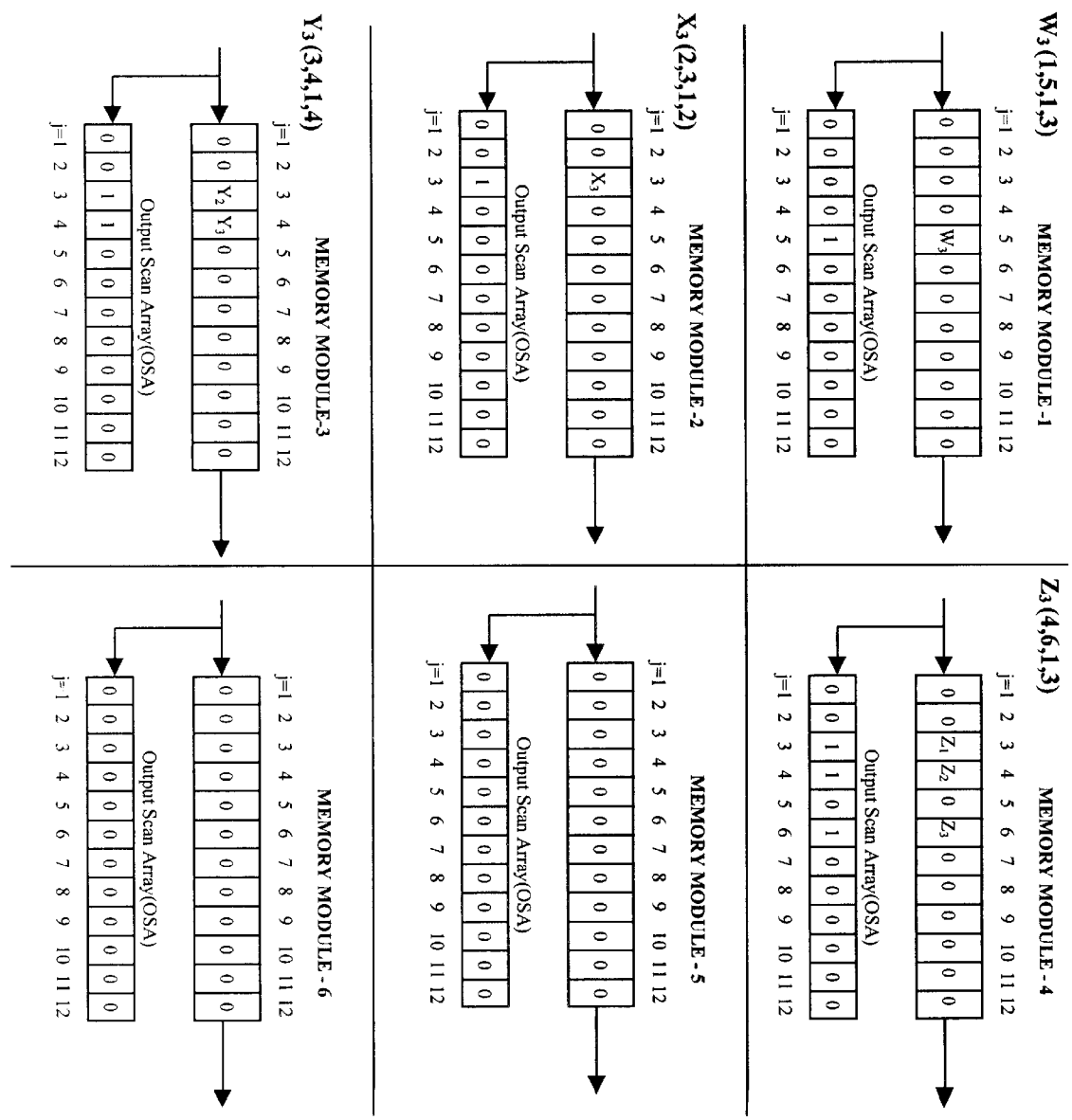

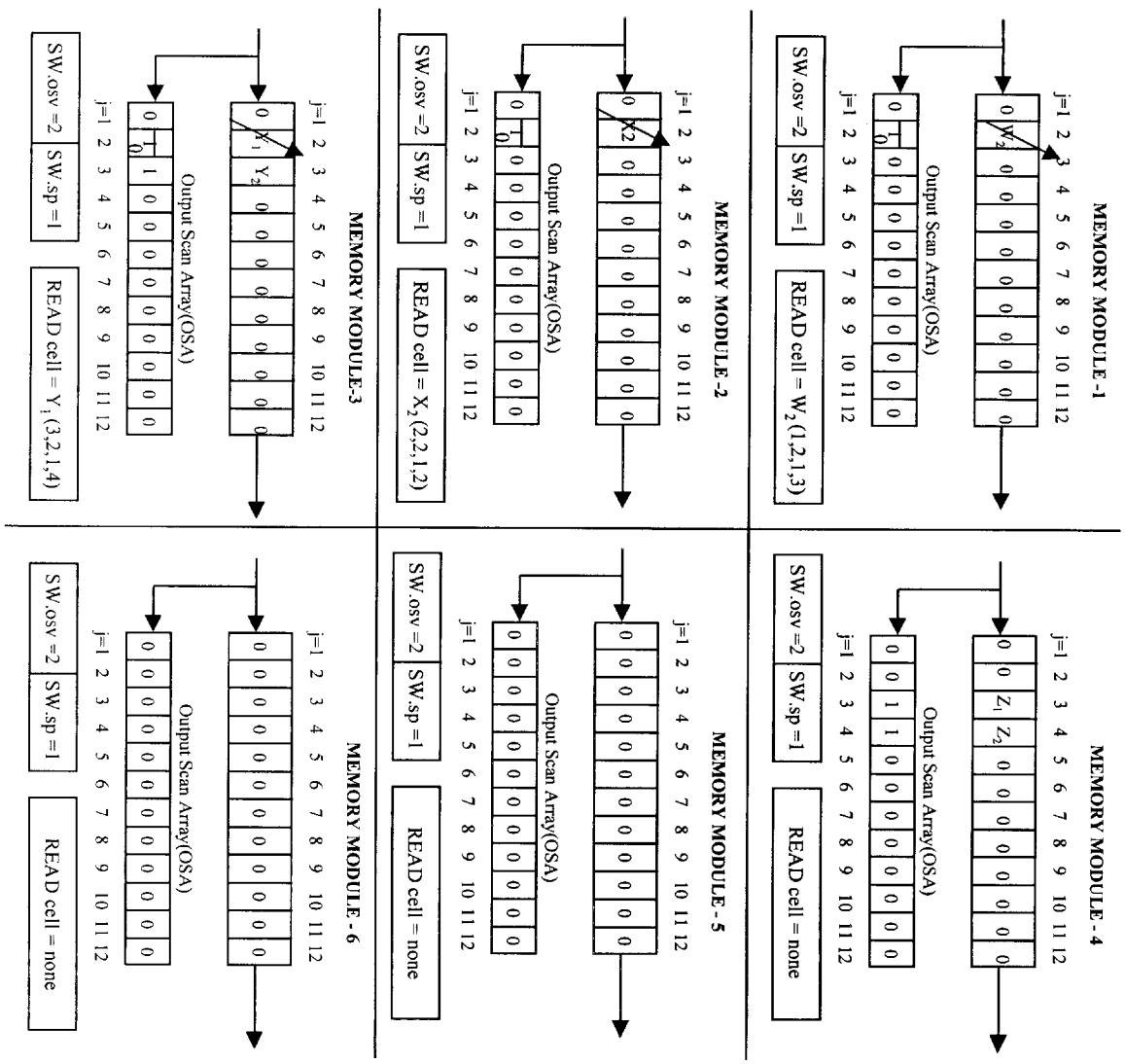

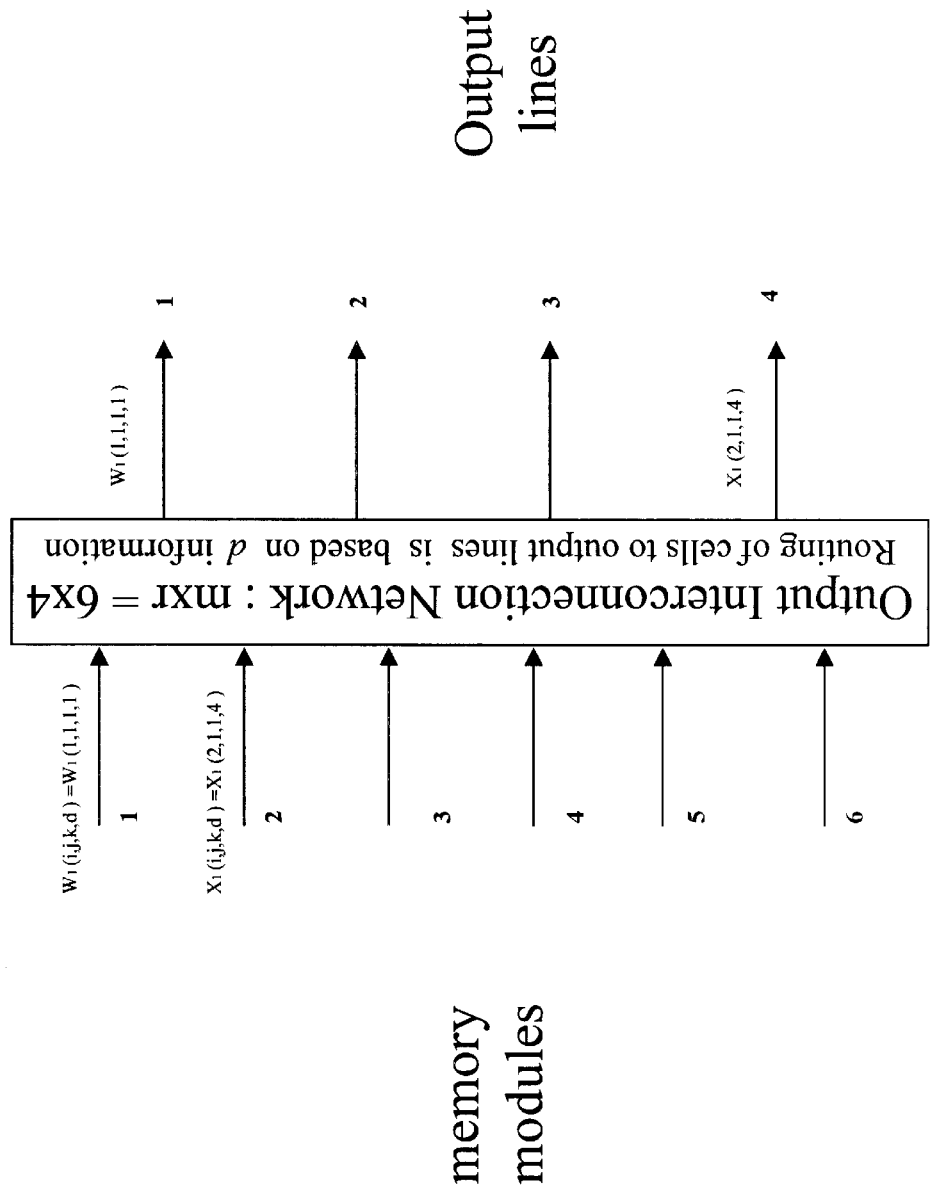
Fig.17-5: Pipeline stage O(5,5)
Output Interconnection Network: Route cells to destined output lines

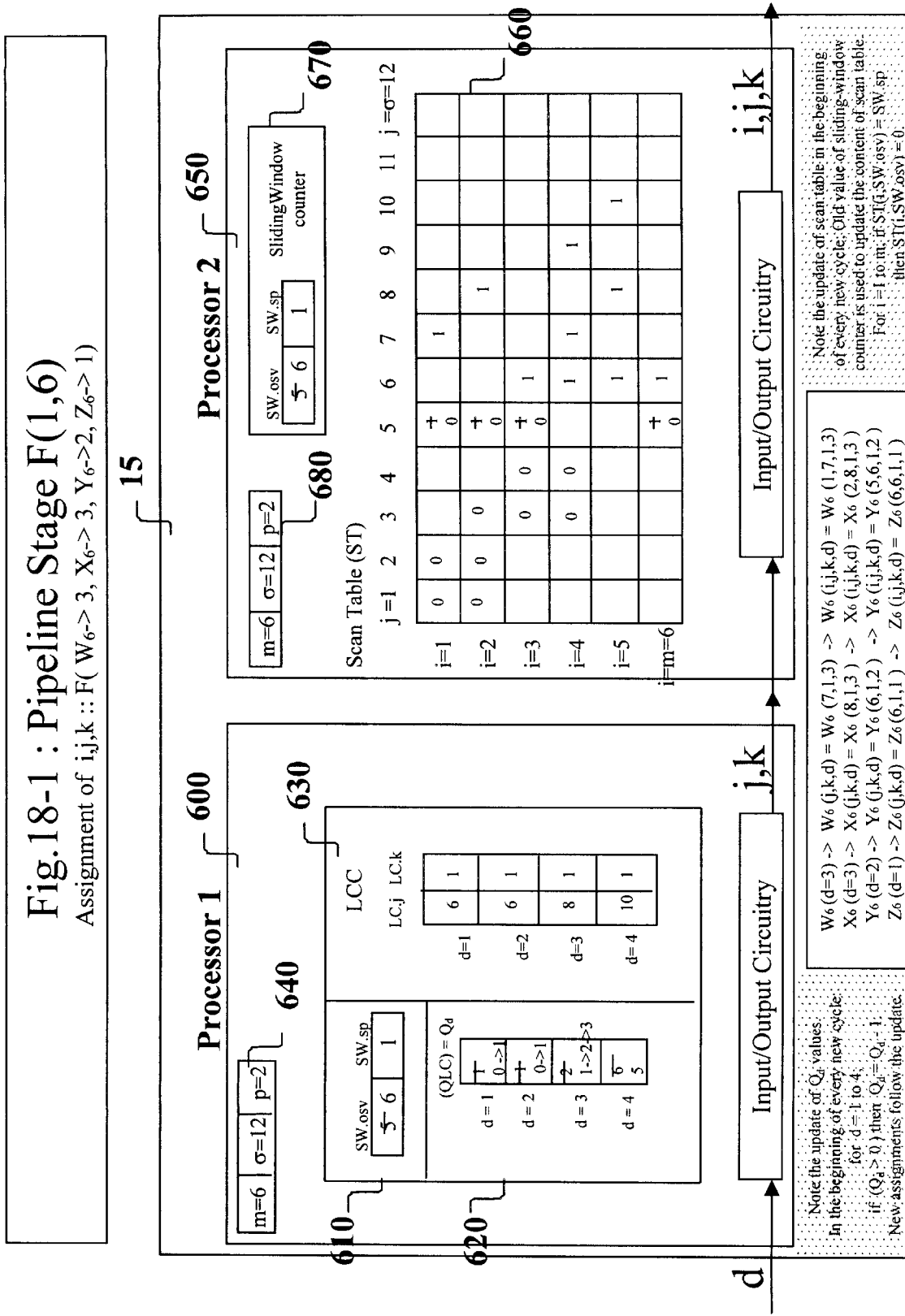
Fig.18-1 : Pipeline Stage F(1,6)
Assignment of i,j,k :: F( $W_6\rightarrow 3$, $X_6\rightarrow 3$, $Y_6\rightarrow 2$, $Z_6\rightarrow 1$ )

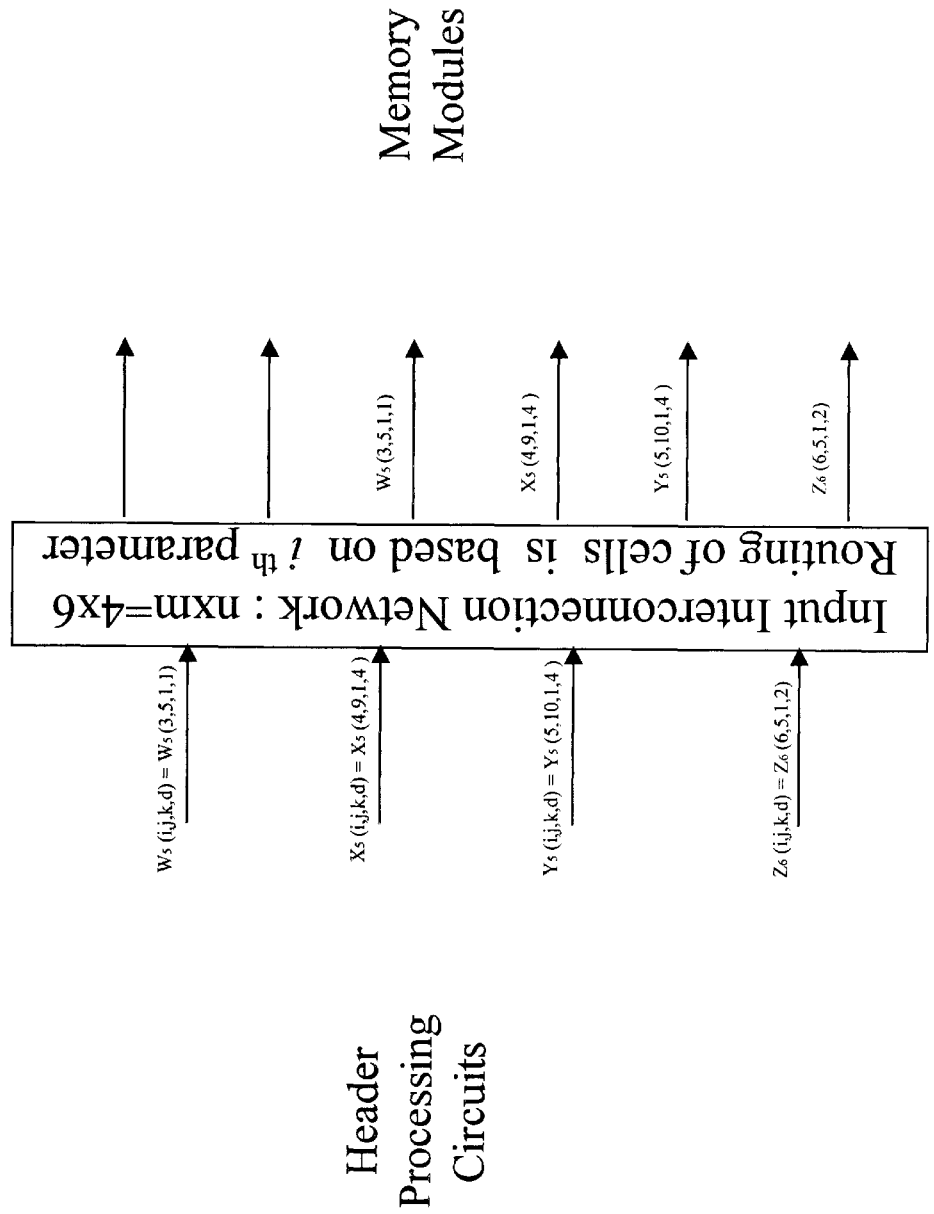

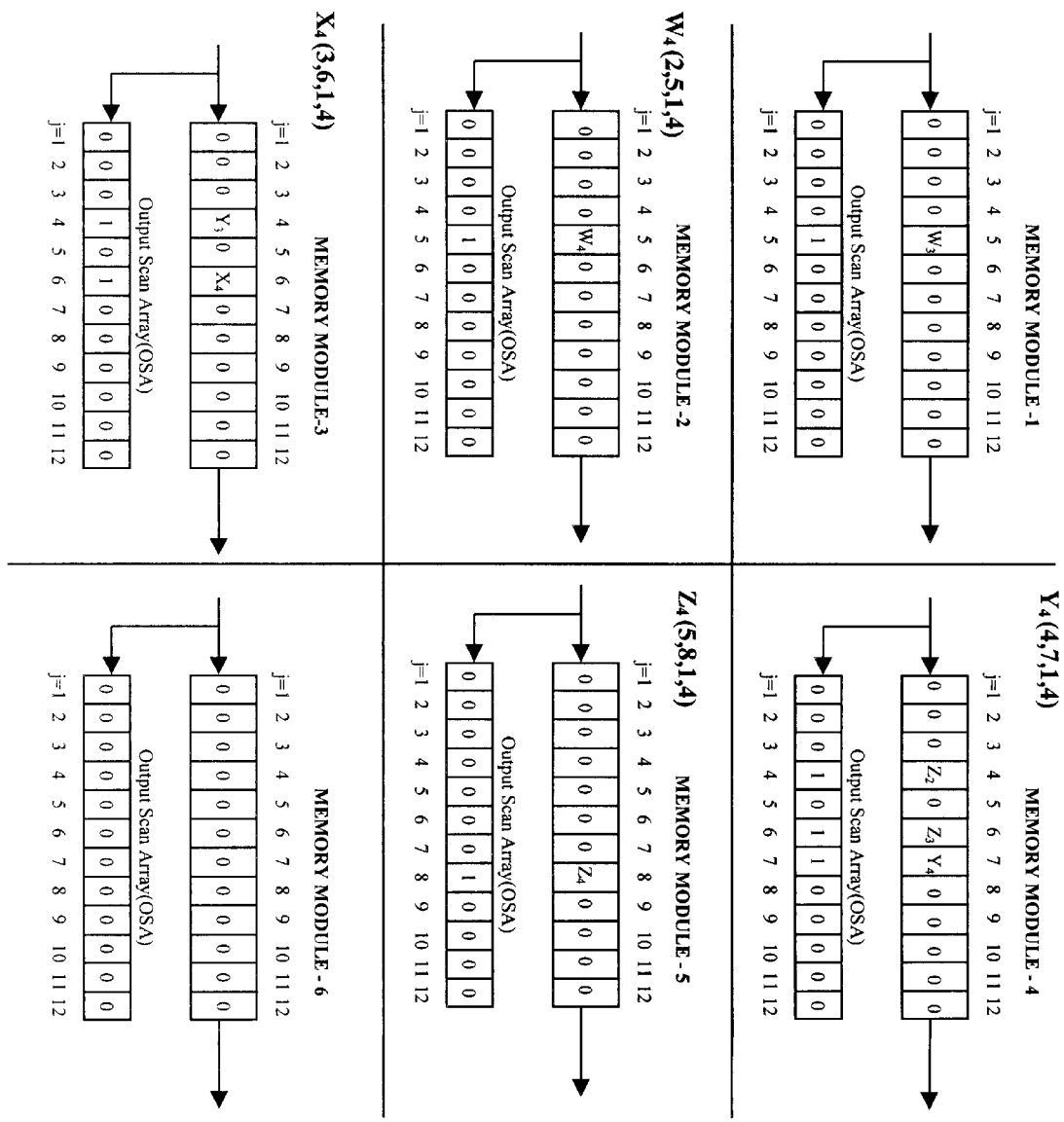
Fig. 18-3: Pipeline Stage D(3,6) : WRITE
WRITE ATM cells in the jth location of ith memory module; Set OSA(j)=k

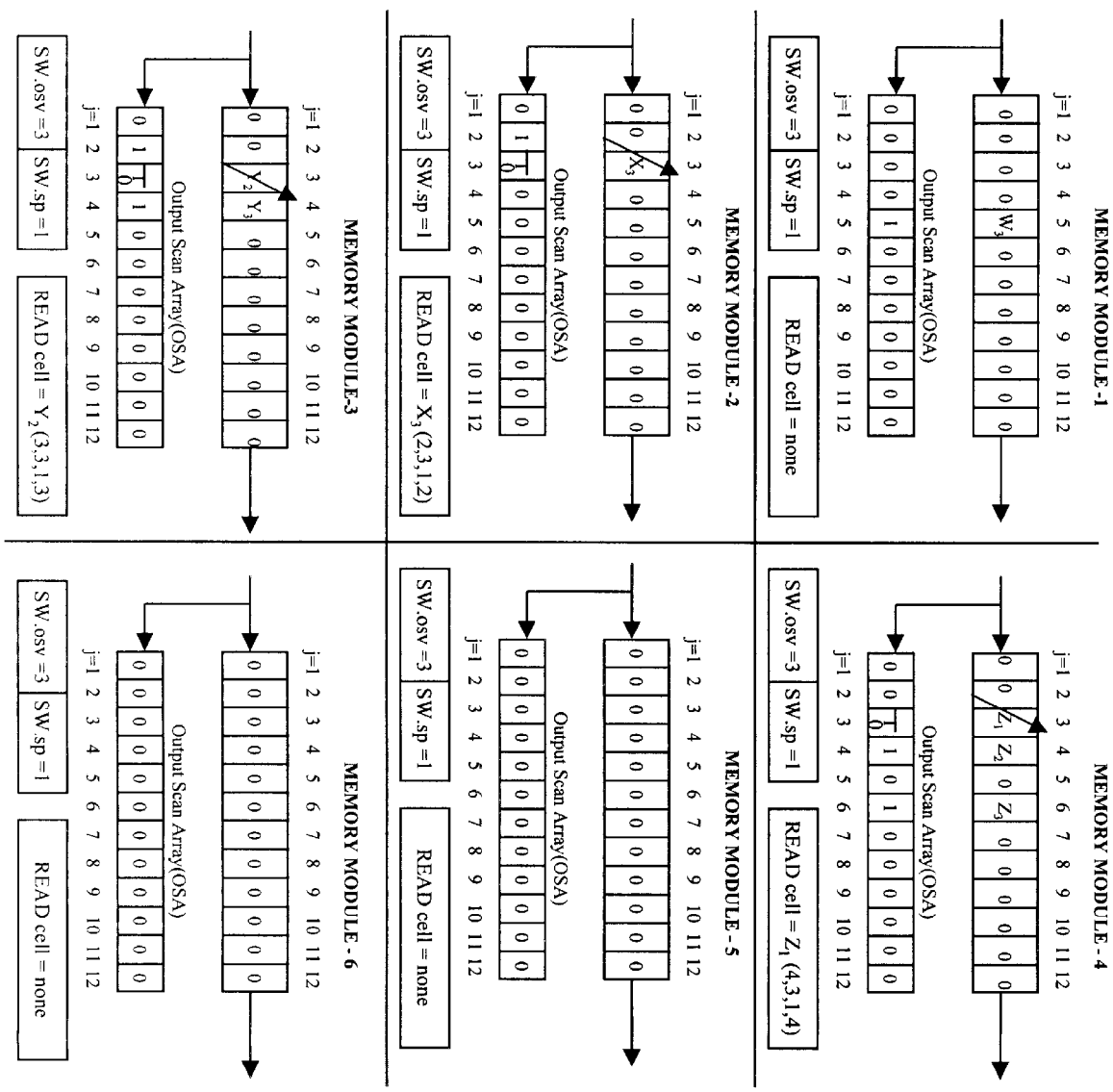

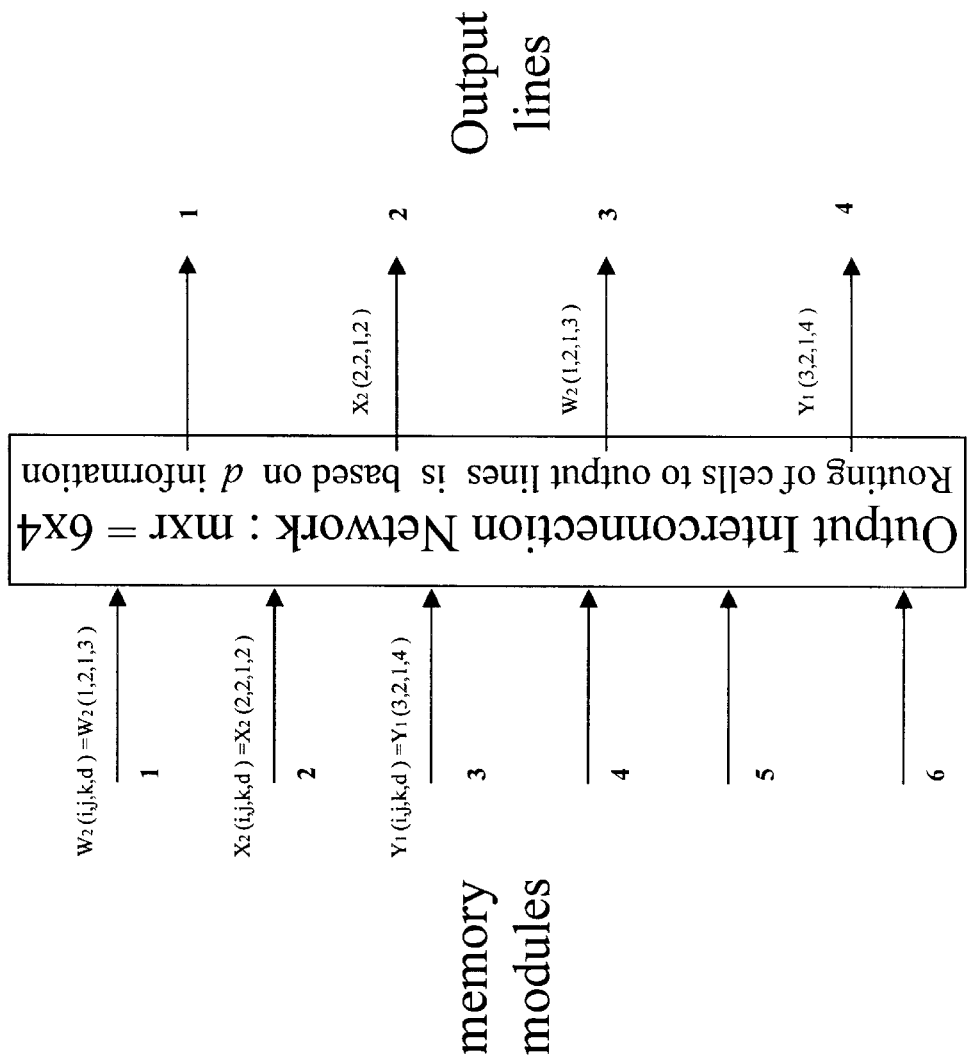
Fig. 18-5: Pipeline stage O(5,6)
Output Interconnection Network: Route cells to destined output lines

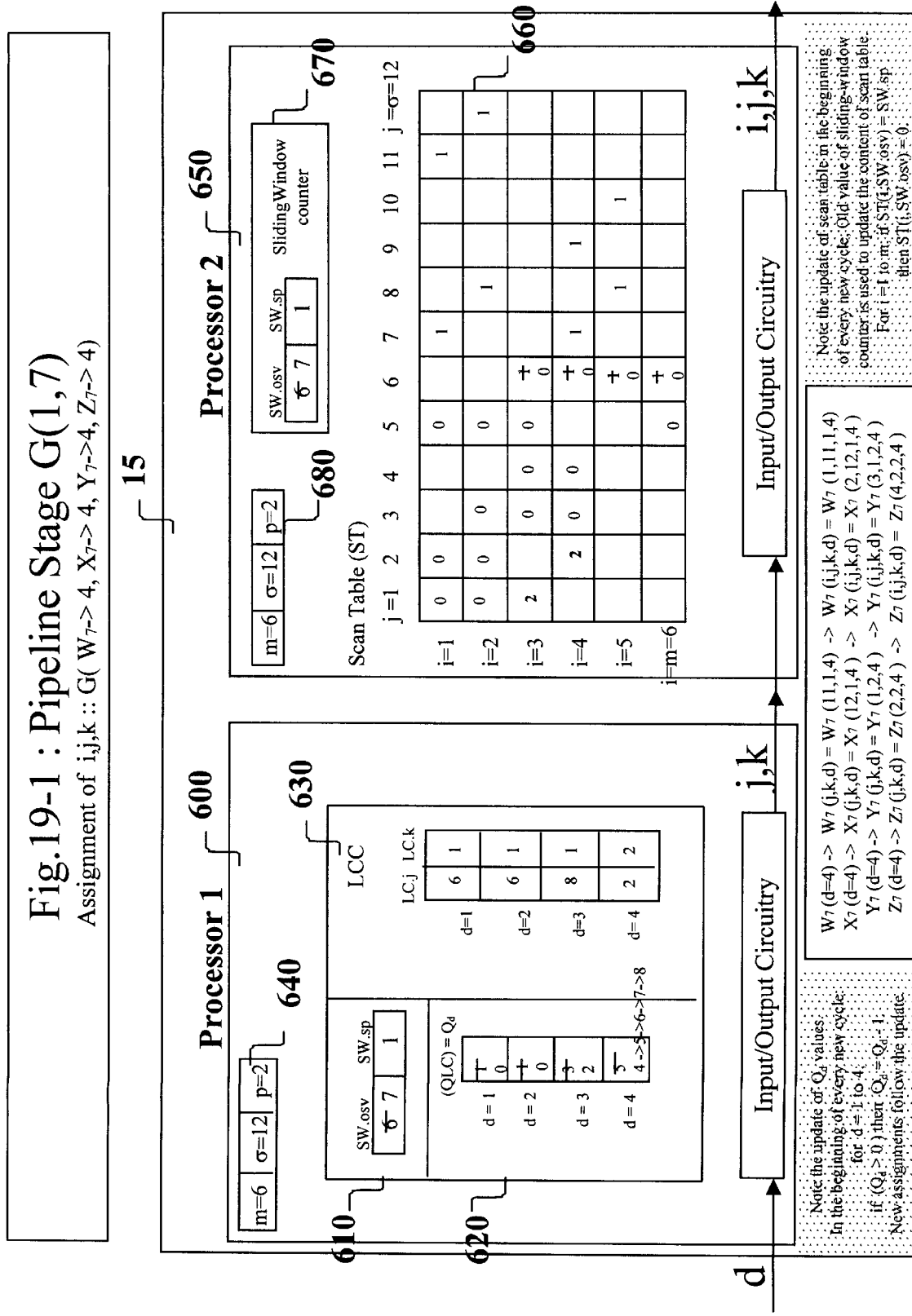

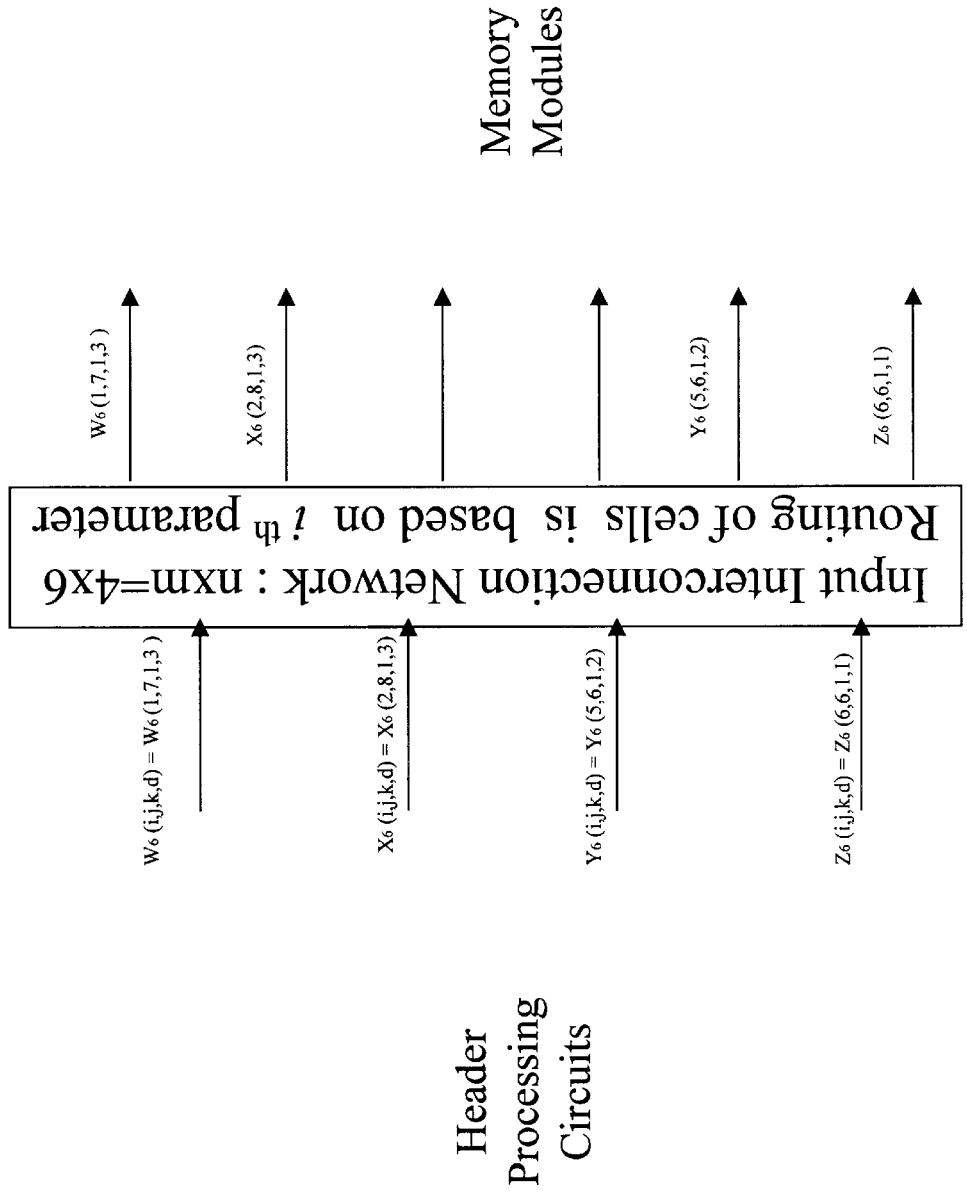

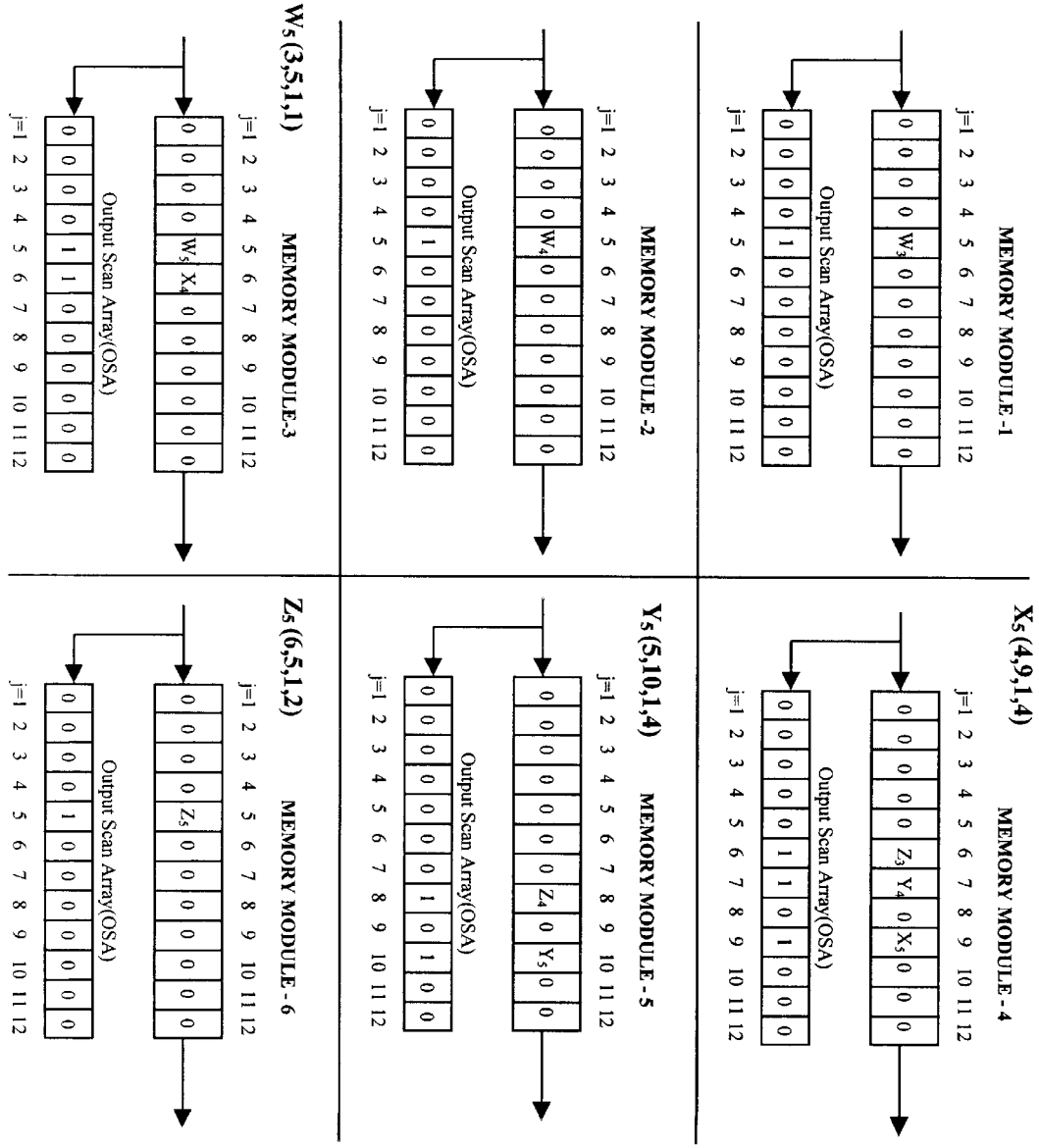

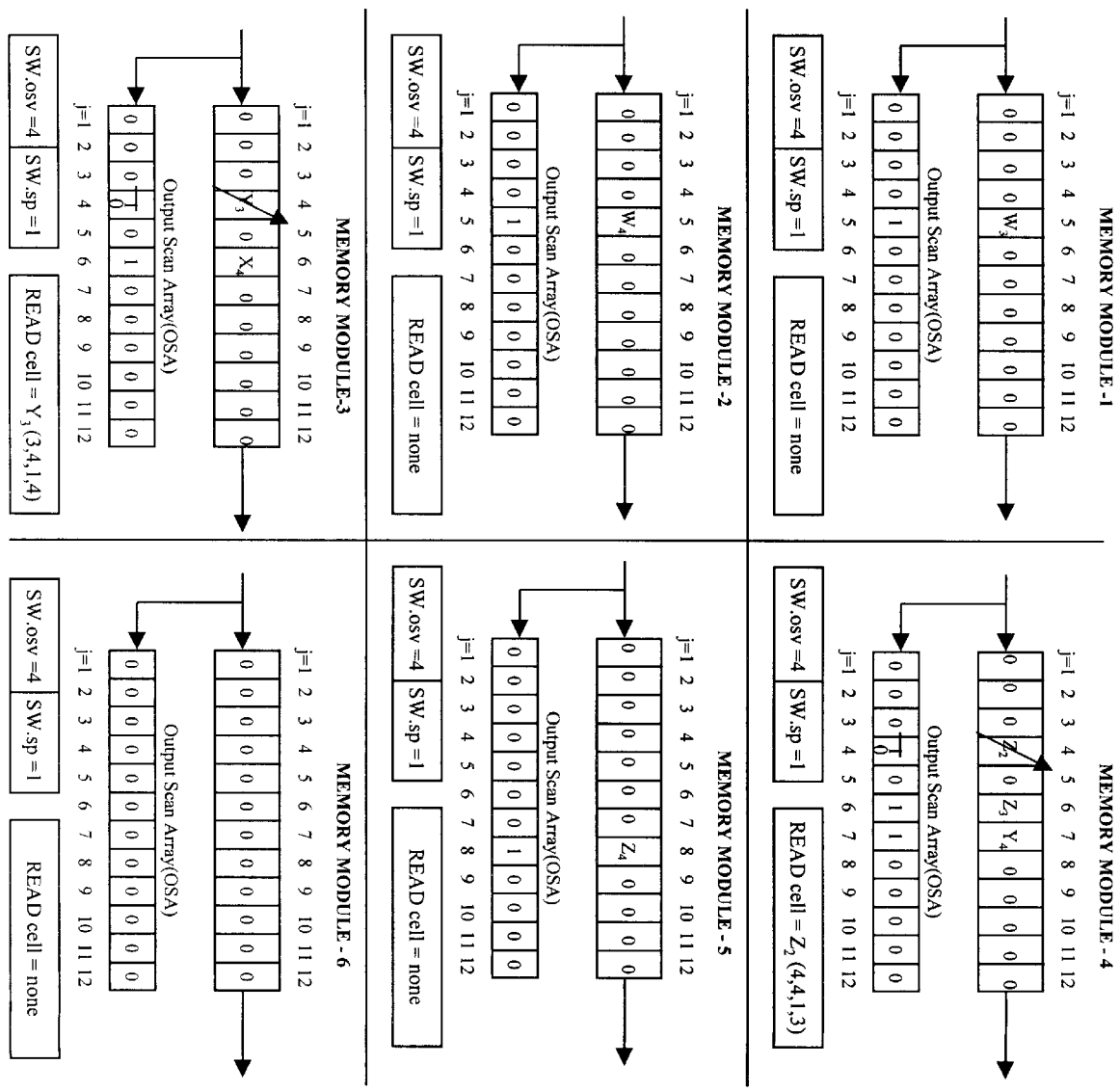

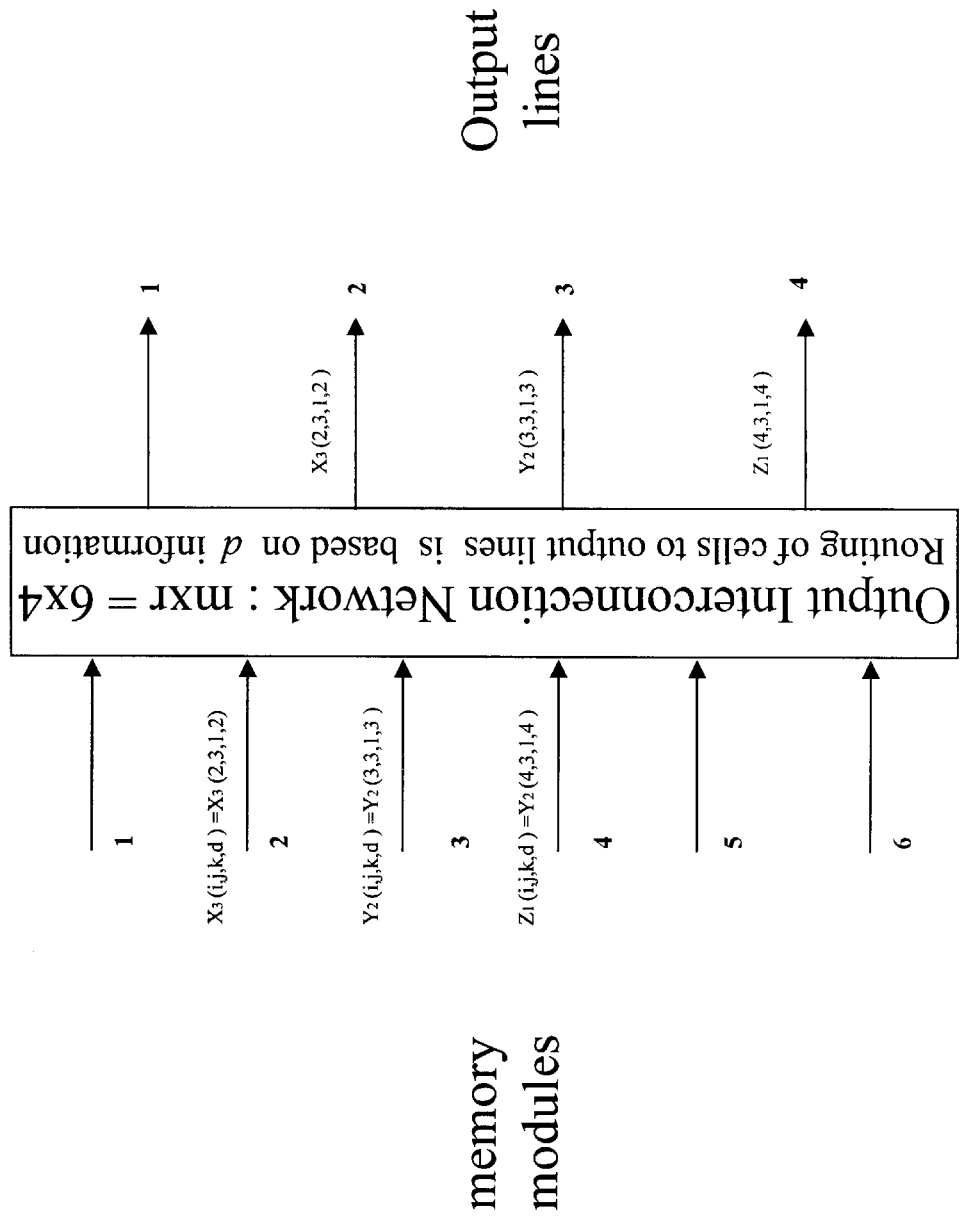
Fig. 19-5: Pipeline stage O(5,7)
Output Interconnection Network: Route cells to destined output lines

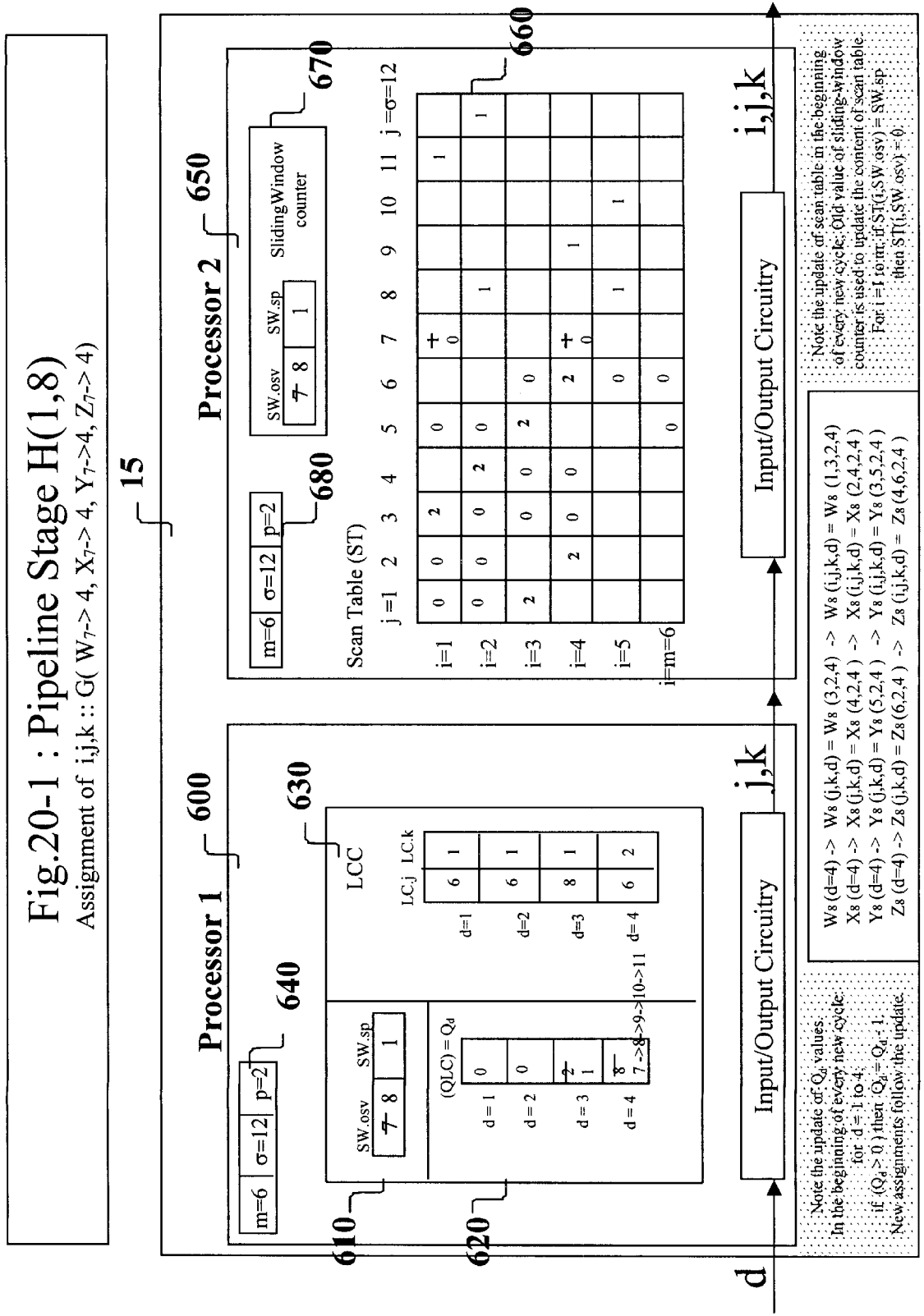

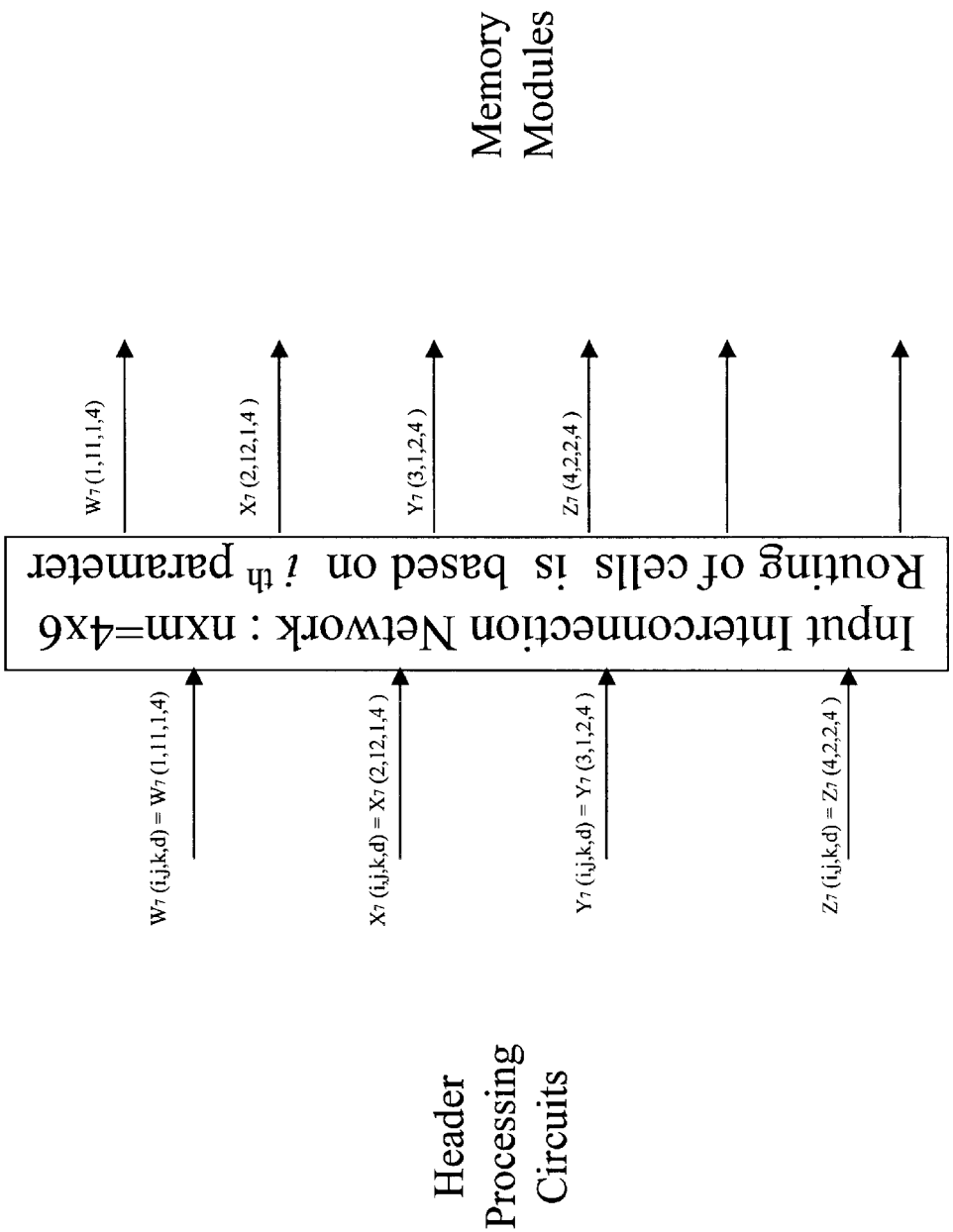

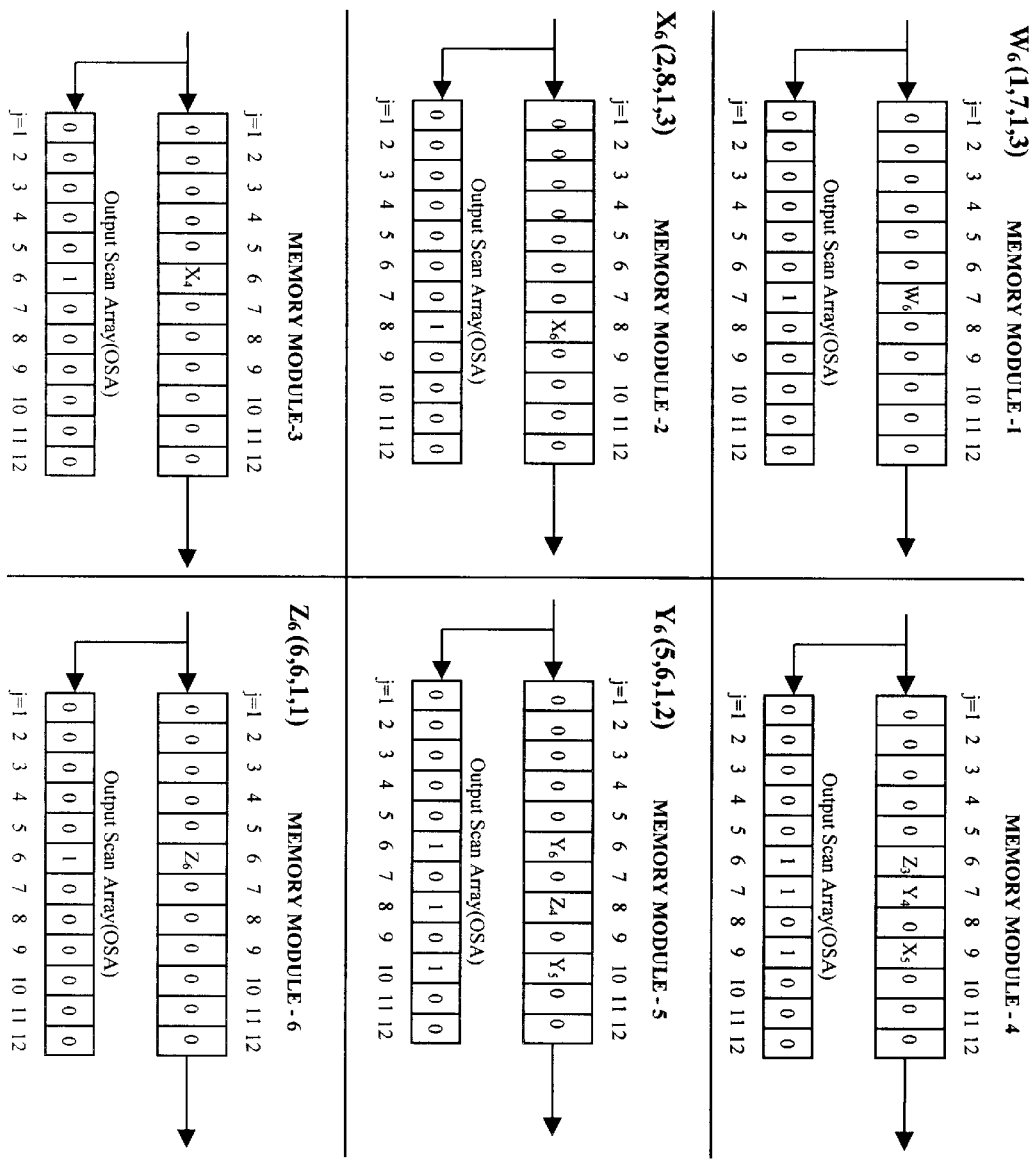
Fig.20-3 : Pipeline Stage F(3,8) : WRITE
WRITE ATM cells in the $j^{th}$ location of $i^{th}$ memory module; Set OSA(j)=k

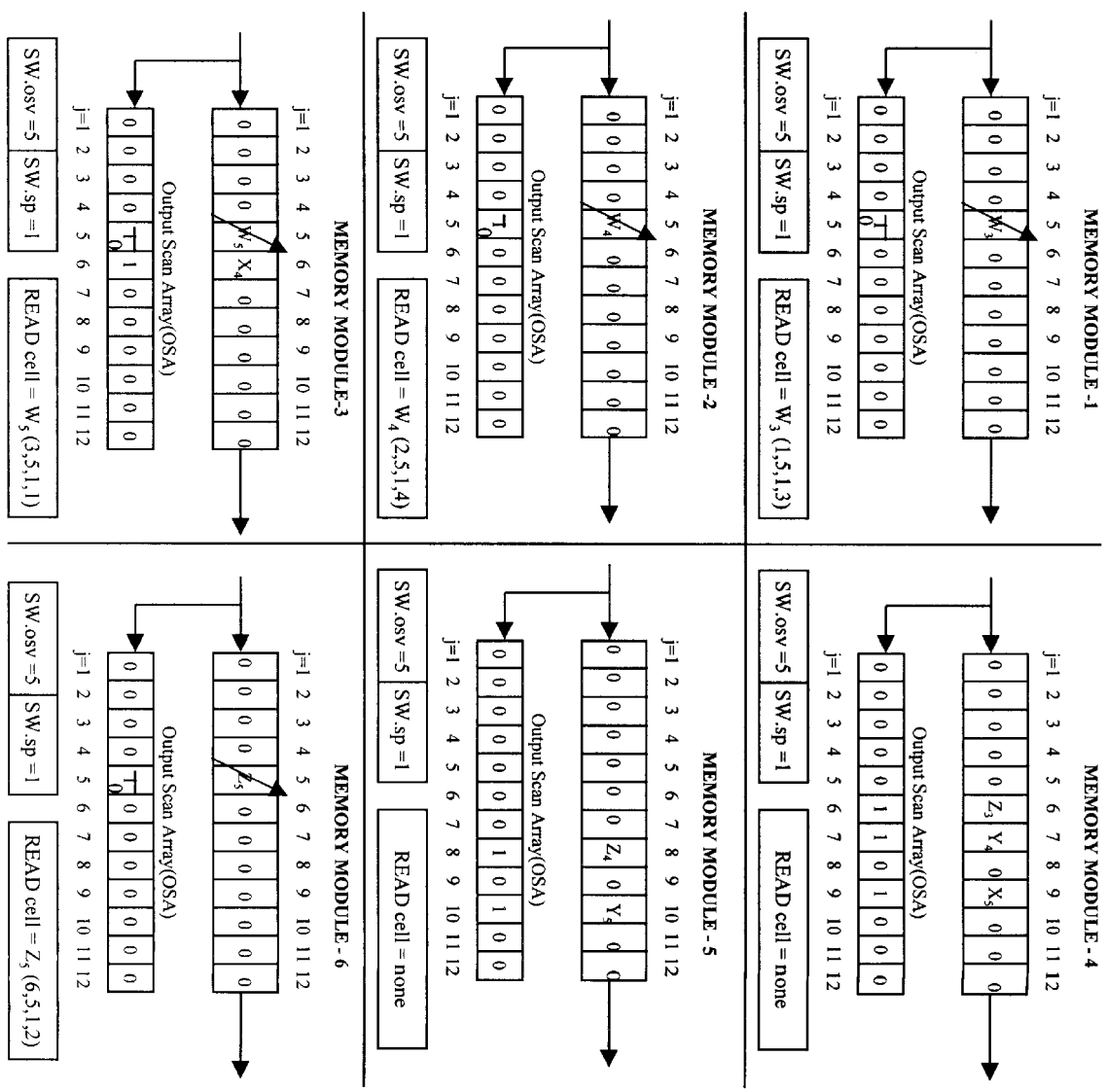

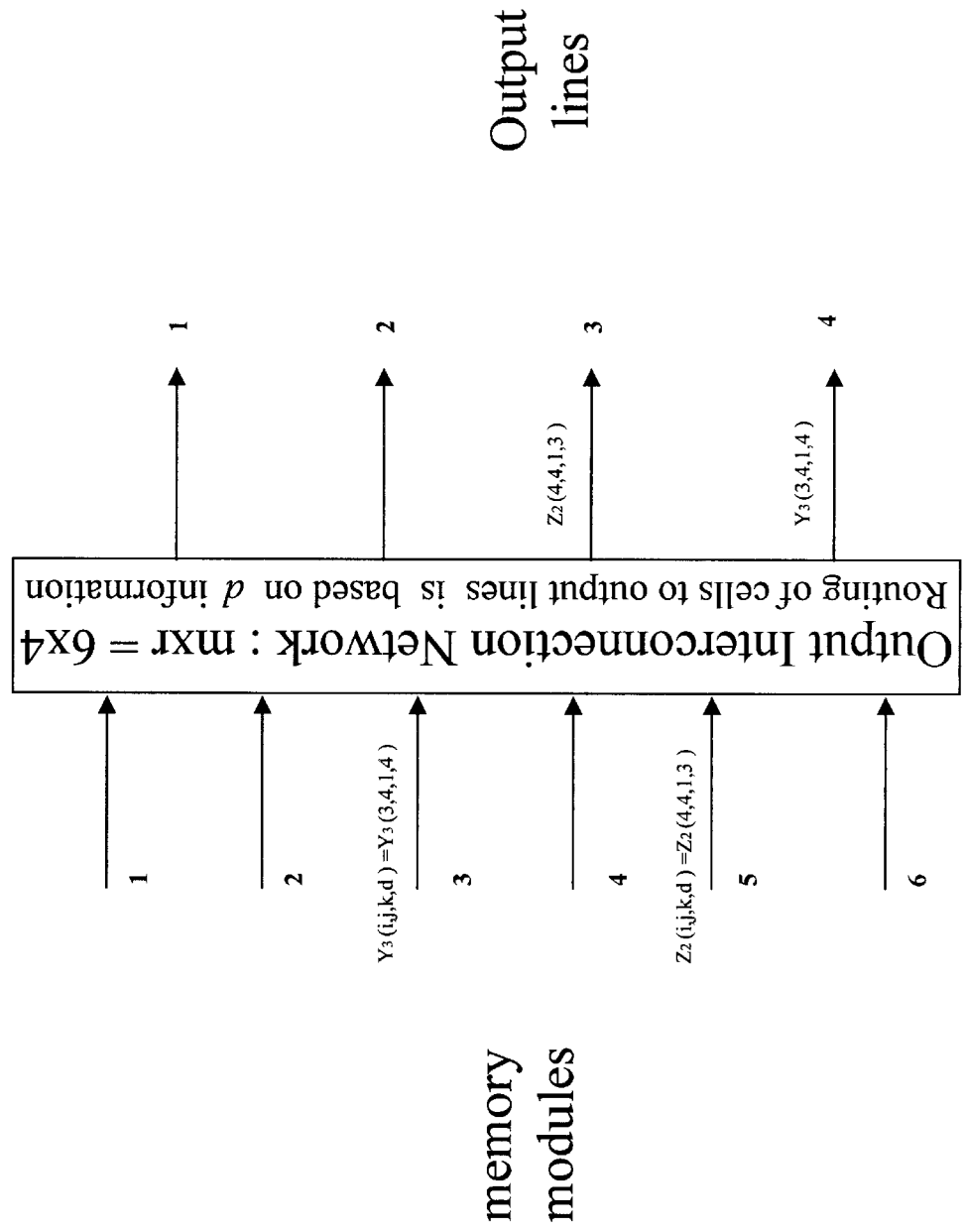
Fig. 20-5: Pipeline stage O(5,8)
Output Interconnection Network: Route cells to destined output lines

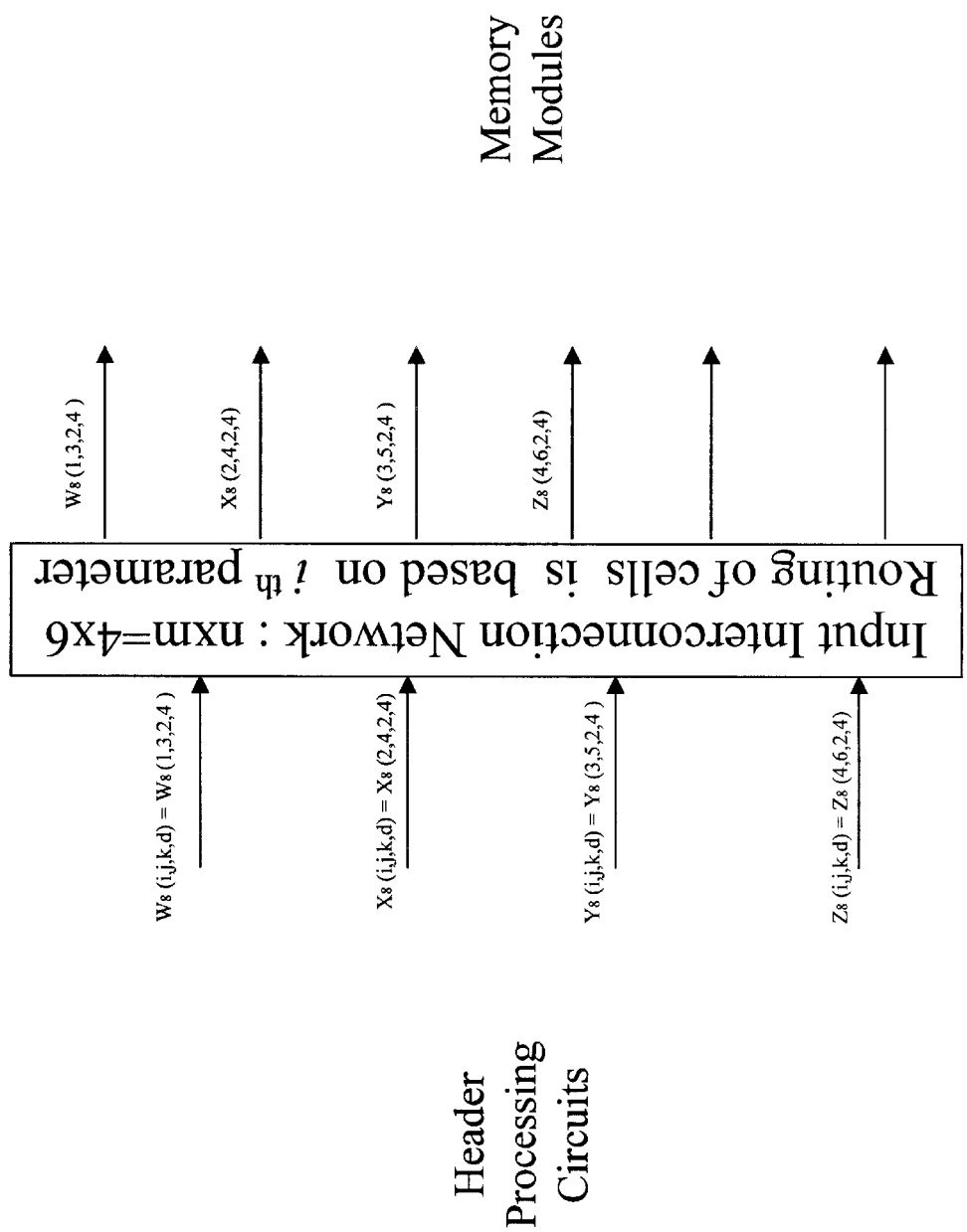
Fig. 21-1: Pipeline stage H(2,9)
Input Interconnection Network: Route cells to assigned memory modules

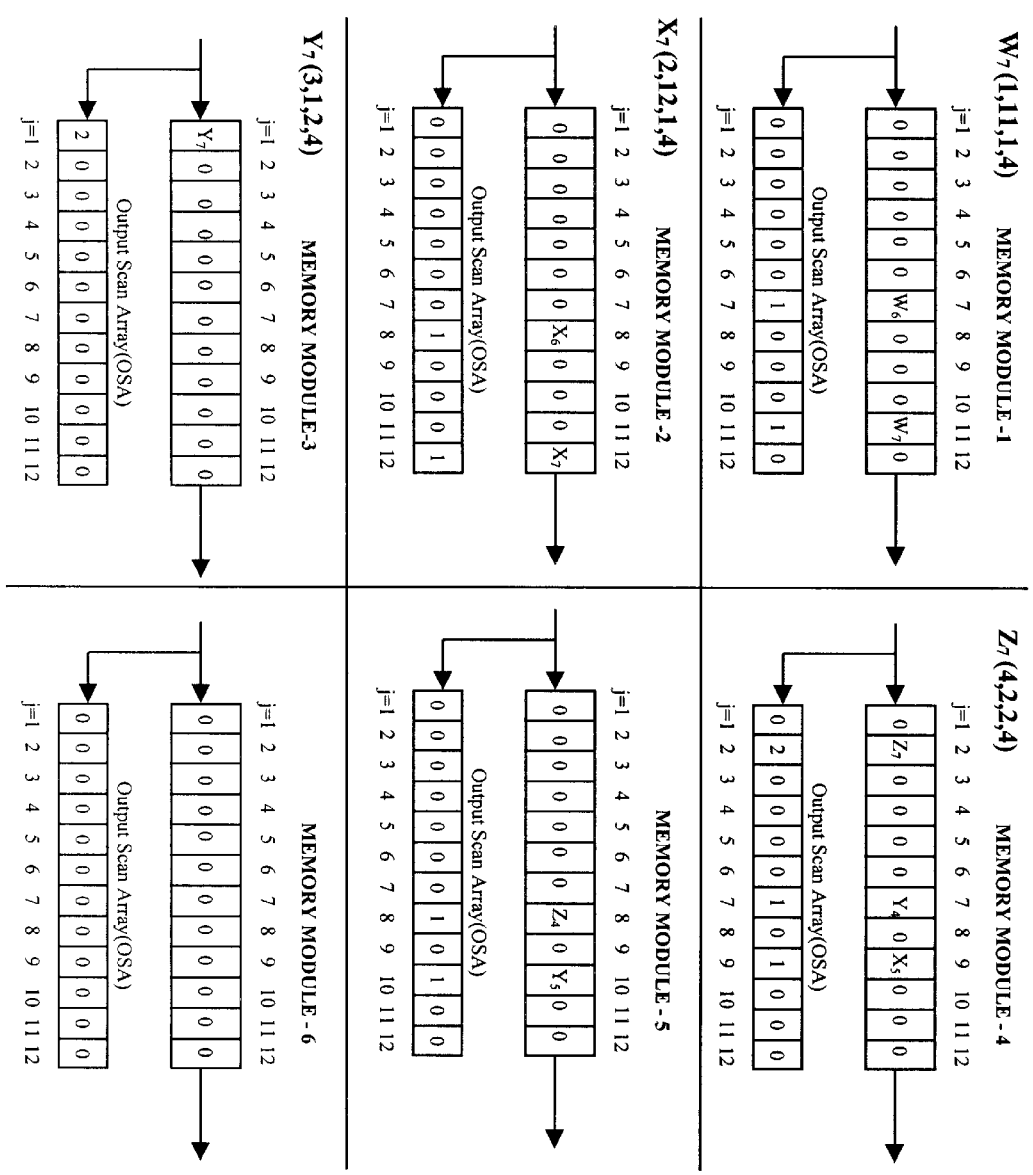

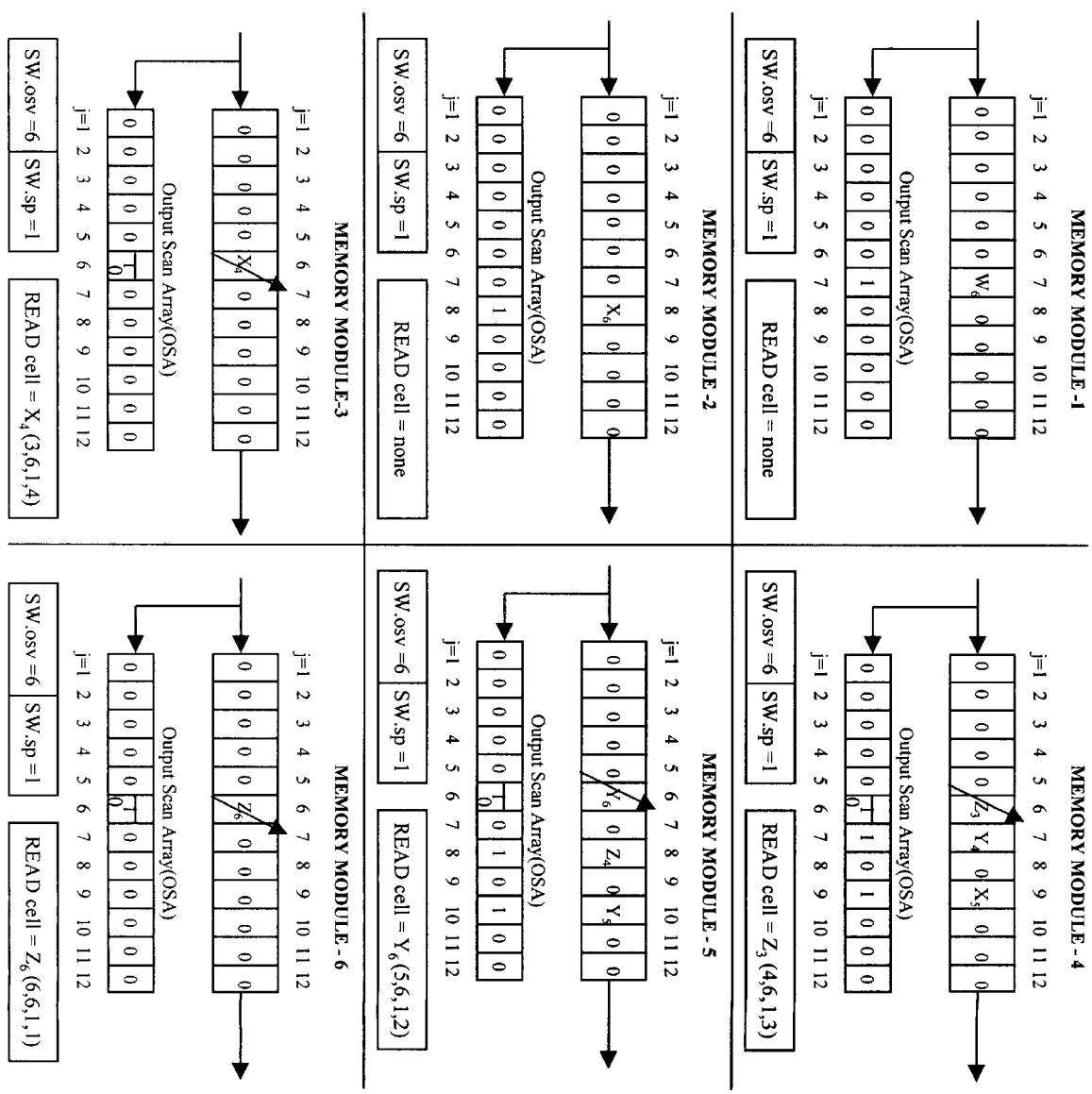

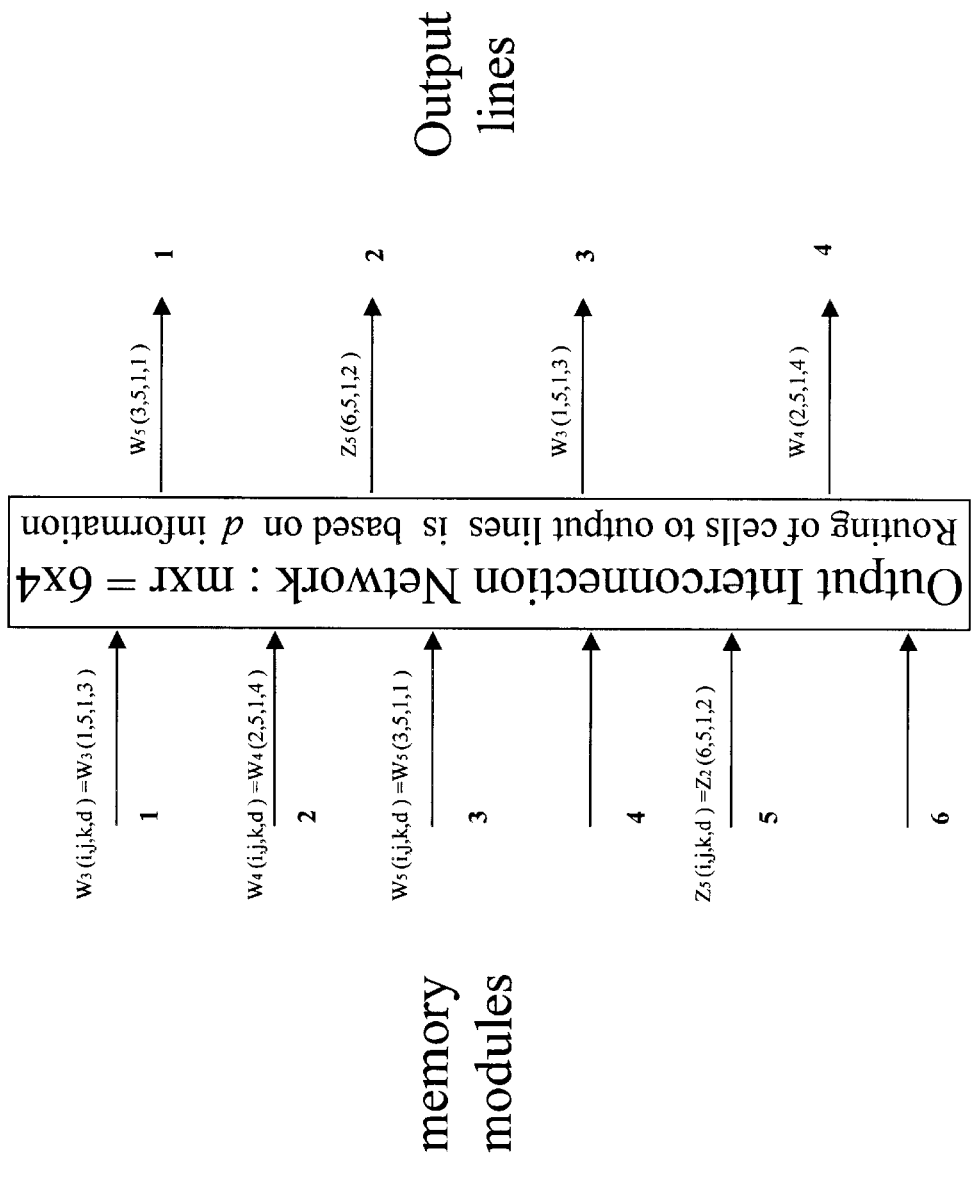
Fig. 21-4: Pipeline stage O(5,9)
Output Interconnection Network: Route cells to destined output lines

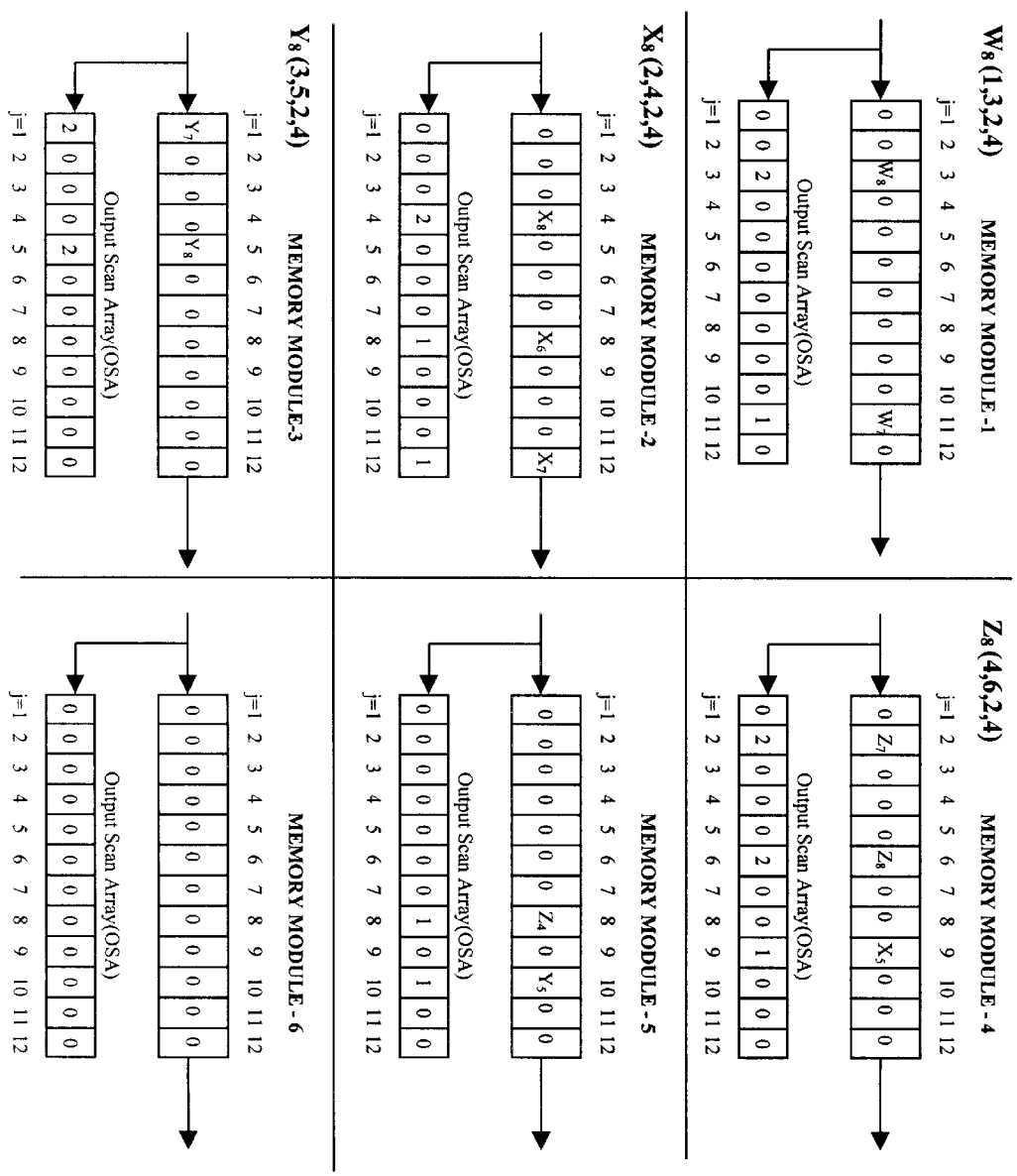

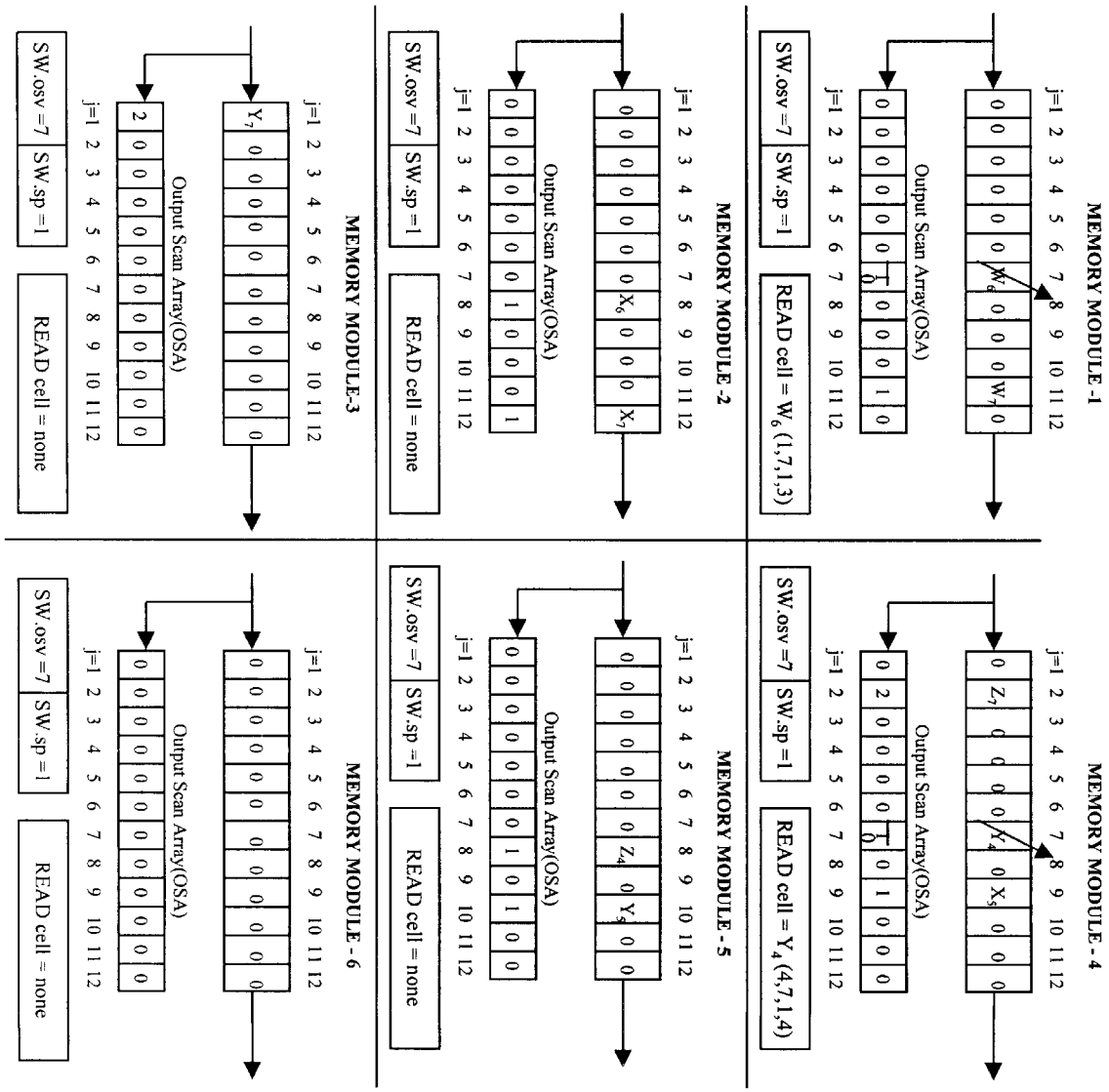

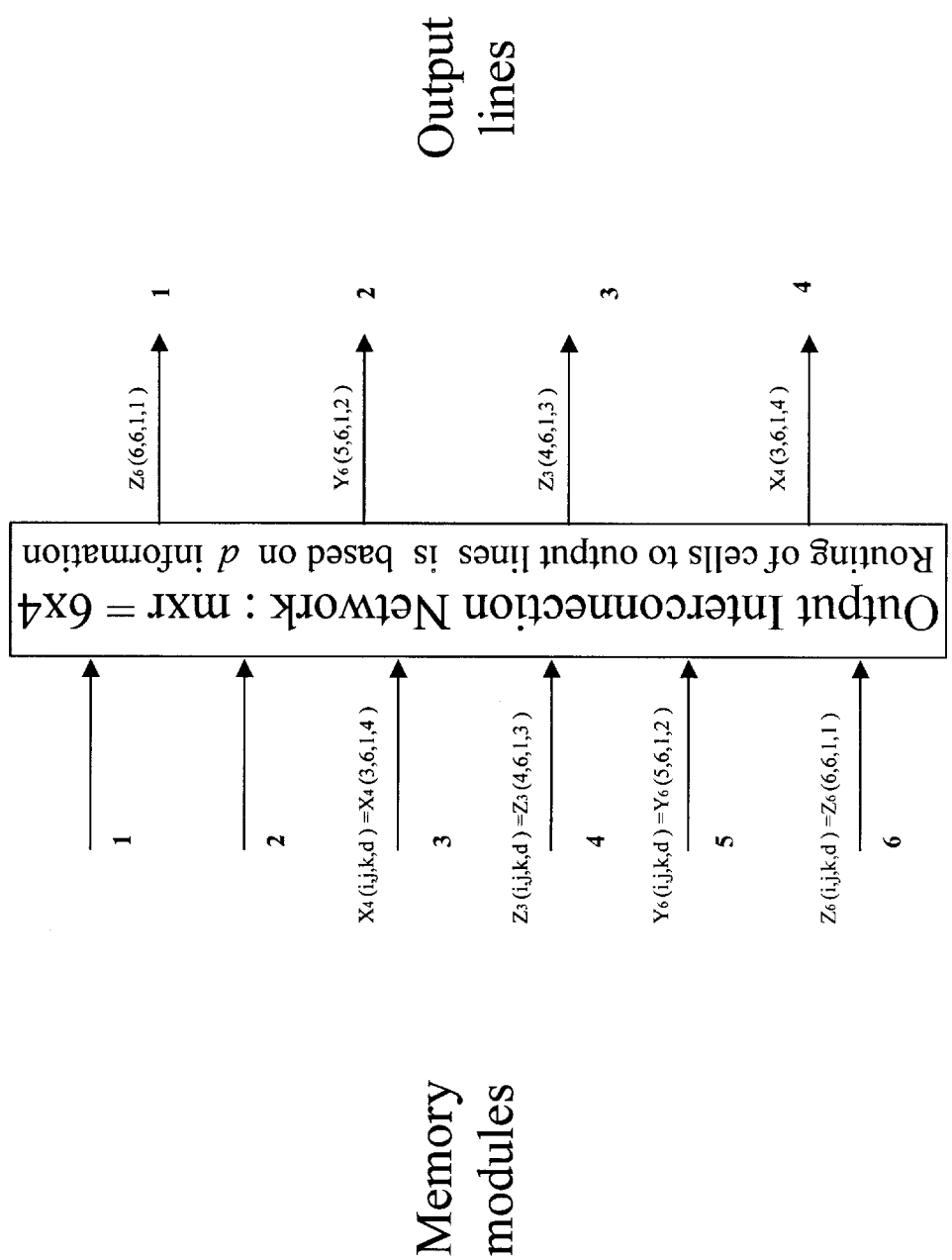
Fig. 22-3: Pipeline stage O(5,10)
Output Interconnection Network: Route cells to destined output lines

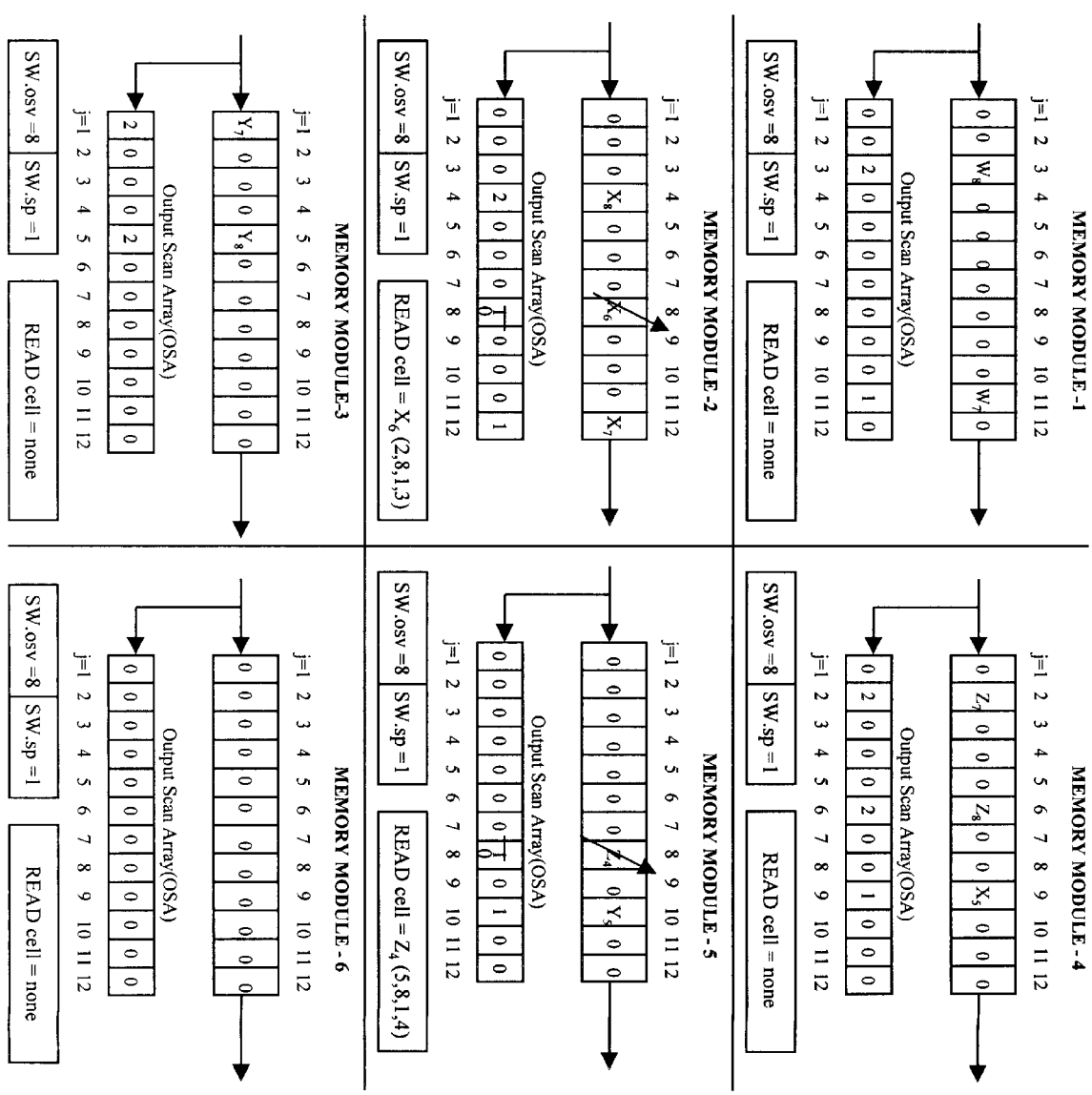
Fig. 23-1: Pipeline Stage R(4,11) :READ ATM Cells
READ ATM cells from memory location (SW.osv) if OSA(SW.osv)=SW.sp;
Set OSA(SW.osv)=0 for Read cells.

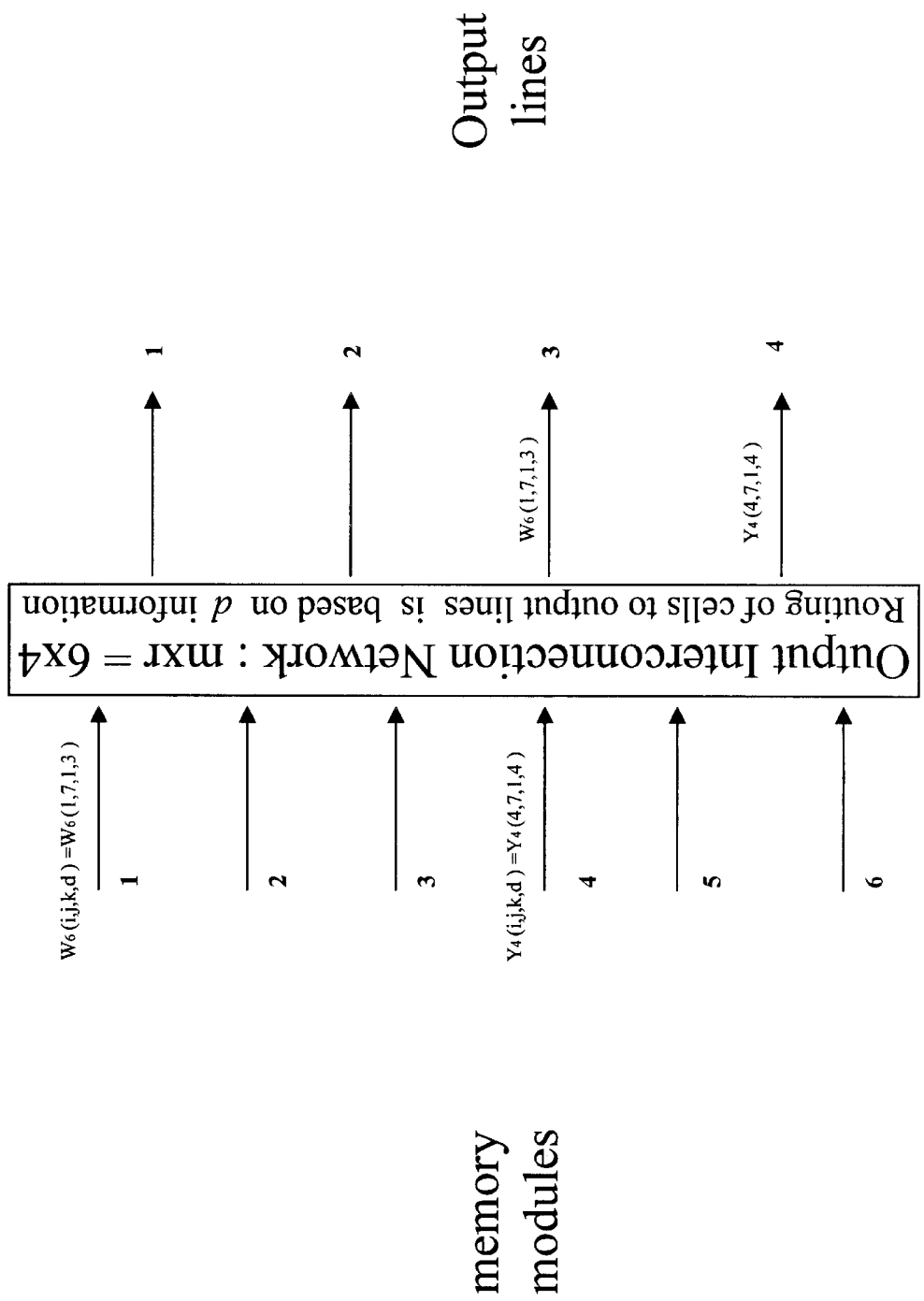
Fig. 23-2: Pipeline stage O(5,11)
Output Interconnection Network: Route cells to destined output lines

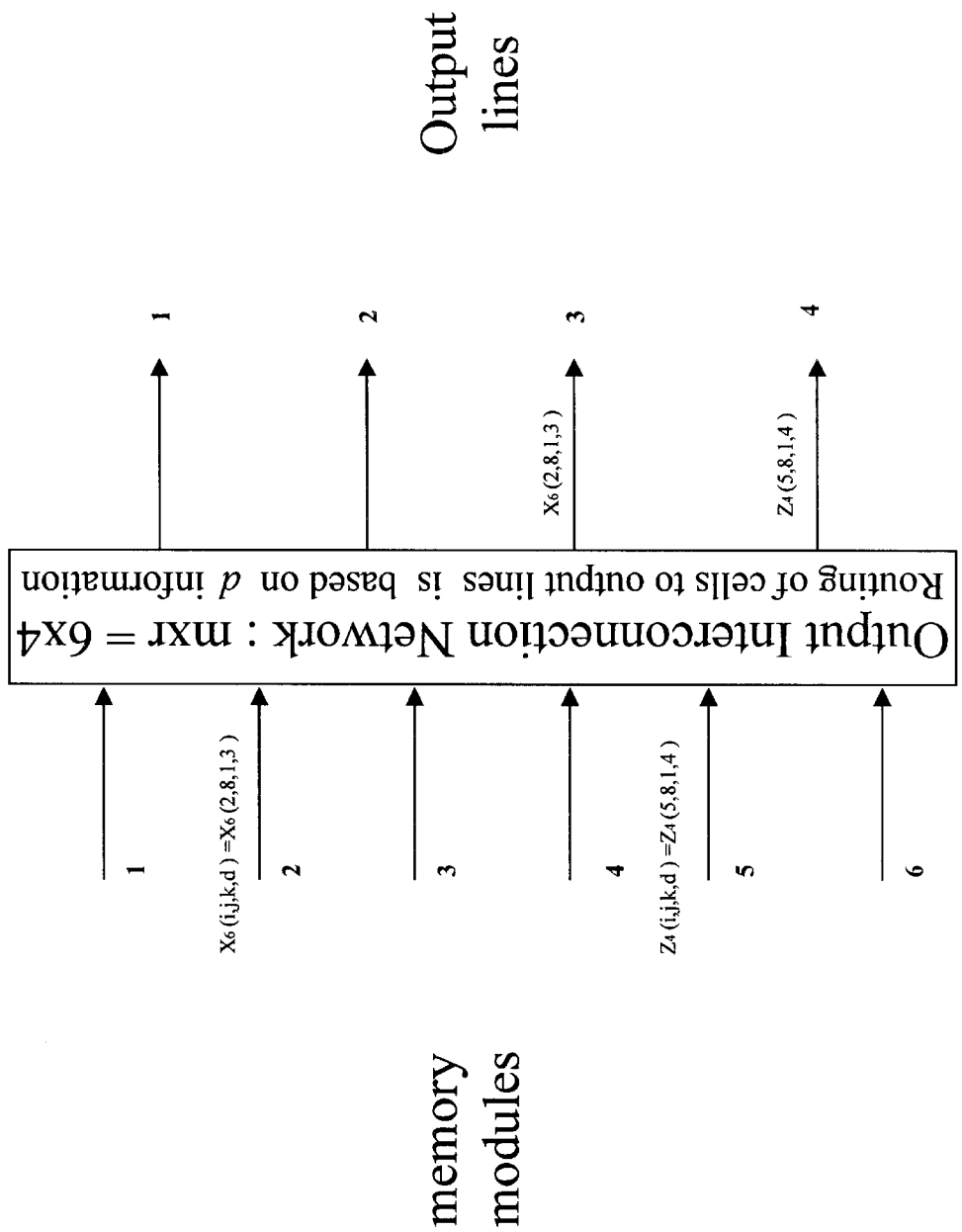
Fig. 24: Pipeline stage O(5,12)
Output Interconnection Network: Route cells to destined output lines Fig: 25: Time chart for pipeline operation of the example 4x4 switch

| Pipeline Cycle | Input-W | Input-X | Input-Y | Input-Z | Stage-1 (i,j,k) = ? | Stage-2 Route | Stage-3 WRITE | Stage-4 READ | SW(osv,sp) READ stage | Stage-5 Output1 | Output2 | Output3 | Output4 |
|---|---|---|---|---|---|---|---|---|---|---|---|---|---|
| 1 | 1 | 4 | 4 | 4 | A(1,1) | | | | | | | | |
| 2 | 3 | 2 | 3 | 3 | B(1,2) | A(2,2) | | | | | | | |
| 3 | 3 | 2 | 4 | 3 | C(1,3) | B(2,3) | A(3,3) | | | | | | |
| 4 | 4 | 4 | 4 | 4 | D(1,4) | C(2,4) | B(3,4) | R(4,4) | | | | | |
| 5 | 1 | 4 | 4 | 2 | E(1,5) | D(2,5) | C(3,5) | R(4,5) | SW(1,1) | W1 | | | |
| 6 | 3 | 3 | 2 | 1 | F(1,6) | E(2,6) | D(3,6) | R(4,6) | SW(2,1) | | X2 | W2 | X1 |
| 7 | 4 | 4 | 4 | 4 | G(1,7) | F(2,7) | E(3,7) | R(4,7) | SW(3,1) | | X3 | Y2 | Y1 |
| 8 | 4 | 4 | 4 | 4 | H(1,8) | G(2,8) | F(3,8) | R(4,8) | SW(4,1) | | | Z2 | Z1 |
| 9 | | | | | | H(2,9) | G(3,9) | R(4,9) | SW(5,1) | | | W3 | Y3 |
| 10 | | | | | | | H(3,10) | R(4,10) | SW(6,1) | W5 | Z5 | W3 | W4 |
| 11 | | | | | | | | R(4,11) | SW(7,1) | Z6 | Y6 | Z3 | X4 |
| 12 | | | | | | | | R(4,12) | SW(8,1) | | | W6 | Y4 |
| 13 | | | | | | | | R(4,13) | SW(9,1) | | | X6 | Z4 |
| 14 | | | | | | | | R(4,14) | SW(10,1) | | | | X5 |
| 15 | | | | | | | | R(4,15) | SW(11,1) | | | | Y5 |
| 16 | | | | | | | | R(4,16) | SW(12,1) | | | | W7 |
| 17 | | | | | | | | R(4,17) | SW(1,2) | | | | X7 |
| 18 | | | | | | | | R(4,18) | SW(2,2) | | | | Y7 |
| 19 | | | | | | | | R(4,19) | SW(3,2) | | | | Z7 |
| 20 | | | | | | | | R(4,20) | SW(4,2) | | | | W8 |
| 21 | | | | | | | | R(4,21) | SW(5,2) | | | | X8 |
| 22 | | | | | | | | R(4,22) | SW(6,2) | | | | Y8 |
| | | | | | | | | | SW(7,2) | | | | Z8 |

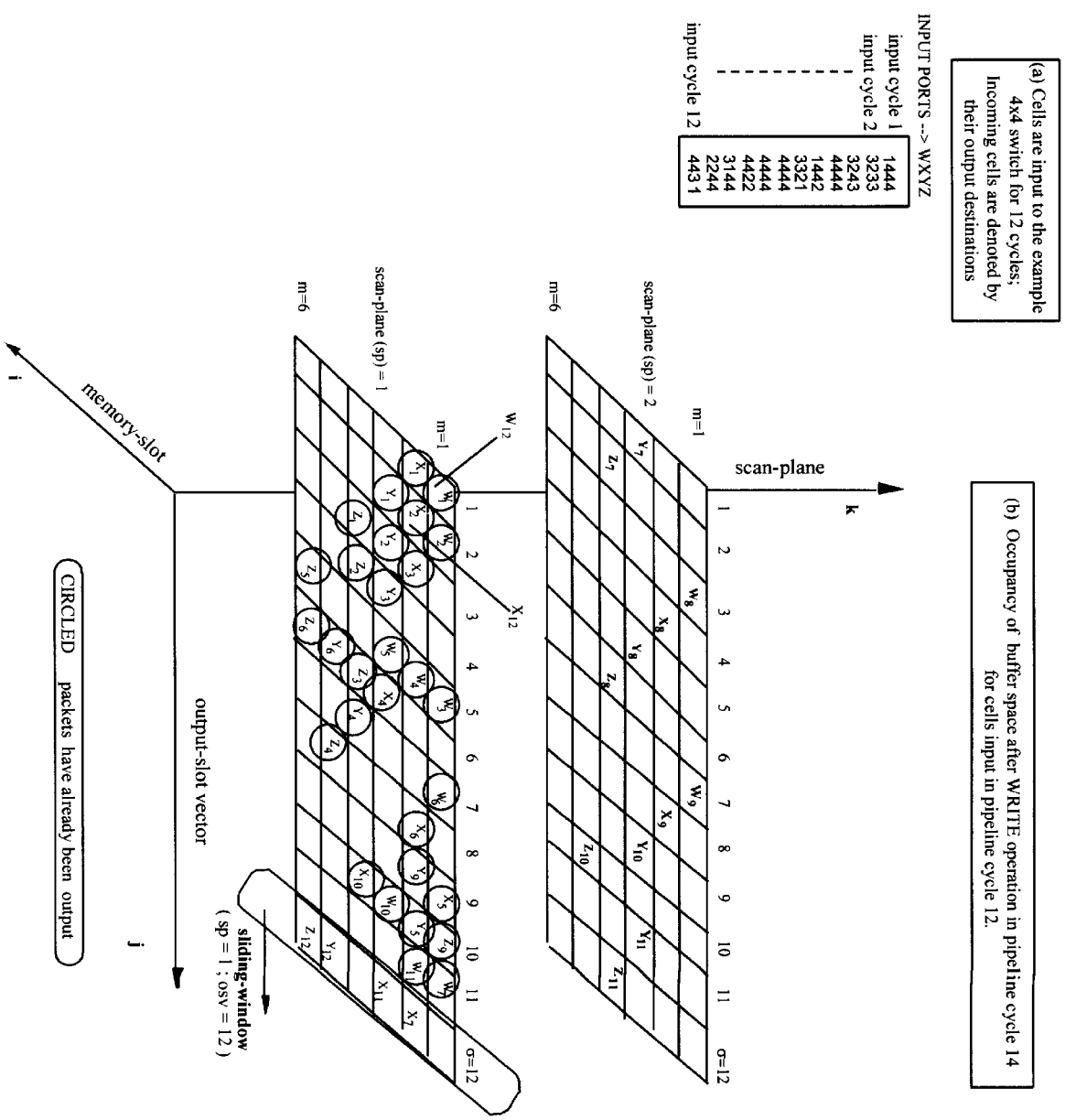
Fig.26: Occupancy of memory space in the example 4x4 switch for 12 cycles of cell arrivals.

Fig: 27: Operation of the example 4x4 switch for 12 pipeline cycles of cell arrivals

| Pipeline Cycle | Input-W | Input-X | Input-Y | Input-Z | SW(osv,sp) for READ stage | Output-1 | Output-2 | Output-3 | Output-4 |
|---|---|---|---|---|---|---|---|---|---|
| 1 | 1 | 4 | 4 | 4 | | | | | |
| 2 | 3 | 2 | 3 | 3 | | | | | |
| 3 | 3 | 2 | 4 | 3 | | | | | |
| 4 | 4 | 4 | 4 | 4 | SW(1,1) | | | | |
| 5 | 1 | 4 | 2 | 2 | SW(2,1) | W1 | | | X1 |
| 6 | 3 | 3 | 2 | 1 | SW(3,1) | | X2 | W2 | Y1 |
| 7 | 4 | 4 | 4 | 4 | SW(4,1) | | X3 | Y2 | Z1 |
| 8 | 4 | 4 | 4 | 4 | SW(5,1) | | | Z2 | Y3 |
| 9 | 4 | 4 | 2 | 2 | SW(6,1) | W5 | Z5 | W3 | W4 |
| 10 | 3 | 1 | 4 | 4 | SW(7,1) | Z6 | Y6 | Z3 | X4 |
| 11 | 2 | 2 | 4 | 4 | SW(8,1) | | | W6 | Y4 |
| 12 | 4 | 4 | 3 | 1 | SW(9,1) | | | X6 | Z4 |
| 13 | | | | | SW(10,1) | | Y9 | | X5 |
| 14 | | | | | SW(11,1) | X10 | Z9 | W10 | Y5 |
| 15 | | | | | SW(12,1) | | W11 | | W7 |
| 16 | | | | | SW(1,2) | Z12 | X11 | Y12 | X7 |
| 17 | | | | | SW(2,2) | | | | Y7 |
| 18 | | | | | SW(3,2) | | | | Z7 |
| 19 | | | | | SW(4,2) | | | | W8 |
| 20 | | | | | SW(5,2) | | | | X8 |
| 21 | | | | | SW(6,2) | | | | Y8 |
| 22 | | | | | SW(7,2) | | | | Z8 |
| 23 | | | | | SW(8,2) | | | | W9 |
| 24 | | | | | SW(9,2) | | | | X9 |
| 25 | | | | | SW(10,2) | | | | Y10 |
| 26 | | | | | SW(11,2) | | | | Z10 |
| 27 | | | | | SW(12,2) | | | | Y11 |
| 28 | | | | | SW(1,1) | | | | Z11 |
| 29 | | | | | SW(1,2) | | | | W12 |
| 30 | | | | | SW(1,3) | | | | X12 |

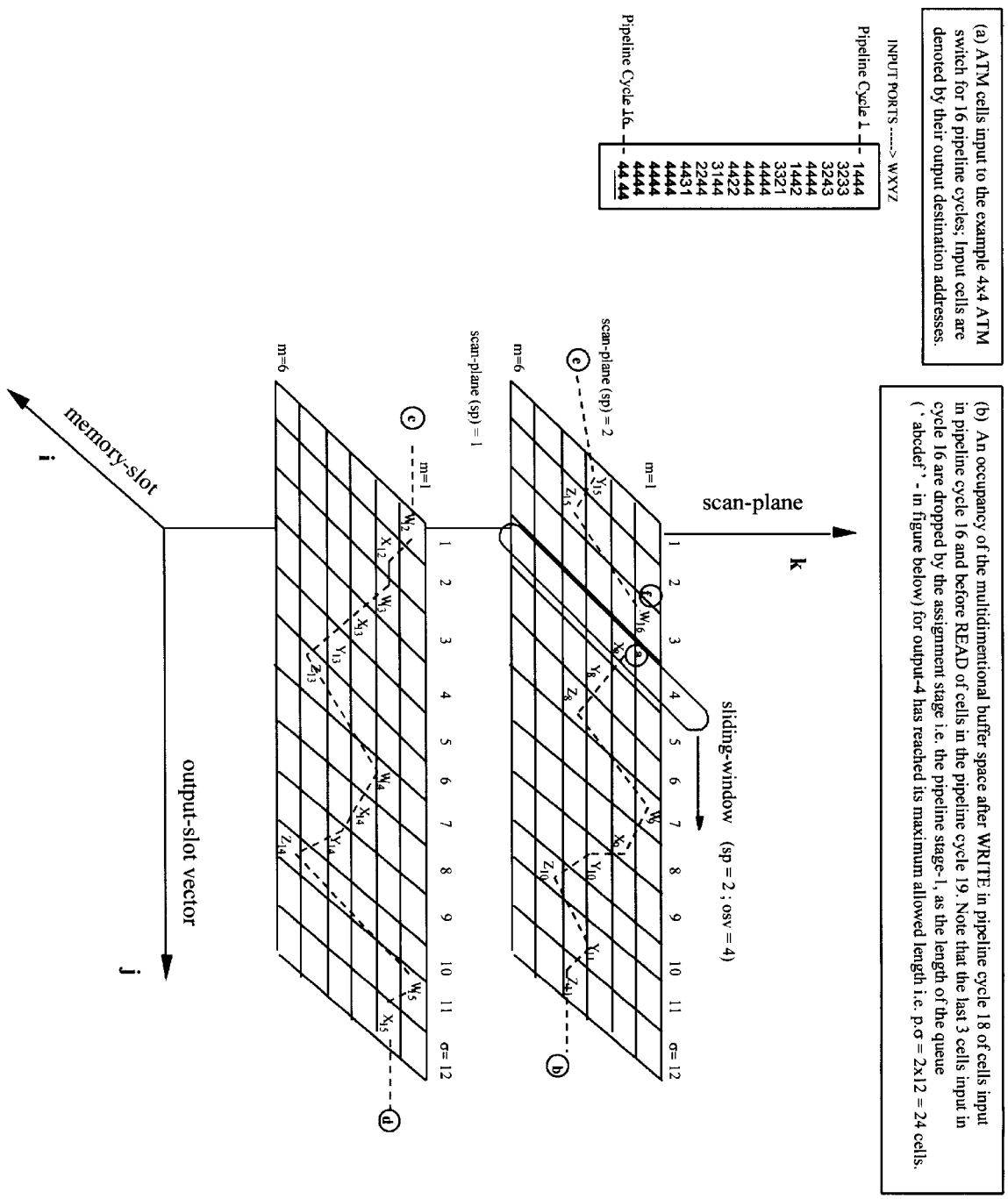
Fig. 28: Occupancy of memory space in the example 4x4 switch for 16 pipeline cycles of cell arrivals. Control of a queue inside the shared space is shown for an unbalanced traffic.

ATM SWITCHING SYSTEM WITH DECENTRALIZED PIPELINE CONTROL AND PLURAL MEMORY MODULES FOR VERY HIGH CAPACITY DATA SWITCHING

CROSS-REFERENCE TO RELATED APPLICATIONS

Not applicable

STATEMENT REGARDING FEDERALLY SPONSORED RESEARCH AND DEVELOPMENT

Not applicable

REFERENCE TO A MICROFICHE APPENDIX

Not applicable

BACKGROUND OF THE INVENTION

1. Field of the Invention

This invention relates to high capacity packet switching apparatus, in general and Asynchronous Transfer Mode (ATM) cell switching apparatus, in particular which is typically used for high speed multimedia networking communications. More particularly, this invention is directed towards decentralized and pipeline control based ATM switching apparatus and method to enable high capacity switching.

2. Prior Art

Besides its best possible delay-throughput performance, ATM switching systems employing shared buffers have also been known in the art to incur the lowest cell-loss rate compared to that of the ATM switches employing input or output buffering strategies. However, a typical design of a large shared-buffer based ATM switching system has been severely restricted by the bottleneck created by high memory bandwidth requirements, segregation of the buffer space and centralized buffer control bottleneck which causes the switch performance to degrade as the switch grows in size. In order to preserve its ability to provide for the low cell-loss rate for a given buffer size, an ATM switching network design should attempt to provide for global buffer sharing among all its inputs and output lines, provide memory sharing schemes to allow fair sharing of a common memory space under different traffic type and alleviate performance bottleneck caused by centralized control.

A traditional approach to design a large size shared-buffer based ATM switching systems has been to first design a feasible size shared-buffer ATM switching modules and then interconnect plurality of such modules in some fashion to build a large size switching system. Some of the previously used methods and schemes to build large size shared-buffer based ATM switch can be categorized as follows:

The Multistage Interconnection Network (MIN) approach: According to this general scheme, a multistage interconnection network is used to build a large size shared-buffer based switching system with a small size, shared-buffer switching elements deployed at each node of the interconnection network [SAKURAI Y., et al, "Large-Scale ATM Multistage Switching Network with Shared Buffer Memory Switches," IEEE Communication, January 1991.]. This general scheme of switch growth is known to cause degradation in performance of a shared-buffer architecture as the switch grows in size. Degradation in cell-loss and throughput performance result mainly from internal link conflicts, output blocking and incomplete buffer sharing due to separation of memory space among plurality of modules. Furthermore, it is obvious that this approach does not allow global sharing of the employed buffer space among all of its input-output ports. Because of separation of buffer space, not all output lines can share the entire buffer space of the switch. Under unbalanced traffic it is possible for some switch buffers to overflow while other switch buffers being under utilized.

Growable switch approach [ENG K. Y. et al, "A Growable Packet (ATM) Switch Architecture: Design, Principles and Applications," IEEE Transactions on Communications, February 1992]: Unlike the Multistage Interconnection network approach mentioned above, in growable switch approach, a plurality of shared-buffer based switches are organized in a single stage preceded by a bufferless [N×(m/n)N] interconnection network. Although this approach succeeds in providing an improved overall performance, compared to the general MIN approach, it does not allow global sharing of memory space among all its inputs and outputs. It is known in the art that this scheme does not provide best buffer-utilization as it is possible for a buffer belonging to a group of output ports to overflow under unbalanced or bursty traffic conditions while other buffers belonging to other output ports being empty.

The Multiple Shared Memory (MSM) approach [WEI S.X. et al, "On the Multiple Memory Module Approach to ATM Switching," IEEE INFOCOM, 1992]: Unlike the previous two approaches mentioned above, this approach allows for the global sharing of the employed buffer space. However, MSM switch approach employ centralized control of the switching system consisting of plurality of memory modules. Use of centralized control can become a performance bottleneck if the switch grows in size. Furthermore, in MSM switch approach, the conditions for the best possible delay-throughput performance has been derived under the assumption of infinite buffer space in the switching system. In reality, a buffer space tends to be finite and a realistic switching algorithm must accommodate for the constraints imposed by the finiteness of the buffer space in an ATM switching system. A finite buffer space results into cell-loss, and in the absence of an appropriate buffer sharing scheme, it results into performance degradation [KAMOUN F. and KLEINROCK L., "Analysis of Shared Finite Storage in a Computer Network Node Environment Under General Traffic Conditions," IEEE Transactions on Communications, July 1980]. A switching scheme which provides for a global sharing of the buffer space may not necessarily provide for best possible delay-throughput performance if the shared-buffer space tends to be finite. In order to provide for best possible performance with a finite common buffer space, a switching scheme should also be able to enforce various buffer sharing schemes to provide fair sharing of finite buffer space under various traffic types.

In [OSHIMA et al., "A New ATM Switch Architecture based on STS-Type Shared Buffering and Its Implementation," ISS 1992], the proposed shared multi-buffer (SMB) based ATM switch design also provide a complete sharing of memory space among all its input and output ports. The shared multibuffer based ATM switch is also disclosed in recently assigned U.S. Pat. No. 5,649,217 to Yamanaka et al. The shared multibuffer switch of Yamanaka et al., schematically shown in FIG. 1, uses a centralized controller to centrally control and manage a plurality of buffers and its write and read operations for each incoming and outgoing cells, centrally manage and update a plurality of address queues for each incoming and outgoing cells, centrally provide instructions to incoming and outgoing spatial switch on how to provide routing of ATM cells corresponding to each of the input and output lines, and centrally coordinate the operation of its various components to realize overall switching function of the switching apparatus. The disadvantage of this approach is that the use of centralized controller can become a performance bottleneck as the switch grows in size (i.e. the input and output lines increase in number and/or speed). Growth in the size of the switch and hence the number of input and output lines would require the centralized controller to perform increased number of tasks (such as write and read operations for ATM cells, storage and management of information in address queues in the central controller) for increased number of memory modules and input/output lines in a fixed switching time-slot. Similarly, as the switch grows in size, the central controller will need to provide increased number of routing instructions to incoming line spatial switch and outgoing line spatial switch for increased number of input and output lines in a fixed switching time-slot. Overall, the centralized controller will have to do increased number of all centralized control functions and memory operations described therein, in a fixed switching time-slot (which is usually smaller than the interarrival time of two consecutive cells). It is obvious that the centralized controller used by Yamanaka et al., as disclosed in U.S. Pat. No. 5,649,217 can easily become a bottleneck to the switch performance as the switch grows in size or switching capacity.

BRIEF SUMMARY OF THE INVENTION

The above mentioned problems, and in particular the bottleneck problem caused by the use of centralized controller (as described in the disclosed invention U.S. Pat. No. 5,649,217) are removed by the switching method and apparatus of the disclosed invention. The disclosed switching method and the apparatus (i) alleviate the need for a centralized buffer controller and hence remove the performance bottleneck resulting from the use of a centralized controller, (ii) provide a way to partition overall switching function in to multiple independent switching operations such that the independent operations can be performed in parallel, (iii) partition the switching apparatus in multiple independent stages with each stage running one of the above mentioned independent switching operation, (iv) operate multiple independent stages in a pipeline fashion in order to enhance parallelism while processing the incoming ATM cells for switching purposes, (v) provide decentralized control such that multiple independent stages perform their switching operation based on the information available locally and they do not have to depend on any central controller to provide centrally updated global variables, switching or buffer management related instructions, (vi) facilitate an efficient sharing of a finite buffer space among all the switch inputs and outputs (vii) provide various memory sharing schemes to allow for fair sharing of a common memory space under various traffic types.

A switching method is also disclosed according to which the entire memory space of the switching apparatus is depicted as multidimensional globally shared buffer space. The coordinates of the space help identify a proper location for incoming cells in the global buffer space so that they can be switched with best possible delay throughput performance. According to this method, each incoming cells are assigned a self-routing parameters in the form of an additional self-routing tag for their self propagation through various pipeline stages of the switching apparatus. As the ATM cells pass through different stages of the switching apparatus, the corresponding switching functions are locally performed by each stage on the received ATM cells. Each stage uses the value of the self-routing parameters in the received cells while performing its local switching operations. Because of the pipeline processing of ATM cells, the switching capacity of the system is enhanced considerably.

Memory modules and resulting global buffer space are not controlled and managed by any centralized buffer controller. Each memory modules are independent and use their local memory controllers to perform WRITE and READ operations for the received ATM cells and also perform related memory management. The local memory controllers work independently of each other and still help manage and control the globally shared buffer space of the switching apparatus. For write operation, local memory controllers use the self-routing parameters of received cells to determine the write address for the cells and write them to respective location in their memory modules. For read operation, the local memory controllers use the disclosed switching method to generate their read addresses to read cells from their memory modules.

The disclosed switching system facilitate an efficient sharing of a finite buffer space among all the switch inputs and outputs. The proposed switching system can provide complete buffer sharing, partial buffer sharing and complete partitioning of the entire buffer space employed in the system. Because of its ability to operate in a decentralized pipeline fashion the disclosed switching method can be used to design a large size shared buffer based ATM switching system. Because of its ability to realize various buffer sharing schemes, the disclosed switching method and apparatus can be designed for high throughput performance under various traffic types.

BRIEF DESCRIPTION OF THE DRAWINGS

FIG. 1 is a schematic diagram showing the ATM switching architecture having centralized controller and plural buffer memories disclosed in U.S. Pat. No. 5,649,217;

FIG. 2 is a schematic diagram showing the ATM switching architecture having decentralized pipeline control and plural buffer memories according to a preferred embodiment of the present invention;

FIG. 3 is an illustration of multidimensional global buffer space which includes all the ATM cell memory locations in all the memory modules employed by the switching system, according the present invention;

FIG. 4 is a flow diagram of the portion of the disclosed method that provide underlying switching functions for the switching apparatus, according to this invention;

FIG. 5 illustrates a flow diagram of the portion of the disclosed method that computes and assigns self-routing parameters to the incoming ATM cells in the switching apparatus, according to this invention;

FIG. 6 illustrates a block diagram of the self-routing parameter assignment circuit using the self-routing parameter assignment method;

FIG. 7 is a block diagram showing the components of the memory controller using the disclosed switching method, according to the present invention;

FIG. 8 illustrates flow diagrams for memory write and memory read operations performed each cycle by the memory controller of FIG. 7;

FIG. 9 shows the time chart for the decentralized pipeline operation of the various stages of the switching system;

FIG. 10 shows an instance of eight cycles of incoming cells input to an exemplary 4×4 switching apparatus, according to the disclosed switching system and method in the present invention;

FIG. 11 shows an schematic diagram of a 4×4 ATM switching apparatus employing decentralized pipeline control based switching method disclosed according to an exemplary embodiment of the present invention;

FIG. 12 illustrates decentralized pipeline operation of multiple stages while performing the switching operation on eight cycles of incoming ATM cells, according to the preferred embodiment of the present invention;

FIG. 13 illustrates the content of various counters and tables after the switching functions performed by the first pipeline stage in the first pipeline cycle of the 4×4 ATM switching apparatus according to exemplary embodiment of the present invention;

FIGS. 14-1, 14-2 illustrate the switching functions performed for the received cells in the second pipeline cycle by the first and second pipeline stages of the switching apparatus according to an exemplary embodiment of the present invention;

FIGS. 15-1, 15-2 and 15-3 illustrate the switching functions performed for the received cells in the third pipeline cycle by the first, second and third pipeline stages of the switching apparatus according to an exemplary embodiment of the present invention;

FIGS. 16-1, 16-2, 16-3 and 16-4 illustrate the switching functions performed for the received cells in the fourth pipeline cycle by the first, second, third and fourth pipeline stages of the switching apparatus according to an exemplary embodiment of the present invention;

FIGS. 17-1, 17-2, 17-3, 17-4 and 17-5 illustrate the switching functions performed for the received cells in the fifth pipeline cycle by the first, second, third, fourth and fifth pipeline stages of the switching apparatus according to an exemplary embodiment of the present invention;

FIGS. 18-1, 18-2, 18-3, 18-4 and 18-5 illustrate the switching functions performed for the received cells in the sixth pipeline cycle by the first, second, third, fourth and fifth pipeline stages of the switching apparatus according to an exemplary embodiment of the present invention;

FIGS. 19-1, 19-2, 19-3, 19-4 and 19-5 illustrate the switching functions performed for the received cells in the seventh pipeline cycle by the first, second, third, fourth and fifth pipeline stages of the switching apparatus according to an exemplary embodiment of the present invention;

FIGS. 20-1, 20-2, 20-3, 20-4 and 20-5 illustrate the switching functions performed for the received cells in the eighth pipeline cycle by the first, second, third, fourth and fifth pipeline stages of the switching apparatus according to an exemplary embodiment of the present invention;

FIGS. 21-1, 21-2, 21-3 and 21-4 illustrate the switching functions performed for the received cells in the ninth pipeline cycle by the second, third, fourth and fifth pipeline stages of the switching apparatus according to an exemplary embodiment of the present invention;

FIGS. 22-1, 22-2 and 22-3 illustrate the switching functions performed for the received cells in the tenth pipeline cycle by the third, fourth and fifth pipeline stages of the switching apparatus according to an exemplary embodiment of the present invention;

FIGS. 23-1 and 23-2 illustrate the switching functions performed for the received cells in the eleventh pipeline cycle by the fourth and fifth pipeline stages of the switching apparatus according to an exemplary embodiment of the present invention;

FIG. 24 illustrates the switching functions performed for the received cells in the twelfth pipeline cycle by the fifth pipeline stage of the switching apparatus according to an exemplary embodiment of the present invention;

FIG. 25 shows input and output time relation for the previous stream of cell arrivals for 8 pipeline cycles and the switch operation for up to 22 pipeline cycles until all the cells resident in the global buffer space are output. The update process for the sliding-window counter belonging to the read stage is also shown.

FIG. 26 illustrates the occupancy of multidimensional global buffer space for cells input to the switching apparatus for 12 consecutive cycles, according to disclosed sliding-window switching method of the present invention;

FIG. 27 shows input and output time relation for a stream of incoming cells for 12 pipeline cycles and the status of the sliding-window counter in the read stage, according to the exemplary embodiment of the switching apparatus and method of the present invention; and FIG. 28 illustrates operation of the switch under an unbalanced traffic where a multiple stream of incoming cells are destined to one particular output port. Under such traffic conditions, the process of queue control inside the globally shared buffer space is shown. The occupancy of multidimensional global buffer space and an instance of cell discard for cells input to the switching apparatus for 16 consecutive cycles, according to the switching method of the disclosed invention, is also shown.

DETAILED DESCRIPTION OF THE PREFERRED EMBODIMENTS

Referring now in specific detail to the drawings, with reference numerals identifying similar or identical elements the preferred embodiment of the present invention will be described. FIG. 2 shows the overall architecture of the ATM switching system as an example of the packet switching apparatus employing decentralized pipeline control of memory and switching functions according to this invention. In FIG. 2, the input lines are denoted by $1_1, 1_2, \ldots 1_n$ and the output lines are denoted $2_1, 2_2, \ldots 2_r$. Input lines carry the incoming ATM cells and the output lines carry the outgoing ATM cells after being switched to their output destination by the ATM switching system of FIG. 2. In this switching system, no central buffer controller is used to centrally store addresses of cell headers in the address queues or to keep track of all the read and write operations for all the memory modules or to coordinate corresponding buffer management operations or to provide related control instructions to different components of the switching apparatus. The disclosed switching system uses a decentralized control according to which each incoming ATM cells are assigned a self-routing tag. The self-routing tags allow the ATM cells to independently (means not under the instruction of a central controller) proceed through the different stages of the switching apparatus and enable various switching functions to take place at different stages based on the information stored in the self-routing tags of the cells. The incoming cells are processed by header processing circuits $10_1, 10_2, \ldots 10_n$ for extraction of the output line destination address denoted by d. The destination address of incoming cells are forwarded to a self-routing parameter assignment circuit 14. The self-routing parameter assignment circuit 14 uses the output destination information d and a parameter assignment method to provide a set of self-routing parameters (i,j,k) to each incoming ATM cells. The self-routing parameters (i,j,k) which are obtained by the self-routing parameter assignment circuit 14, are then attached as a self-routing tag to the incoming ATM cells by the header processing circuits $10_1, 10_2, \ldots 10_n$. Hereinafter, each incoming cells use the attached self-routing tag (i,j,k) to propagate independently through various stages of the disclosed ATM switching apparatus of FIG. 2. The parameter i in a cell's self-routing tag designate the memory module that the cell will be stored in; the parameter j in a cell's self-routing tag designate the memory-location in the $i^{th}$ memory module that the cell will be stored to; the parameter k in the self-routing tag designate an additional parameter called the scan plane which help decide when a given ATM cell is to be read out of the memory for output purposes. The input interconnection network 20 uses the parameter i of the routing tag of an incoming ATM cell to route the cell on a given input line to its $i^{th}$ output line which in turn is connected to the respective $i^{th}$ memory module. Input lines of the interconnection network 20 connects itself to the header processing circuits $10_1, 10_2, \ldots 10_m$ while the output lines of the interconnection network 20 connects itself with the memory modules of the switching apparatus. Input modules $30_1, 30_2, \ldots 30_m$ are used corresponding to each one of the memory modules $40_1, 40_2, \ldots 40_m$. The input modules $30_1, 30_2, \ldots 30_m$ can be used for multiple purposes however, the primary purpose of the input modules $30_1, 30_2, \ldots 30_m$ is to hold a received cell for a predetermined time period before being stored in the respective memory modules. Another function of modules $30_1, 30_2, \ldots 30_m$ is to hold a received ATM cell and provide the parameters j and k information from the cell's self-routing tag to memory controllers $50_1, 50_2, \ldots 50_m$. The memory controllers use the parameter j to write the received ATM cell in the $j^{th}$ memory-location of the corresponding memory modules $40_1, 40_2, \ldots 40_m$. Corresponding to each memory controller $50_1, 50_2, \ldots 50_m$ there is one Output Scan Array (OSA) each with σ locations. The $j^{th}$ location of the Output Scan Array (OSA) holds the scan value of a received ATM cell stored in the corresponding $j^{th}$ location of its memory module. OSA of each memory controller is updated at the time of Write and Read of ATM cells to and from the respective locations in the memory modules. During the Write cycle of an incoming cell to $j^{th}$ memory location in a given memory module i, the scan-plane value (k) of the received cell is stored in the corresponding $j^{th}$ location in the Output Scan Array (OSA) of the corresponding memory controller. During the Read cycle of a cell from the $j^{th}$ location of a memory module, the corresponding $j^{th}$ location in the Output Scan Array (OSA) is set to 0 to indicate empty memory-location in the corresponding memory module. During the ATM cell read cycle, the ATM cells are output from parallel and independent memory modules $40_1, 40_2, \ldots 40_m$ and are finally routed to respective output destinations $2_1, 2_2, \ldots 2_r$ by the output interconnection network 60. The output interconnection network 60 makes use of the output port destination information d stored in a cell's header to route each cell to final output destination $2_1, 2_2, \ldots 2_r$. In the exemplary embodiment of the disclosed ATM switching apparatus of FIG. 2, the final output line destination information 'd' can also be seen as a part of the routing tag, with the difference that instead of residing in the routing tag, the destination information 'd' resides in the header of each incoming cells.

The ATM switching apparatus of the disclosed invention makes use of a new switching method called the Sliding-Window ATM switching method. The following section describe the underlying switching functions of the disclosed invention of the Sliding-Window ATM switching method.

THE SLIDING-WINDOW ATM SWITCHING METHOD

According to the disclosed Sliding-Window ATM switching method, the entire buffer space which includes all the ATM cell memory locations in all of the memory modules $40_1, 40_2, \ldots 40_m$, is represented as a three dimensional space (i,j,k) and is shown in FIG. 3. The total buffer space of the switching system of FIG. 2 is also called shared buffer space or global buffer space as multiple input and output lines can have access to memory locations belonging to any of the memory modules $40_1, 40_2, \ldots 40_m$ employed in the exemplary embodiment of switching apparatus of FIG. 2. In the sliding-window switching method, the ATM memory locations in the global buffer space are represented by state (i,j,k) where $i^{th}$ coordinate represent the memory-module; i=[1 . . . m], where m is the number of memory modules $40_1, 40_2, \ldots 40_m$ employed in the switching apparatus;

$j^{th}$ coordinate represent the output-slot vector (osv); j=[1 . . . σ], where σ is the number of ATM cell memory locations in the memory modules;

$k^{th}$ coordinate represent the scan-plane (sp) value; k=[1 . . . p]. where p is used as an upper bound that designate the number of times, compared to the scan length σ, that an output queue's length can grow up to.

As shown in FIG. 3, The $(i,j)^{th}$ plane of the buffer space is called the scan plane and is designated by $15_1, 15_2, \ldots 15_p$. Each scan plane is divided into σ output-slot-vectors (OSVs). Each OSV consists of a m number of consecutive slots (also called memory slot), where m is the number of memory modules $40_1, 40_2, \ldots 40_m$ employed in the system. The output-slot vector (OSV)j represent a group of $j^{th}$ ATM cell memory locations in the m number of employed memory modules. The sliding-window 18 (shown in FIG. 3) is a pointer to a group of cells forming the output-slot vectors (OSV) in the memory space and it advances by one OSV upon completion of every switch cycle on a given scan plane. Input and output of ATM cells take place with respect to the current location of the sliding-window and the last cell admitted to the multidimensional global buffer space. The location of the sliding window (SW) 18 in the global buffer space is described by two variables indicated by (i) SW.osv (interchangeably used with SW.j) and (ii) SW.sp (interchangeable used with SW.k). For example, in FIG. 3, the sliding-window 18 is a pointer to the OSV=j=5 and is traversing on the second scan plane $15_2$ having k=2. For such a state of the sliding-window in the above example SW.osv=SW.j=5 and SW.sp=SW.k=2. The symbol 'osv' and 'sp' denote output slot vector and scan plane and are interchangeably used, in this description, with j and k variables respectively. The variable SW.sp (which is interchangeably used with SW.k) holds an integer value which is incremented by one on the completion of sliding-window's traversal on each scan-plane. Similarly, the variable SW.osv (which is interchangeably used with SW.j) holds an integer value which is incremented by one on the completion of sliding-window's traversal of a given output slot vector (OSV). To keep the SW.sp and SW.osv variables from becoming unbounded, the modulus of the scan-plane variable with a predetermined upper bound value (p) of the scan-plane and the modulus of the OSV variable with a predetermined upper bound value σ of the output slot vector (OSV) is taken. The Sliding-Window 18 of FIG. 3 traverses the entire global buffer space by traversing σs output slot vectors (OSVs) on all of the employed scan-planes $15_1, 15_2, \ldots 15_p$ in a circular fashion. For an incoming ATM cell destined to output line d of the switching apparatus, the assignment of a memory-slot (i) of an OSV(i) on a scan-plane (k) is dependent on the length of its output queue, $Q_d$ in the global buffer space and on the current location of the sliding-window 18. The successive cells of an output queue $Q_d$ occupy successive OSVs with one of its cells in one OSV on a given scan-plane. When the queue $Q_d$ exceeds the $\sigma^{th}$ OSV on one scan-plane, it starts acquiring slots of the OSVs of the next scan plane. Thus an output queue can grow up to a length of $\sigma$ on a given scan plane. $\sigma$, the number of OSVs on one scan plane is also called the scan-length of the employed global buffer space and is equal to number of ATM cell locations in a given memory module. The number of scan planes $15_1$, $15_2$, ... $15_p$ to be employed in the switching system is determined by the maximum queue length (=p.$\sigma$) allowed for an output port. If the maximum length of an output queue is allowed to be p.$\sigma$ then p scan planes are employed in the system, as an output queue can grow only up to a length of $\sigma$ on a given scan plane. As an example, if the maximum length for output queues is allowed to be 2048 ATM cells in the global buffer space (i.e. p.$\sigma$=2048) of the ATM switching apparatus; and if the number of ATM cell memory locations in memory modules $40_1, 40_2, \ldots 40_m$ is equal to 512 ATM cells (i.e. $\sigma$=512) then the number of scan planes to be employed in the switching apparatus=p=(2048/512)=4. In effect, the number of scan-planes i.e. p, employed in the ATM switching system of FIG. 2, controls the allowed maximum number of cells waiting for an output port (i.e. maximum queue length) inside the global buffer space which includes all the ATM cell memory locations in all of the memory modules $40_1, 40_2, \ldots 40_m$.

The concept of traversal of the sliding-window through the entire buffer space and its relation to the switch cycle and the switching operation is depicted by the flow-chart of FIG. 4. The traversal of the sliding-window through multidimensional global memory space depicts the way the sliding-window pointer is updated along with the switching functions performed every switch cycle. In flow chart of FIG. 4, step 400 indicate beginning of the switch operation. Step 402 shows the initial value of the variables SW.osv and SW.sp, indicating initial location of the sliding-window in the global buffer space. On the onset of the switching operation, as shown in step 404, various switching functions are performed on the incoming cells. The switching functions may include one or more of the following operations: read destination addresses from headers of the incoming cells, update counters and tables, attach a new self-routing tag to the cells, write cells to the memory modules, read cells from memory modules etc. Upon completion of the switching functions, the system waits in step 406 for start of a new cycle. In the case no cells received or no switching functions to be performed in step 404, the system justs goes to the step 406 and wait for a new cycle to start. In the beginning of every new cycle, counters and variables are updated in step 408 to account for changes, if any, in the previous switch cycle. In the new switch cycle, the sliding-window is advanced to the next OSV in step 410 with its scan plane variable i.e. SW.sp being unchanged. Step 412 examines if the sliding window has already traversed all the OSV on a given scan plane and if it needs to start traversing the new scan plane. If the sliding window has not traversed all the OSV on a given scan plane then the flow loops back to step 404 to perform new switching function corresponding to new value to the sliding-window pointer. If the sliding-window has traversed all OSVs on a given scan plane and is starting over with the initial OSV of 1 (as indicated by the initial value of 1 for OSV, in step 412), then scan plane variable of the sliding window i.e. SW.sp is updated in step 414 to indicate the beginning of its traversal on the successive scan plane. With the updated location of the sliding window denoted by the variables SW.osv and SW.sp, the new switching functions are performed and it is denoted by the control flow loop back to step 404. Upon completion of the switching functions in step 404, the system again waits for a new cycle in step 406. The underlying switching function of the sliding-window method at step 404 is that during the input phase of each switch cycle, incoming ATM cells are assigned memory locations within the global buffer space with the help of self-routing parameter assignment circuit 14 and during the output phase of each switch cycle, all the ATM cells belonging to output-slot vector (OSV), pointed by the sliding window (SW) 18 on a given scan-plane, are output. Output phase of the switch which consists of reading out the cells from memory modules and their routing through the output interconnection network, marks the end of one switch cycle. The sliding window (SW) 18, as shown in FIG. 3, cyclically scans the entire buffer space by traversing all of the $\sigma$ OSVs on each scan-plane (sp) of the global buffer space and as shown in FIG. 4, switching functions are performed corresponding to every state the sliding-window during its traversal of the multidimensional global memory space.

In the exemplary embodiment of the present invention, the switching of ATM cells by the switching apparatus of FIG. 2, is partitioned into multiple independent operations. Namely, the self-routing parameter assignment operation, routing of cells to memory modules using input interconnection network, ATM-cells' memory WRITE operation, ATM-cells' memory READ operation, and routing of cells obtained from memory modules to the destined output lines using output interconnection network.

SELF-ROUTING PARAMETERS (i,j,k) ASSIGNMENT

As mentioned earlier, the assignment of self-routing parameters (i,j,k) to the incoming cells is achieved by the parameter assignment circuits 14. An additional routing-tag carrying the self-routing parameters (i,j,k) are attached to each incoming ATM cells. The self-routing parameter help ATM cells to self propagate through the switching apparatus of FIG. 2. The self-routing parameter also help achieve independence from the use of any centralized buffer controller and hence facilitate decentralized and pipeline control for faster switching operations.

Determination of self-routing parameters (i, j, k) by an exemplary assignment circuit 14 for an incoming ATM cell is shown by the flow chart of FIG. 5. The symbols used therein are described as follows:

d is the switching system's output-port $2_1, 2_2, \ldots 2_r$ destination which resides in the header portion of the incoming ATM-cell; In the exemplary embodiment of switching apparatus of FIG. 2, d={1,2, ... r}.

$i_d$ is the assigned output-slot vector (OSV) in the global buffer space for an incoming ATM cell destined to output port d.

$k_d$ denotes the assigned value of the scan-plane in the global buffer space for an incoming ATM cell destined to output port d.

$i_d$ is the assigned memory slot in the assigned OSV, $j_d$ above. $i_d$ designates one of memory modules $40_1, 40_2, \ldots 40_m$.

$\sigma$ is the maximum number of output slot vector (OSV) present on the scan planes of the global buffer space.

p is the maximum number of scan-planes $15_1, 15_2, \ldots 15_p$ employed in the global buffer space.

X is the set of all ATM cells input during a given switch cycle, 0<=|X|<=n, where n is the number of input ports $1_1, 1_2, \ldots 1_n$.

The assignment circuit 14 and the flow diagram of FIG. 5 use a set of counters and tables (shown in FIG. 6) to facilitate the assignment of self-routing parameters. The self-routing parameter assignment circuit 14, in this exemplary embodiment of the ATM switching apparatus, uses two separate processors FIG. 6. The first processor 600 receives the destination address of the incoming cells from header processing circuits $10_1, 10_2, \ldots 10_n$ and use steps 506 to 524 of the flow chart in FIG. 5 to assign j and k parameters. Once the j and k values are determined, processor 1 sends j and k parameters to another processor 650 for determination of the parameter i. While processor 2 works to find as parameter for a cell as shown in step 526 of FIG. 5 flow-chart, the processor 1 starts working in parallel on determination of j and k parameters for the next cell. In effect, processor 1 600 and processor 2 650 of FIG. 6 work in parallel to determine j,k parameters and the corresponding $i^{th}$ parameter for incoming cells in a given cycle. The counters 610 and 670, called sliding-window counter, hold the current location for the sliding-window pointer in global buffer space. With every switch cycle, the sliding-window counters 610 and 670 of processors 600 and 650 update its value independently according to the sliding-window traversal concept of FIG. 4. The relation of update of the sliding-window counter values with each switch cycle and associated switching functions is shown in the flow chart of FIG. 4. In FIG. 6, the sliding-window counters 610 and 670 specify variable SW.osv which designate the OSV that holds the current location of the sliding window in global memory space in a given switch cycle. The counters 610 and 670 also specify variable SW.sp which designate the scan-plane that holds traversal of the sliding-window in a given switch cycle. The queue length counter (QLC) 620 holds the length of the queue of cells destined to respective output port $2_1, 2_2, \ldots 2_r$ destinations. The respective queue length is designated by $Q_d$ where d=1,2, ... r. The counter 630, called Last cell counter (LLC), holds the value of scan plane and output slot vector of the last cells entered in the global buffer space for all the output port $2_1, 2_2, \ldots 2_r$ destinations. The variable $(LC.j)_d$ designate the OSV-value assigned to the last-cell destined to the output d and the variable $(LC.k)_d$ designate the scan-plane value assigned to the last-cell destined to the output d. A two dimensional array 660, also called scan table (ST), is used for determination of parameter i by the processor 2 650 of FIG. 6. The slots of the scan table are designated by ST(i,j) wherein i and j denote the rows and columns of the scan table respectively. The parameter i can take value from 1 . . . to m, where m is the number of memory modules $40_1, 40_2, \ldots 40_m$ employed in the exemplary switching system of FIG. 2. The parameter j can take value from 1 . . . to σ, where σ is the number of ATM memory locations in the employed memory modules $40_1, 40_2, \ldots 40_m$. The content of a slot of the scan table i.e. ST(i,j) holds only the value of the scan variable k belonging to the ATM cell which is stored in the $j^{th}$ location of the $i^{th}$ memory module in global buffer space. Hence ST(i,j)=k, where k>0, indicate that the $j^{th}$ location of the $j^{th}$ memory module hold a valid ATM cell whose scan-plane value is k. Whereas, ST(i,j)=0 indicate that the j location of the $i^{th}$ memory module in the global buffer space is empty and do not hold a valid ATM cell.

The flow chart in FIG. 5 shows the assignment process for the self-routing parameter (i,j,k) to the incoming ATM cells.

In these steps, the output slot vector (osv) and scan-plane value (sp) are also represented by j and k variables interchangeably. $Q_d$ represent the queue length for output d. X represent the set of ATM cells input to the switch during a given switch cycle. $j_{x \rightarrow d}$ or just $j_d$ represent the OSV assigned to the cell x destined to output d. $k_{x \rightarrow d}$ or just $j_d$ represent the scan-plane value assigned to the cell x destined to output d.

Step 500 shows the initial state where X cells are input in a given cycle through the incoming ports $1_1, 1_2, \ldots 1_n$. Step 502 shows removal of a cell x from the non-empty set of input cells $X_t=\{x(t)|t=\text{current cycle}\}$ for the purpose of determining output port d for the chosen ATM-cell x in step 504. The steps 502–504 can also be performed by the header processing circuits. The determination of the output port d is straight forward, as the incoming ATM cell header already contains the information about its output port destination. The output port destination information d, and the QLC counter 620 in FIG. 6 helps determine the queue length $Q_d$ for the cell x in step 506 of the flow chart in FIG. 5. Step 506 also increments the value of $Q_d$ to take into account the new arrival. According to step 508, if $(Q_d > p.\sigma)$ then cell x is dropped and $Q_d$ value is decrement by one in step 510 and the assignment process loops back to step 502 to process another cell input in that cycle. Here p.σ is a predetermined upper limit imposed on the length of a queue inside the global buffer space.

In step 512 the queue length of a given destination port is compared. If $Q_d=1$ then it means it is the only cell for the given destination port 'd' in the global buffer space and it need not wait inside the buffer as there are no other cells for that destination port waiting for its turn to be read out. In such a case, step 514 is followed according to which the OSV and the scan plane value of the current location of the sliding window counter 610 is assigned as j and k parameters for the incoming cells in step 514 of FIG. 5 i.e. $\{j_d=(LC.j)_d=\text{SW.osv}; k_d=(LC.k)_d=\text{SW.sp};\}$. If the value of $Q_d>1$ then it means that the queue has been building up for the cells destined to output port d and the steps 516, 518, 520 and 522 are used along with the last cell counter 630 (FIG. 6) to assign the j and k parameters to the incoming cells. According to step 516 $\{j_d=(LC.j)_d \bmod \sigma+1\}$ which means consecutive OSV i.e. OSV next to the given destination's last cell's OSV is assigned as the j variable for the incoming ATM cell. To assign k variable, the assigned OSV $j_d$ to the incoming cell destined to output port d, is first examined in step 518. if $j_d=1$ as shown in step 518 then it means that the assigned output slot vector is on a new scan-plane and the scan-plane value to be assigned to the incoming cell is increment by 1, in step 522 as $k_d=(LC.k)_d \bmod p+1$. On the contrary, if the value of the assigned $j_d$ to the incoming cell is not equal to 1 then it means that the assigned output slot vector is on the same scan plane as the last cell assigned for that destination's output queue and same value of the LC.k from the counter 630 is assigned as the k parameter for the incoming cell in step 520 of the flow chart of FIG. 5. By now in the flow chart of FIG. 5, an incoming cell destined to d, has obtained two out of its three routing parameters i.e. for OSV as $j_d$ and the scan plane $k_d$.

Step 524 in the flow chart of FIG. 5 indicate that once the j and k parameters are determined by processor1 600 of FIG. 6 then they are sent to another special purpose processor2 650 of FIG. 6 for the determination of its i parameter with the help of a scan table 660. Processor1 640 starts processing to determine next cells j and k parameter (as shown by the loop back in step 528 of the flow chart in FIG. 5) in parallel with the processor2 680 which is working to find the i parameter (as shown by step 526 of the flow chart in FIG. 5) for the previous ATM cell. While assigning $i^{th}$ parameter, attempt is made by the processor 2 650 to assign different $i^{th}$ parameter (i.e. different rows in the scan table 660) to the cells belonging to the same input cycle so that they can be routed by the input interconnection network 20 to respective memory modules $40_1, 40_2, \ldots 40_m$ in parallel with smaller delay. Assignment of different $i^{th}$ parameter to the cells belonging to same input cycle enhance the parallelism while routing the cells to different memory modules. One way to assure the assignment of different memory modules is to employ sufficient number of memory modules in the switching apparatus so that the sufficient number of memory slots are always available in an assigned output slot vector. The minimum number of memory modules to be employed in the system also depend on the maximum length of queue allowed in the switching apparatus and is discussed in detail in a later section.

Once ATM cells get their self-routing tag (i,j,k) from the parameter assignment circuit 14, the ATM cells, thereafter, are self routed through the various stages of the switching apparatus of FIG. 2.

INPUT INTERCONNECTION NETWORK

The input interconnection network examines the $i^{th}$ parameter of the routing tag of received ATM cells and provide routing of the ATM cell to its $i^{th}$ output line which is connected to the $i^{th}$ memory module. Mapping of cells from its input lines to its output lines of the input interconnection network 20 can be achieved in very many ways and operations of such interconnection networks are well known in the art. One way to provide the needed input and output mapping function is to use a processor local to the interconnection network 20 and the information in $i^{th}$ parameter of self-routing tag of the incoming cells. Another well known way is to use a self-routing multistage interconnection network where each node looks at the $i^{th}$ parameter of the routing tag to know the output line destination of the received cell and perform the corresponding switching. The size n×m of the input interconnection network 20 is used, where n is the number of input lines and m is the number of memory modules employed in the preferred embodiment of the switching apparatus according to the present invention.

MEMORY MODULES

A plurality of memory modules are employed in the switching apparatus. Memory modules are placed in between the input interconnection network 20 and output interconnection network 60 as shown in the preferred embodiment of the switching apparatus, FIG. 2, according to the present invention. Each output line of input interconnection network 20 and input line of the output interconnection network 60 are connected to a single memory module. The memory modules employed in the disclosed switching apparatus of the present invention can be either single-port or double-port memory modules. In case of the use of dual port memory modules, the data-in port of a memory module is connected to a output line of the input interconnection network 20, while the data-out port of a memory module is connected to a input line of the output interconnection network 60.

ATM-CELL WRITE OPERATION

The FIG. 7 provide the detailed structure of the memory control component known as the sliding-window memory controller $50_1, 50_2, \ldots 50_m$. Every memory module $40_1, 40_2, \ldots 40_m$ has a corresponding sliding-window memory controller $50_1, 50_2, \ldots 50_m$ which is used to provide the write and read addresses for memory-write and memory-read operations needed for switching of ATM cells. The write operation performed by the memory controllers is shown by a flow diagram in FIG. 8. According to the disclosed switching method of the present invention, the routing tag of the received ATM cells are sent to the controllers $50_1, 50_2, \ldots 50_m$ by the input modules $30_1, 30_2, \ldots 30_m$ and is shown in step 850 of FIG. 8. As shown in step 852 of FIG. 8, the memory controllers $50_1, 50_2, \ldots 50_m$ use value of the j parameter in the self-routing tag as the WRITE address to write the received ATM cell to the $j^{th}$ ATM location in the respective memory modules $40_1, 40_2, \ldots 40_m$. The sliding-window memory controllers also use an array called output scan array (OSA) $54_1, 54_2, \ldots 54_m$ FIG. 7 each with σ slots. As shown in step 854 of FIG. 8, the OSAs $54_1, 54_2, \ldots 54_m$ stores the scan plane value k, obtained from the self-routing tag (i,j,k) of the received cells, in the $j^{th}$ location of the OSA for every ATM cells that are written in the $j^{th}$ location of the corresponding memory modules $40_1, 40_2, \ldots 40_m$. The scan value of 0 in a given OSA slot j means that the memory location j in the corresponding memory module, is empty and does not hold a valid ATM cell. The valid ATM cell locations in the memory modules $40_1, 40_2, \ldots 40_m$ always have a non zero scan value stored in the corresponding location of OSAs $54_1, 54_2, \ldots 54_m$.

ATM-CELL READ OPERATION

The ATM cell read operation performed by the memory controllers $50_1, 50_2, \ldots 50_m$ is shown by a flow chart steps 800–806 in FIG. 8. The memory controllers $50_1, 50_2, \ldots 50_m$ also use a sliding-window counter in the read processor $56_1, 56_2, \ldots 56_m$ FIG. 7 respectively which keeps the current location of the sliding-window in the global buffer space using the variables SW.sp and SW.osv. The sliding-window counters $56_1, 56_2, \ldots 56_m$ also update the variables SW.sp and SW.osv every switch cycle using the traversal method (which actually is the variable update process) of the sliding-window as depicted by the flow chart in FIG. 4. The sliding-window counters in $56_1, 56_2, \ldots 56_m$ FIG. 7 provide READ addresses for the output of the ATM cells from memory modules $40_1, 40_2, \ldots 40_m$ in a given switch cycle. Every ATM-cell READ cycle, the valid ATM cells belonging to location SW.osv from all the parallel memory modules $40_1, 40_2, \ldots 40_m$ are output. The validity of the cells is decided by the scan value k stored in the SW.osv location of the OSA as follows, (i) according to step 802 of FIG. 8, if the content (which is the scan plane value) of the location SW.osv in OSA=0 then it means that the location SW.osv in a given memory module is empty and no read operation is performed. (ii) according to step 804, if content of location SW.osv in OSA is not equal to SW.sp then the cell is not valid and a stored cell is not read from the location SW.osv. In such a case the cell is rather retained in the memory module for its turn in future read operations. (iii) according to step 804 in FIG. 8, a cell is read out of the memory module only if the content location SW.osv in OSA holds a value=SW.sp i.e. the scan plane value in the counter $56i$. Only under such a condition, step 806 of FIG. 8, the memory controller provide the READ address SW.osv for outputting the stored ATM cell from its memory module. As shown in step 806 of FIG. 8, every time a cell is output from a location j of a memory module, the memory controller updates the OSA by resetting OSA(j)=0 to denote the presence of an empty location in its memory module.

SIMULTANEOUS WRITE AND READ OPERATIONS

The disclosed switching apparatus can employ both single port or dual port memory modules. Use of dual port memory modules enhances the effective memory speed for read and write of ATM cells, and overall switching speed of the disclosed switching apparatus. Use of dual port memory will allow simultaneous WRITE and READ of ATM cells to and from a memory module in the same switch cycle only if WRITE and READ operations do not access same memory location. According to the disclosed switching method of the present invention, the parameter assignment phase ensures that WRITE and READ of ATM cells do not access same memory location of a given memory module. Hence the disclosed switching method makes it possible to use the dual port memory modules for the switching apparatus of the present invention. The WRITE and READ operations (FIG. 8) performed by the memory controllers, can be used for both the single port and dual port memory modules. In case of the use of dual port memory modules, the memory controllers will need to produce write address as well as the read address for their memory modules in the same cycle. The order of WRITE and READ operations performed by the memory controllers (FIG. 8) in a given cycle, to produce write and read addresses, does not matter as the operations performed in either order produce the same final result. For the sake of presentation, it can be assumed that in a given cycle, the memory controllers perform READ operations (FIG. 8) to produce read address before performing WRITE operations (FIG. 8) to obtain the write address.

OUTPUT INTERCONNECTION NETWORK

The output interconnection network 60 examines the destination information 'd' in the header of the received ATM cells. The output interconnection network provide switching of ATM cells received from the memory modules to the destined output lines of the switching apparatus. The output interconnection network architecture 60 can be similar to the one used for the input interconnection network 20. The self-routing multistage interconnection network, which are known in the art, can also be used for the output interconnection network to perform the needed input and output mapping of cells for switching purposes. Each node of the multistage interconnection network examines the destination information in the header of the received cell and perform respective switching functions. The size m×r of the output interconnection network 60 is used, where m is the number of memory modules and r is the number of output lines employed in the preferred embodiment of the switching apparatus according to the present invention.

For those skilled in the art, it will be obvious that the disclosed switching apparatus and method according to the present invention can manifest in various embodiments depending on the kind of interconnection networks used for input interconnection network 20 and output interconnection network 60. Such modifications are to be considered under scope the disclosed invention.

REQUIREMENT ON THE NUMBER OF MEMORY MODULES

The minimum number of memory modules employed in the system or the number of memory slots employed in an output slot vector (OSV) depends on the memory sharing scheme used for the global buffer space of the disclosed switching apparatus. A best possible delay-throughput performance in shared global memory space can be achieved if a cell of an output queue is delayed only by the preceding cells of its own non-empty queue. The disclosed switching method according to this invention achieves best possible delay-throughput performance by assigning routing parameters (i,j,k) in such a way that consecutive output slot vectors are assigned to the consecutive ATM cells of an output queue. However, the successful assignment of a memory slot in an assigned output slot vector require that a sufficient number of memory slots are deployed in the OSVs. Alternatively, it requires that a sufficient number of memory modules be employed in the switching apparatus in order to achieve best possible delay throughput performance.

The total number of memory location states available in the multidimensional global buffer space=p.m.σ. (FIG. 3). Since the finite global buffer space is divided into various scan planes, the occupancy of the scan planes is made mutually disjoint i.e. if a memory slot (i,j) is occupied on a given scan plane then the memory slot (i,j) will be forbidden on all other scan planes. Thus, in effect, occupancy of γ cells on any scan plane means p.γ states will become forbidden. Therefore, if γ incoming cells are assigned memory locations in the global buffer space then the remaining states available for occupancy is given by α (γ) where, $$\alpha(\gamma)=\text{Number of available states}=(p.m.\sigma-p.\gamma)=p.(m.\sigma-\gamma) \quad (1)$$

The multidimensional global memory space is shared by the cells belonging to all the output ports of the disclosed switching apparatus. One disadvantage of sharing is that because of its finite buffer space, it is possible for a single or a group of bursty source to occupy the entire buffer space and hence throttling the passage of ATM cells through the shared buffer for other source-destination pairs. Such a situation is a commonplace in a bursty environment and it causes the performance of a switch using a shared space to degrade especially at higher loads. In order to prevent such a situation, additional precautions are taken. One way to prevent such a situation is to impose an upper limit on the maximum length of output queues. An output port whose output queue has achieved the maximum queue length is considered saturated and an ATM cell arriving to a saturated output port is dropped in order to prevent an output queue from growing unboundedly. In the disclosed switching method, the length of an output queue is controlled by allowing the queue length not to exceed a certain predetermined number of scan-planes (p). Thus the use of scan planes in multidimensional global buffer space of the disclosed switching apparatus, in effect, controls the queue length of an output port.

Let the maximum length of an output queue allowed to be p.σ for a N×N size switch of the disclosed invention, employing a common global buffer space of capacity N.σ, where $1 \leq p \leq N$ and a being the employed scan length. Let i be the minimum number of destinations whose cells can occupy the entire buffer space by growing to their maximum length. Assuming, that all the i output queues can grow to its maximum length (=p.σ), the number of cells occupying the entire shared buffer space=i.p.σ. Under the conditions of complete occupancy of the global buffer space, the number of available states=0. Hence, using eq. (1), the number of available states after an occupancy of ipσ is given by $$\alpha(ip\sigma)=p(N\sigma-ip\sigma)=0$$

Thus, the minimum number of destinations (i) having their cells or packets occupy the common global buffer space of capacity $$N \cdot \sigma = i = \left\lceil \frac{N}{p} \right\rceil \quad (2)$$

As mentioned earlier, it's possible for a group of destination packets to completely occupy the shared space of the ATM switch and not allow other source-destination connections to be established through the shared buffer switch. Such a phenomena would result in degradation of the best possible delay-throughput performance and excessive cell-loss especially at higher loads or under nonuniform or unbalanced traffic. A fair sharing scheme would be to always allow each of the destination packets a connection through the shared buffer space despite the fact that a subset of destination packets might occupy the entire shared buffer space. If we allow the buffer space of capacity N.σ to be shared among N destination packets then additional memory-slots shall be employed in an OSV to always achieve best possible delay-throughput performance.

Let the common buffer space capacity=N.σ for a N×N switching apparatus employing σ output slot vectors and p scan planes in its multidimensional global buffer space. In the case of complete occupancy of the buffer-space, the number of occupied states in an OSV=(N.σ/σ)=N.

Also from eq. (2), the minimum number of destinations that can completely occupy the shared space $$= i = \left\lceil \frac{N}{p} \right\rceil.$$

According to this, it is possible for the sliding-window to encounter an OSV in a given cycle, whose slots might already be full with the packets of i destinations, and furthermore, it is also possible for cells or packets destined to the remaining (N−i) output ports to be input to the current OSV in the same cycle. In order to avoid any additional delays, (N−i) packets must be assigned the same OSV. In the worst case, this would require an OSV to accommodate additional (N−i) cells or packets. Hence in order to achieve best possible delay throughput performance, the minimum number of memory-slots in an OSV of the global buffer space and the minimum number of memory modules to be deployed in the disclosed switching apparatus of FIG. 2

$$= N + (N - i) = 2N - \left\lceil \frac{N}{p} \right\rceil. \quad (3)$$

where, $$i = \left\lceil \frac{N}{p} \right\rceil$$

from eq. (2).

Its known in the art that buffer sharing schemes have varying impact on the performance of a switch (using a finite globally shared buffer space) under various traffic conditions and a switching apparatus using a common buffer space must provide for various buffer sharing schemes to manage for the contention among various ports for the finite global buffer space. The disclosed switching apparatus and the method according to the present invention allow for multiple sharing schemes to be implemented, such as complete sharing, complete partitioning and partial sharing of the finite global buffer space, by controlling the number of employed scan-planes (p) employed in the global buffer space. In order to achieve best possible delay-throughput performance for a given switch size (N×N) and for a given buffer space (N.σ): depending on the sharing scheme used, different requirement is placed on the minimum number of memory modules to be employed in the disclosed switching apparatus. Here, σ is the scan-length or the number of OSV, and p is the number of the scan-planes (p) employed in the system.

COMPLETE SHARING OF A FINITE BUFFER SPACE

According to one embodiment of the present invention, the N×N ATM switching apparatus using multidimensional global buffer space may employ complete sharing of memory space of N.σ where σ is the number of output slot vectors (OSV) employed in the system. In the case of complete sharing of a finite buffer space with no restriction on the output queue length, it will be possible for a single-destination cells or packets to occupy the permitted shared space of N.σ. That is, it would be possible for an output queue to grow up to a length of N.σ. In this case, the number of scan-planes employed=p=N; the minimum number of destinations having their packets in the shared space $$= i = \left\lceil \frac{N}{p} \right\rceil = 1$$

(eq. 2); In order to achieve best possible delay-throughput performance, the total number of slots required in an OSV must at least be $$= 2N - \left\lceil \frac{N}{p} \right\rceil = 2N - 1$$

(eq.3); hence, the minimum number of memory modules employed in the switching apparatus of the present embodiment allowing complete sharing=2N−1.

COMPLETE PARTITIONING OF A FINITE BUFFER SPACE

In another embodiment of the present invention, the switching apparatus of a size N×N may use complete partitioning of its finite global buffer space N.σ equally among its N destinations, where σ is the number of output slot vectors employed in the system. In the case of complete partitioning of a finite buffer space among its destinations, the shared buffer space of capacity N.σ is divided into N partitions, i.e. an output queue is not allowed to exceed a length of σ i.e. one scan-length. Hence, the number of scan-planes employed p=1; The minimum number of destinations having their packets in the shared space $$= i = \left\lceil \frac{N}{p} \right\rceil = N$$

(eq.2). In order to achieve best possible delay-throughput performance, the minimum number of slots required in an OSV must be $$= 2N - \left\lceil \frac{N}{p} \right\rceil = N$$

(eq.3). According to the present embodiment, the disclosed switching apparatus simply reduces into the case of dedicated output buffer switch where a constant amount of dedicated buffer is employed at each output port and no sharing is allowed.

PARTIAL SHARING OF A FINITE BUFFER SPACE

According to yet another embodiment of the present invention, the switching apparatus may employ partial sharing of its finite global buffer space. Unlike the case of complete sharing approach, no one single destination queue is allowed to grow to a length so as to occupy the shared buffer space of N.σ, while unlike the case of complete partitioning approach, an output queue is allowed to grow beyond one scan-length (i.e. σ). According to the present embodiment of the switching apparatus, a restriction is imposed on the maximum length of an output queue. A maximum length of an output queue can take a value anywhere between σ and N.σ. Thus, according to this scheme, the number of scan-planes employed in the system= k, where 1≦k≦N. The minimum number of destinations having their packets in the shared space $$= i = \left\lceil \frac{N}{k} \right\rceil$$

(eq.2). In order to achieve best possible delay-throughput performance, the minimum number of slots required in an OSV $$= 2N - \left\lceil \frac{N}{k} \right\rceil$$

(eq.3). Hence according to the present embodiment of the switching apparatus allowing a partial sharing of finite global buffer space, the minimum number of memory modules employed in the system $$= 2N - \left\lceil \frac{N}{k} \right\rceil.$$

FIG. 9 illustrates a method to partition the overall switching function according to another embodiment of the disclosed switching apparatus and method. According to the present embodiment, the overall switching function of the apparatus is divided in to multiple and independent stages as following : (i) first stage, also called self-routing parameter assignment stage, consists of the header processing circuits and the self-routing parameter assignment circuit 14, (ii) second stage consists of the input interconnection network 20 and its operations performed on the received ATM cells, (iii) third stage operation include the operations involved with the WRITE of received cells to the memory modules, (iv) fourth stage include the operations performed for the READ of ATM cells from the memory modules, and (v) fifth stage include output interconnection network 60 and associated operations performed on the received cells. In this example, the switching apparatus is divided into 5 pipeline stages. However, it should be understood by those skilled in the art that there may exist other embodiment of the present invention according to which the switching apparatus can be divided into more than 5 or less than 5 pipeline stages and such modifications shall be considered within the scope of the present invention. According to the pipeline operation of the switching apparatus of the present invention, the pipeline stage that takes the longest time to complete its switching function is chosen to be the pipeline cycle time (t). The pipeline cycle time is always chosen such that the longest pipeline stage is much less than the switching time (T) of the non- pipeline based switching apparatus. In FIG. 5, the pipeline cycle t is shown, as an example, to be one fifth of the switching cycle i.e. T=5 t. FIG. 9 shows the time chart for scheduling various switching operations in different stages at different pipeline cycles. Various stages of the time chart is denoted by (s,t) where s denote the pipeline stage and t denote the pipeline cycle. For example, in the first

TABLE 1

Requirement on the minimum number of memory modules for different buffer sharing schemes for various embodiments of the disclosed switching apparatus of Size N × N and memory space of N.σ (note: If σ is the scan length then N memory modules will be constitue a memory space of N.σ)

| Buffer Sharing scheme (for a shared space = N.σ) | Required minimum number of memory modules in the system for best delay throughput performance | Required minimum number of extra memory modules for best delay throughput performance | Number of scan-planes employed in the system |
|---|---|---|---|
| Complete Sharing | 2N−1 | N−1 | N |
| Complete Partitioning | N | 0 | 1 |
| Partial Sharing | $2N - \lceil \frac{N}{k} \rceil$ | $N - \lceil \frac{N}{k} \rceil$ | k (1 < k < N) |

DECENTRALIZED PIPELINE OPERATION OF THE DISCLOSED ATM SWITCHING APPARATUS

According to another preferred embodiment of the switching apparatus of the present invention, the overall switching function of the switching apparatus is partitioned into multiple stages such that all of them can perform needed switching functions independently in the same cycle without any conflict. Once the switching apparatus is divided into independent stages then these stages can operate in a pipeline fashion on received ATM cells or packets to achieve overall switching operation. The switching operation is decentralized in the sense that there is no central controller directly coordinating, controlling or managing the operations of multiple stages of the disclosed switching apparatus.

pipeline cycle, an incoming cell goes through the first stage of the switching apparatus where a self-routing tag is computed and assigned to the cell. First stage operations in the first pipeline cycle is denoted by the process state (1,1). After obtaining their routing tags in the first stage, the group of incoming cells in the first pipeline cycle, are sent to the second pipeline stage in the second pipeline cycle, denoted by process (2,2) in the time chart, for their switching to respective memory modules by the input interconnection network. In the second pipeline cycle, a new set of incoming cells are also sent to the first stage for obtaining their self-routing tag which is indicated by the process state (1,2). The process (2,2) and process (1,2) are executed in parallel and as the pipeline stages fill up with multiple tasks, a great degree of parallelism and hence a speed up in throughput is achieved by the disclosed switching method and apparatus while performing the switching of ATM cells.

While operating multiple stages in a pipeline fashion of a switching apparatus, it becomes quite important to have a way to update global variables in one stage and still have the updates available locally to another stage that needs it for its operation. This task is quite easy for the switching systems that use a centralized controller as any update in a global variable is coordinated and managed centrally and all the updates are readily accessible to all the components of the switching system that needs it. The solution to this problem is not obvious for a pipeline based switching apparatus of the present invention. For example, for the pipeline system described in FIG. 9, when a cell is read out of the memory in the fourth stage, the information regarding the availability of the memory location in the global buffer space must be made avaiable, in some way, to the first stage where the new incoming cells are assigned self-routing parameters based on the current occupancy of the global buffer space. In order to achieve a coordinated operation of the present embodiment of the pipeline based switching apparatus, some additional update operations might needed by some pipeline stages in order to accomodate for the centrally updated global variables. The switching functions along with the needed global variable update operations for the present embodiment of the disclosed switching apparatus are presented for each pipeline stages as follows.

PIPELINE STAGE—1: SELF-ROUTING PARAMETER (i,j,k) ASSIGNMENT STAGE

The parameter assignment stage consists of header processing circuits and parameter assignment circuit 14 of the switching apparatus. As mentioned earlier in an exemplary embodiment of the parameter assignment circuit 14 FIG. 6, it uses two processors 600 and 650. Both of these processors use sliding-window counters which are updated according to the flow diagram of FIG. 4. The parameter assignment circuit also uses other counters such as QLC 620, LCC 630 and a scan table 660 in order to assign self-routing parameters to incoming cells. However, in order to correctly assign parameters to incoming cells, these counters need to be updated each cycle for dynamically changing global variables, for example, to account for outgoing cells and newly emptied memory locations due to the read operation performed in pipeline stage 4 of the switching apparatus. For each outgoing cells in pipeline stage-4, the pipeline stage 1 needs to update the corresponding queue length counter (as it will be reduced by one for an outgoing cell) and the scan table 660 (as it needs to update the availability of memory locations in the global memory space for outgoing cells in the pipeline stage 4).

The disclosed switching apparatus and the method is configured to achieve best possible delay-throughput performance and employs the required minimum number of memory modules to this effect. The disclosed switching apparatus and method assigns the self-routing parameters (FIG. 5) to incoming cells in such a way so as to achieve best possible delay-throughput performance. The disclosed switching method guarantees that one cell is read out of global buffer space each pipeline cycle for each output line of the switching apparatus provided that a cell for a given output line is present inside the global buffer space. Accordingly, in the beginning of each pipeline cycle, stage-1 updates its queue length counters i.e. QLC or $Q_d$ 620 by decrementing non-zero queue lengths by one to account for the cells being read out of the global memory space for respective output lines in the previous pipeline cycle of stage 4. Similarly, the processor 2 updates its scan table in the beginning of each pipeline cycle to take into account for the change in the occupancy of the global buffer space due to the read operation performed in the previous pipeline cycle by the pipeline stage 4. In order to update its scan table, the processor 2 makes use of the fact that in stage 4, each cycle the cells pointed by SW.osv and belonging to the scan-plane SW.sp are output (step 806, FIG. 8). The processor 2 uses this fact and hence uses the previous value of the sliding-window SW(osv,sp) to update its scan table in the beginning of each pipeline cycle. In this process, it assumes that all the cells belonging to the slots in column SW.osv of its scan table are output if the content of the slot is equal to SW.sp. To take into account for the output cells, the processor2 resets all such locations in its scan table, to zero, to indicate the availability of the memory locations in the global buffer space.

Each cycle the processor 1 performs operations in the following sequence:
(i) Update QLC (step 408 FIG. 4) to account for outgoing cells in the previous cycle as follows
    For d=1 to r; // For each output lines
        if $Q_d>0$ then $Q_d=Q_d-1$;
(ii) Update sliding window counter i.e. SW.osv and SW.sp to the next value according to steps 410–414 of the flow chart in FIG. 4.
(iii) Now proceed with the switching functions (step 404 of FIG. 4) for processor1 which is the determination of parameters (i and k) as shown in steps 502–524 of flow diagram in FIG. 5 for the incoming cells in that given cycle.

In the present embodiment of the switching apparatus where its overall switching function has been partitioned into multiple stages and are made independent of each other so as to achieve a pipeline based switching operation: the pipeline stages that use sliding-window counter, update its value with reference to the pipeline cycle as opposed to the switch cycle (in steps 400–414 of FIG. 4.).

Each cycle, processor 2 perform operation in the following sequence:
(i) Update (step 408 of FIG. 4) scan table 660 with previous value of the sliding-window counter 670 to take into account for the outgoing cells in the previous cycle. According to the disclosed switching method, each cycle, the cells belonging to the output slot vector SW.osv having its scan value k equal to SW.sp are output. This switching method is used to update the scan table as follows.
    For i=1 to m; // For slots in the previous output slot vector
        if ST(i, SW.osv)=SW.sp then set ST(i,SW.osv)=0.
(ii) Update sliding window counter i.e. SW.osv and SW.sp to the next value according to steps 410–414 of the flow diagram in FIG. 4.
(iii) Now proceed with the switching functions (step 404 of FIG. 4) for this processor i.e. the assignment of parameter i for the incoming cells for the previously assigned values of output slot vector j and scan-plane k. In this process an available $i^{th}$ memory slot in the $j^{th}$ column of the scan table is assigned as the $i^{th}$ parameter and the scan plane value, k is stored in the corresponding scan table slot i.e. ST(i,j)=k; Also while assigning $i^{th}$ parameter, attempt is made to assign different $i^{th}$ value to the cells belonging to the same cycle. This process helps to enhance the parallelism in the input and output mapping function performed by the input interconnection network 20 of the stage 2 while routing the received cells or packets to different memory modules. One of the methods of assigning $i^{th}$ parameter using the scan table, for the known value of j and k is shown by the following pseudo code.

Each cycle, initialize t[1.m]=0; // this keeps track of assigned memory modules in a cycle For each incoming cells of a cycle with parameters j and k;

For i=1 to m;
    if(ST(i,j)=0 and t[i]=0) then
        {set ST(i,j)=k; assign i for cells routing tag;
            t[i]=1; exit }

It can be noted from the pseudo code above that while assigning the $i^{th}$ parameter, processor 2 makes an attempt to assign different value of i i.e. different memory modules to the cells belonging to the same cycle.

Another way to assign the $i^{th}$ parameter, is to assign different values of i (i.e. different memory modules) to the cells belonging to the same cycle but in an increasing order. As an example, if i=3 has been assigned to a cell of the cycle then for the next incoming cell, attempt is made to assign i>3, if none of the greater values of i are available then only the smaller values are chosen.

Once the assignments of self-routing parameter (i,j,k) are completed in the first stage, the incoming cells are attached with their self-routing tags and are sent to the second pipeline stage in the following pipeline cycle.

PIPELINE STAGE—2: CELL ROUTING WITH INPUT INTERCONNECTION NETWORK

In a given cycle, the input interconnection network receive cells who have been assigned self-routing tag (i,j,k) in stage-1 in the previous pipeline cycle. Input interconnection network uses the $i^{th}$ parameter of the received cells and perform routing of the cells to the memory modules denoted by their $i^{th}$ parameter.

PIPELINE STAGE—3: ATM-CELL WRITE OPERATION

In order to achieve write and read of ATM cells in the same cycle, dual port memory modules are employed in the switching apparatus of the present invention. The use of dual port memory module for the disclosed switching apparatus and method has been discussed in an earlier section. The parameter assignment method of the disclosed invention, ensures that the write and read of ATM cells never access the same memory locations at the same time. Accordingly, the write of ATM cells are made independent of the read of ATM cells. During the write stage, the local memory controllers receive the routing tag information from the received cells and generate respective addresses for the received cells to be written in the respective memory modules. The controllers use the flow diagram of FIG. 8 to perform their write operation.

PIPELINE STAGE—4: ATM-CELL READ OPERATION

The pipeline stage 4 perform the read of ATM cells from the memory modules employed in the disclosed switching apparatus. The pipeline stage 4 also called the READ stage basically consists of the local memory controllers performing the read operation according to the flow diagram of FIG. 8. The memory controllers use a sliding-window counter which is initialized to SW.osv=1 and SW.sp=1 in pipeline cycle 4. Because of the pipeline operation of the switching apparatus, the cells that have entered the stage 1 with the initial value of the sliding-window counter become available to stage 4 for READ operation only in the pipeline cycle 4. Therefore, while following the sliding-window update process shown by flow diagram in FIG. 4, the cycle (which is pipeline cycle) in steps 400–414 is offset by 4 for sliding-window counter of the READ stage. According to this, in the fourth pipeline cycle, the sliding-window window of the READ stage will indicate "cycle=0" (the step 400 of flow diagram in FIG. 4) and the sliding window counters will be initialized to SW.osv=1 and SW.sp=1 and only then the first read operation takes place. Only after the first read of ATM cells from the memory modules i.e. after the pipeline cycle 4, the sliding-window counter of the read stage is updated in the beginning of each subsequent cycles. The subsequent read operation is performed by the local controller based on the new value of the sliding-window counter.

PIPELINE STAGE—5: CELL ROUTING WITH OUTPUT INTERCONNECTION NETWORK

The pipeline stage 5 mainly consists of the output interconnection network 60. Each memory module's data-out port is connected to an input line of the output interconnection network. In a given pipeline cycle, the output interconnection network receives cells output by stage 4 in the previous pipeline cycle. The output interconnection network obtains the final destination address 'd' of each received cell and perform routing of cells to respective output line destinations. All the switching decisions are made locally by the output interconnection network based on 'd' i.e. destination information in the header of the received cells.

EXAMPLE OF THE PIPELINE OPERATION OF THE SWITCH

FIG. 10 shows an example of a configuration of a 4×4 ATM switching apparatus according to the disclosed invention. The switching apparatus, in this example, employes memory modules each having a capacity to store 12 ATM cells. The switching apparatus, in this example, is configured to handle a maximum queue length of 24 ATM cells within the global buffer space for any given output port. This means that two scan planes (p=2) would need to employed in the multidimensional buffer space of the switching apparatus of the disclosed invention. Based on these values, i.e. N=4 and p=2, the required minimum number of memory modules is calculated, using eq. (3), to be 6 i.e. m=6. Also shown in the FIG. 10 is an stream of incoming cells input to the example switching apparatus for 8 pipeline cycles. In FIG. 10, input ports of the 4×4 switch are denoted by W,X,Y and Z respectively. Also, the group of cells arriving in eight input cycles are denoted by letter 'A' through 'H'. Each incoming cell is denoted by its output line destination address. For example, the cell arriving in second pipeline cycle on the input port X is destined to the output line '2'. Similarly, the group of cells arriving in second pipeline cycle is denoted by 'B'.

FIG. 11 also shows different pipeline stages of the switching apparatus according to the present invention. Since the switching apparatus is 4×4 and uses 6 memory modules, a 4×6 self-routing and a non-blocking interconnection network is used for pipeline stage 2. Similarly, a 6×4 self-routing and a non-blocking interconnection network is used for pipeline stage 5 in the exemplary embodiment of the disclosed switching system according to this invention. Each memory modules are implemented as dual port memory and use the local memory controller for WRITE and READ operations.

FIG. 12 shows the time chart for the pipeline operation of the exemplary 4×4 switching apparatus of FIG. 11 for 12 pipeline cycles. The incoming streams of ATM cells which are input for 8 pipeline cycles, as shown in FIG. 10, are used to demonstrate the detailed pipeline operation of the 4×4 switching apparatus according to the disclosed invention. For explanation purposes, A(1,1) in the time chart, denotes stage 1 of cycle 1 and it indicates that the input cells belonging to input group 'A' are being processed by the assignment stage of the switching apparatus of FIG. 11. Similarly, A(2,2) indicate that the group 'A' input cells are in the second pipeline stage in the second pipeline cycle, that is group 'A' input cells are being switched by the input interconnection network 20. A(3,3) indicate that the group 'A' input cells are being written to respective $j^{th}$ location of the $i^{th}$ memory modules in stage 3 of the pipeline cycle 3 which uses the flow diagram for WRITE operation in FIG. 8. R(4,4) means that the stage 4 is performing its read operation, according to the flow diagram in FIG. 8, in pipeline cycle 4. O(5,5) means that in stage 5, and pipeline cycle 5, cells that were read out of the memory modules in the previous pipeline cycle, are being switched to their final output line destination 'd' by the output interconnection network. Because of the pipeline operation performed on the incoming cells by different stages, the output of cells begin in the fifth pipeline cycle. FIG. 12 shows that after the initial delay of 5 pipeline cycles, cells are output (if present in the buffer) every pipeline cycle thereafter. FIG. 12 shows the operation of different stages of the disclosed switching apparatus on the incoming cells starting from A(1,1) when the first group of cells are input to the switching apparatus in the first stage in the first pipeline cycle, and ending at O(5,12) when a group of ATM cells are output by the $5^{th}$ pipeline stage of the $12^{th}$ pipeline cycle.

FIG. 13 shows the actual operation of the parameter assignment stage for the first group of incoming cells in the first pipeline cycle.

FIGS. 14-1 and 14-2 show the pipeline operations performed in the second pipeline cycle by the first two stages of the 4×4 example switching apparatus of the present invention.

FIGS. 15-1, 15-2, 15-3 show the pipeline operations performed by first three stages of the switching apparatus in the third pipeline cycle.

FIGS. 16-1, 16-2, 16-3, 16-4, 16-5 show the respective pipeline operations performed in the fourth pipeline cycle by different stages of the switching apparatus.

FIGS. 17-1 to 17-5 show the respective pipeline operations performed by different pipeline stages in the $5^{th}$ pipeline cycle.

FIGS. 18-1 to 18-5 show the respective switching operations performed by different pipeline stages in the $6^{th}$ pipeline cycle.

FIGS. 19-1 to 19-5 show switching operations performed by different pipeline stages in the $7^{th}$ pipeline cycle.

FIGS. 20-1 to FIGS. 20-5 show switching operations performed by different pipeline stages in the $8^{th}$ pipeline cycle.

FIGS. 21-1 to 21-4 show switching operations performed by different pipeline stages on the received cells in $9^{th}$ pipeline cycle.

FIGS. 22-1 to 22-3 show switching operations performed by different stages in the $10^{th}$ pipeline cycle. Note that in the $10^{th}$ pipeline cycle, only three stages are active (in the sense that changes are taking place) and have received new cells to process, while the first two stages are idle and they do not have any new cells to work on.

FIGS. 23-1 and 23-2 show switching operations performed by only last two stages in the $11^{th}$ pipeline cycle i.e. the READ stage and the output interconnection network stage. It can be noted that eventhough there are no new cells to be processed by the first stage, the switch still needs to process previously input cells in its memory space. Hence in the following cycles the last two stages will be active outputting the cells resident in the memory space.

FIG. 24 only shows the last stage of the switch in the $12^{th}$ pipeline cycle which outputs the cells read in stage 4 (shown in FIG. 23-1) in the previous pipeline cycle i.e. $11^{th}$ pipeline cycle. The READ stage is also active in the $12^{th}$ pipeline cycle, however it is not shown.

The detailed time chart for input and output of the same stream of cell arrivals (shown in FIG. 10) is given in FIG. 25. FIG. 25 also shows switching operations in different pipeline stages at different pipeline cycles along with the sliding-window counter update process for the READ stage. It can be noted that for READ stage the sliding-window counter update process starts only after read of cells in the fourth cycle and thereafter, the READ stage sliding-window counter (which is resident in the memory controllers) continues to update itself for all the consecutive pipeline cycles.

FIG. 26a shows a stream of incoming cells input to the switching apparatus for 12 consecutive cycles. FIG. 26b shows the occupancy of the multidimensional global buffer space after WRITE operation performed by the switching apparatus in the pipeline cycle 14 and before the READ operation performed in the pipeline cycle 15. The sliding-window counter in the $15^{th}$ pipeline cycle in the read pipeline-stage show that it is currently processing the cells belonging to the SW.osv=12 and SW.sp=1. The circled packets indicate the earlier occupancy of the cells in the global buffer space before being output in earlier cycles.

FIG. 27 shows the time chart for the input and output of ATM cell streams of FIG. 26a and the corresponding update of the sliding-window counter in the $4^{th}$ pipeline stage where the read operation is performed to output ATM cells from parallel memory modules of the disclosed switching apparatus.

FIG. 28a shows a stream of ATM cells input for 16 consecutive pipeline cycles to the example 4×4 ATM switching apparatus according to the present invention. The cell arrivals in the last several cycles are all destined to the output 4 and constitute an unbalanced traffic. For such a traffic, it is important to control the queue buildup inside the common memory space. In the lack of any control, the entire memory space can be occupied by cells of a given output port and thus prevent establishment of any other connection for any other pair of input and output ports through the common memory space. In the example switch of FIG. 11, growth of a queue inside the common memory space is controlled by the parameter assignment circuit. Once the queue length exceeds a threshold value, all other incoming cells, destined to the congested output port, are dropped. This allows for other input ports to establish connections through the global buffer space to non-congested output ports.

FIG. 28b shows an occupancy of the multidimensional buffer space after the WRITE operation is performed in the $18^{th}$ pipeline cycle by the $3^{rd}$ pipeline stage of the 4×4 switching apparatus of FIG. 11, according to the present invention. It is shown that the last three cells input in the $16^{th}$ pipeline cycle were dropped as the length of the output queue destined to output port 4 reached its upper limit i.e. 24 ATM cells in the multidimensional global buffer space. FIG.

28b also presents a senario of queue build up for a congested output port inside the multidimensional global buffer space with head-of-line (HOL) cell being resident in the output slot vector (OSV) on the scan plane (sp) as pointed by the sliding-window counter of the READ stage. The queue of cells destined to the output port 4 is shown by a dotted line and is marked as 'abcdef'. The first segment of queue 'ab' is resident on the second scan plane which holds the current traversal of the sliding-window. Consecutive arrival of cells destined to the output port 4 causes the cells to occupy slots in consecutive output slot vectors on the next scan plane and a queue 'cd' is formed on the first scan plane. Further arrival of cells destined to the output port 4 causes the cells to occupy available slots in consecutive output slot vectors on the second scan plane. The queue grows only up to the length $p.\sigma=24$ cells. Any further arrival of cells destined to output port 4 are dropped as the output queue has reached its maximum length allowed in the finite global buffer space. The last segment of the queue is denoted by 'ef' where the last three incoming cells, destined to output port 4, were dropped.

While the disclosed switching apparatus and the switching method has been particularly shown and described with reference to the preferred embodiments, it will be understood by those skilled in the art that various modifications in form and detail may be made therein without departing from the scope and spirit of the invention. Accordingly, modifications such as those suggested above in the document and some more suggested as follows, but not limited thereto, are to be considered within the scope of the present invention. For example:

(i) In the exemplary embodiments described above, the disclosed switching apparatus and the switching method are illustrated for switching of ATM cells with multiple input ports and multiple output ports employing a plurality of memory modules and employing decentralized pipeline control. However, the same switching apparatus and switching method can be used with a little or no modification to switch fixed packets of another size (i.e. other than 53 bytes) or even to switch packets of variable lengths;

(ii) In the preferred embodiments of the present invention, a means to achieve decentralized pipeline control for the overall switching function of the switching apparatus has been described above. However, it may be possible to control the disclosed switching apparatus by a centralized controller rather which may use the disclosed switching method with some modifications.

(iii) In the exemplary embodiments described above, a method for the assignment of self-routing parameters (i,j,k) are described. It may be possible to build faster assignment circuit 14 which may modify the assignment process, as shown by flow diagrams and as described above in the respective sections, in order to achieve a faster assignment or computation of the routing parameters (i,j,k).

(iv) In the exemplary embodiments described above, input modules have been employed in the system to hold the received cells for a predetermined length of time. It may be possible to use the disclosed switching apparatus and employ more modules (similar to input modules) or buffers at various points of the apparatus to adjust for the speed or for synchronization of various pipeline stage operations.

(v) In the preferred embodiments of the present invention, a means to achieve decentralized pipeline control for the overall switching function of the switching apparatus has been described where the overall switching function has been partitioned in 5 different stages for its pipeline operation. It may be possible to modify the partitioning of the switching function to have more than 5 different pipeline stages or less than 5 pipeline stages and accordingly modify the pipeline operation of the disclosed switching apparatus and the switching method.

(vi) In the pipeline operation of the disclosed switching apparatus, dual-port memory modules have been used in the example. It is possible to use single port memory having twice or more the speed of dual port memory.

(vii) The disclosed switching apparatus and method according to the present invention can manifest in various embodiments depending on the kind of interconnection networks used for input interconnection network 20 and output interconnection network 60. Such modifications are to be considered under scope the disclosed invention (viii) The disclosed switching apparatus, its is possible to modify the parameter assignment stage by partitioning the process in two separate stages, where the first stage determine the j and k routing parameters and the second stage determine the i parameter.

What is claimed is:

1. A high-speed data switching apparatus for processing and switching of input information as data packets between a plurality of input lines and a plurality of output lines, each packet having a data portion and a header portion, the header portion carrying a packet's destination as an output line, the high-speed switching apparatus comprising:

a self-routing parameter assignment circuit that generates a self-routing tag corresponding to each input packets for said self-routing tags to be attached to input packets and for propagating said packets with attached self-routing tags through said switching apparatus;

a plurality of memory modules to perform local write and read memory operations for received packets;

an input interconnection network for receiving each of said input packets with said attached self-routing tags to independently route said received packets to a particular one of said memory modules based only on the information in said attached self-routing tags;

an independent local memory controller coupled to each corresponding one of said memory modules and that operates independent of any other memory controller in the switching apparatus and uses only the information available locally and in said attached self-routing tag of received packet to calculate its corresponding memory module addresses to perform said local write and read memory operations for said received packet for switching purposes; and an output interconnection network coupled to said plurality of memory modules for using only said destination information from the header portion of said packets to route said packets read out from said plurality of memory modules to a corresponding one of said output lines.

2. The switching apparatus of claim 1, further comprising:

a separate header processing circuit is provided for each of said input lines and is coupled between said input lines and said input interconnection network;

wherein each of said header processing circuits is coupled to said self-routing parameter assignment circuit;

wherein said header processing circuits are used for receiving packets from said input lines and for obtaining a self-routing tag or indications of memory overflow from said self-routing parameter assignment circuit for each one of said received packets based on their output line destination, and for dropping packets in case of memory overflow and for selectively attaching said self-routing tag to said received packets and for forwarding said packets with said attached self-routing tags to said input interconnection network of said switching apparatus;

wherein said input interconnection network is coupled to said plurality of memory modules;

wherein said plurality of memory modules are coupled to said output interconnection network; and wherein said output interconnection network is coupled to said output lines of said switching apparatus.

3. The switching apparatus of claim 1, wherein said plurality of memory modules consists of packet locations forming a multidimensional global memory space to be shared by said plurality of input and output lines;

said packet's location in said multidimensional global memory space is represented by packet location parameters which consists of coordinates of said multidimensional global memory space;

said self-routing assignment circuit calculates said packet location parameters to assign a proper location for said received packets in said multidimensional global memory space; and said self-routing assignment circuit uses packet location parameters to generate self-routing tags to be attached by said header processing circuits to said received packets for their propagation through multiple stages of said switching apparatus.

4. The switching apparatus of claim 1, wherein said self-routing tag attached to said input packets is carried through said input interconnection network, said memory modules and said output interconnection network of said switching apparatus;

said input interconnection network uses only the information in said self-routing tag of said received packets to independently route said packets to corresponding memory modules;

said memory modules along with its corresponding local memory controllers use only the information available locally and in said self-routing tag of received packets to locally calculate WRITE and READ addresses and independently perform local memory operations and management;

said memory controllers coupled to memory modules operate independently of any centralized controller or any other memory controllers in the switching apparatus; and said output interconnection network uses only the destination information in the header portion of the received packets from a plurality of memory modules to route said packets to corresponding output lines.

5. The switching apparatus of claim 1, wherein the number of memory modules used in said switching apparatus is dependent on memory sharing schemes used for said multidimensional global memory space; and the number of memory modules used can be less than the sum of the number of input and output lines less one.

6. The switching apparatus of claim 1, wherein data packets are received and processed as packets of fixed lengths, each packet having a data portion and a header portion, header portion of which carries a packet's destination as an output line of the switching apparatus; and said packets of fixed length may belong to Asynchronous Transfer Mode (ATM).

7. The switching apparatus of claim 1, wherein data packets are received and processed as packets of fixed lengths, each packet having a data portion and a header portion, header portion of which carries a packet's destination as an output line of the switching apparatus; and said packets of fixed length may belong to Synchronous Transfer Mode (STM).

8. The switching apparatus of claim 1, wherein data packets are received and processed as packets of variable lengths, each packet having a data portion and a header portion, header portion of which carries a packet's destination as an output line of the switching apparatus.

9. A method for processing and switching of input information as data packets between a plurality of input lines and a plurality of output lines, each packet having a data portion and a header portion, and header portion carrying a packet's destination as an output line, the method of switching comprising the steps of:

independently generating a self-routing tag for input packets by using a self-routing parameter assignment circuit;

attaching said self-routing tag to said input packets for propagating said packets through said switching apparatus;

performing local write and read memory operations for received packets with a plurality of memory modules;

coupling an input interconnection network between said input lines and said plurality of memory modules;

receiving said input packets with said attached self-routing tag at said input interconnection network;

routing said received packets with attached self-routing tags to a particular one of said memory modules by using said input interconnection network and based only on the information in said self-routing tags;

coupling a local memory controller to each of said plurality of memory modules;

operating said local memory controllers independently of any centralized controller or any other memory controller in the switching apparatus;

generating said local WRITE and READ memory addresses for local memory operations for said plurality of memory modules using only said attached self-routing tags of received packets and the local information available to said memory controllers;

coupling an output interconnection network to said plurality of memory modules; and routing said received packets from said plurality of memory modules to a corresponding one of said output lines by using said output interconnection network and based only on destination information in the header portion of said received packets.

10. The method of switching in claim 9, further comprising the steps of:

using a separate header processing circuit to couple each of said input lines to said input interconnection network;

coupling each of said header processing circuits to said self-routing parameter assignment circuit of said switching apparatus;

obtaining a self-routing tag or indication of memory overflow from said self-routing parameter assignment circuit for said input packets based on their output line destinations, using said header processing circuit;

selecting said input packets to be propagated through said switching apparatus and attaching said self-routing tag to said packets selected to be propagated, using said header processing circuits;

forwarding said packets with attached self-routing tags to said input interconnection network of said switching apparatus;

coupling said input interconnection network to said plurality of memory modules;

coupling said plurality of memory modules to said output interconnection network; and coupling said output interconnection network to said output lines of said switching apparatus.

11. The method of switching in claim 9 further comprising the steps of:

depicting the entire memory locations for packets in said plurality of memory modules of said switching apparatus as a multidimensional global memory space to be shared by said plurality of input and output lines;

using coordinates of said multidimensional global memory space as packet location parameters to identify a packet's location in the multidimensional global memory space;

calculating said packet location parameters to assign a proper location for said input packets in said multidimensional global memory space, using said self-routing assignment circuit; and generating self-routing tags based on said packet location parameters to be attached to said input packets for their self propagation through said switching apparatus.

12. The method of switching in claim 9 further comprising steps of:

obtaining indication of memory overflow from said self-routing parameter assignment circuit for said input packets destined to said output lines and dropping said packets causing memory overflow in said switching apparatus using said header processing circuits;

propagating input packets which were not dropped with attached corresponding said self-routing tags through said switching apparatus using header processing circuits;

using only the information in said self-routing tags of said received packets to route said received packets to one of said plurality of memory modules by said input interconnection network;

using only the local information and said self-routing tag of received packets to locally calculate WRITE and READ addresses and indepedently perform local memory operations for said plurality of memory modules;

enabling local memory controllers coupled to said plurality of memory modules to perform operation based only on the information available locally and independent of any centralized controller or any other memory controllers in the switching apparatus; and using only said destination information in said header portion of said packets to route said packets read out of said plurality of memory modules to one of said output lines by said output interconnection network.

13. A method of switching of data packets between a plurality of input lines and a plurality of output lines of a switching apparatus employing a plurality of memory modules to be shared by the plurality of input and output lines, the method comprising the steps of:

depicting entire memory locations for packets in said plurality of memory modules of said switching apparatus as a multidimensional global memory space to be shared by said plurality of input and output lines;

identifying a packet's location in said multidimensional global memory space by using coordinates of said multidimensional global memory space as packet location parameters;

assigning a location for input packets in said multidimensional global memory space by using said packet location parameters;

creating self-routing parameters to enable independent memory management and self-routing of packets through said switching apparatus by using said packet location parameters;

attaching self-routing parameters to said input packets for their propagation through said said switching apparatus;

identifying a set of memory locations in said multidimensional global memory space to write said input packets to, and to read output packets from said multidimensional global memory space, using a pointer; and updating said pointer each switch cycle, in order for said pointer to identify a newer set of memory locations in a newer switch cycle to write input packets to, and to read output packets from said multidimensional global memory space.

14. The method of creating said self-routing parameters of claim 13 further comprising the steps of:

updating current value of said pointer each switch cycle;

keeping a count of packets destined to a plurality of said output lines;

tracking said self-routing parameters of most recent packet assigned by said self-routing parameter assignment circuit for said plurality of output lines;

tracking occupancy status of said multidimensional global memory space by using an occupancy matrix which represents occupancy and status of packets in said multidimensional global memory space; and updating said occupancy matrix each switch cycle to represent most recent occupancy and status of packets in said multidimensional global memory space of said switching apparatus.

* * * * *